United States Patent [19]
Shimazaki et al.

[11] Patent Number: 5,637,411
[45] Date of Patent: Jun. 10, 1997

[54] MAGNETO-OPTICAL RECORDING MEDIUM AND PROCESS FOR PRODUCING THE SAME

[75] Inventors: Katsusuke Shimazaki; Satoru Ohnuki; Masatoshi Hashimoto; Yoshinori Shirai; Norio Ohta, all of Ibaraki-ken, Japan; Hideo Fujiwara, Tuscaloosa, Ala.; Masafumi Yoshihiro, Ibaraki-ken, Japan; Yukinori Yamada, Tsukuba, Japan; Eiji Koyama, Tsuchiura, Japan; Hitoshi Furusho, Ishioka, Japan

[73] Assignee: Hitachi Maxell, Ltd., Osaka, Japan

[21] Appl. No.: 227,673

[22] Filed: Apr. 14, 1994

Related U.S. Application Data

[63] Continuation-in-part of Ser. No. 918,562, Jul. 24, 1992, abandoned.

[30] Foreign Application Priority Data

Jul. 29, 1991 [JP] Japan ................................. 3-210430

[51] Int. Cl.⁶ ............................................. G11B 5/66
[52] U.S. Cl. ..................... 428/694 ML; 428/694 MM; 428/694 EC; 428/694 RE; 428/900; 428/655; 428/678; 369/13; 360/59; 365/122
[58] Field of Search ................. 428/694 EC, 694 MM, 428/694 RE, 694 MC, 900, 655, 678; 369/13; 360/59; 365/122

[56] References Cited

U.S. PATENT DOCUMENTS

| | | | |
|---|---|---|---|
| 4,645,722 | 2/1987 | Katayama et al. | 428/694 ML |
| 4,882,231 | 11/1989 | Aratani et al. | 428/611 |
| 4,910,622 | 3/1990 | Saito et al. | 360/131 |
| 5,018,119 | 5/1991 | Aratani et al. | 369/13 |
| 5,168,482 | 12/1992 | Aratani et al. | 369/13 |

FOREIGN PATENT DOCUMENTS

| | | |
|---|---|---|
| 258978 | 3/1988 | European Pat. Off. |
| 56-4090 | 1/1981 | Japan |
| 56-54070 | 5/1981 | Japan |
| 57-120253 | 7/1982 | Japan |
| 57-169996 | 10/1982 | Japan |
| 62-175948 | 8/1987 | Japan |
| 143042 | 6/1989 | Japan |
| 9002400 | 8/1989 | Japan |

OTHER PUBLICATIONS

Kobayashi et al "Magnetization Process of ECDL films" Jap.–J. Appl. Phys.20 (11), 1981; pp. 2089–2095.

Primary Examiner—Leszek Kiliman
Attorney, Agent, or Firm—Birch, Stewart, Kolasch & Birch, LLP

[57] ABSTRACT

Disclosed is a magneto-optical recording medium which comprises a transparent substrate and, provided on the substrate, a magneto-optical recording film comprising a perpendicular magnetic film based on rare earth metal-transition metal and an auxiliary magnetic film having spontaneous magnetization which exerts, between itself and the magneto-optical recording film, an exchange coupling force and wherein the auxiliary magnetic film is a magnetic film which readily rotates its magnetization direction toward the external magnetic field in the neighborhood of the Curie temperature of the magneto-optical recording film and has a squareness ratio of not more than 1 in the neighborhood of the Curie temperature. Also disclosed is a process for producing the magneto-optical recording medium.

13 Claims, 48 Drawing Sheets

1. TRANSPARENT SUBSTRATE
2. SIGNAL SURFACE
3. ENHANCE FILM
4. RARE EARTH-TRANSITION METAL BASED AMORPHOUS VERTICAL MAGNETIZATION FILM
5. SUXILIARY MAGNETIC FILM
6. PROTECTIVE FILM

1. TRANSPARENT SUBSTRATE
2. SIGNAL SURFACE
3. ENHANCE FILM
4. RARE EARTH-TRANSITION METAL BASED AMORPHOUS VERTICAL MAGNETIZATION FILM
5. SUXILIARY MAGNETIC FILM
6. PROTECTIVE FILM

| SiON | 1000Å |
| Pt₈₀Co₂₀ | 200Å |
| Tb₁₈Fe₆₇Co₁₀Cr₅ | 500Å |
| SiON | 800Å |
| SUBSTRATE | |

| SiON | 1000Å |
| Tb₁₈Fe₆₇Co₁₀Cr₅ | 500Å |
| SiON | 800Å |
| SUBSTRATE | |

8: HEAT CONTROL LAYER

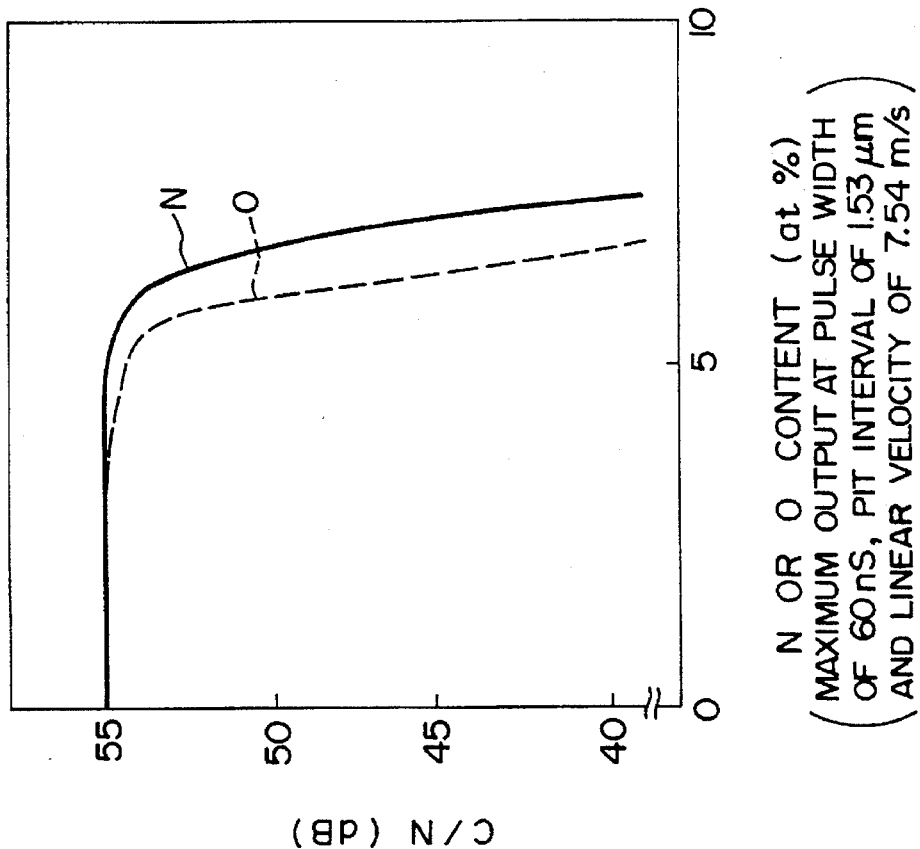

F I G. 24

| EXPERIMENTAL EXAMPLE | PRODUCTION PROCESS (RECORDING FILM-FORMING CONDITIONS) | | HEAT TREATMENT AFTER FILM FORMATION | C/N (dB) | SATURATION RECORDING MAGNETIC FIELD (Oe) | ERASING MAGNETIC FIELD (Oe) | N OR O CONTENT IN FILM | |
|---|---|---|---|---|---|---|---|---|
| | DEGREE OF VACUUM FOR SUBSTRATE EVACUATION | SPUTTERING GAS | | | | | N (at %) | O (at %) |
| ① | $5 \times 10^{-5}$ Pa | PURE Ar | 80°C 15min (at $5 \times 10^{-5}$ Pa) | 55 | 130 | 100 | 10 | 0.3 |
| ② | $2 \times 10^{-5}$ Pa | Ar + N$_2$ (1%) | — | 55 | 110 | 100 | 4.5 | <0.1 |
| ③ | $2 \times 10^{-4}$ Pa | PURE Ar | 40°C 30min (at $3 \times 10^{-4}$ – $5 \times 10^{-5}$ Pa) | 55 | 120 | 100 | 2.0 | 0.5 |
| ④ | $2 \times 10^{-5}$ Pa | Ar + O$_2$ (0.5%) | — | 55 | 120 | 100 | <0.1 | 2.5 |
| ⑤ | $2 \times 10^{-5}$ Pa | Ar + N$_2$ (0.4%) + O$_2$ (0.1%) | — | 55 | 120 | 100 | 2.0 | 0.5 |
| COMPARATIVE EXAMPLE | ~$10^{-5}$ Pa ORDER | PURE Ar | — | 55 | 250 | 250 | <0.1 | <0.1 |

F I G. 27
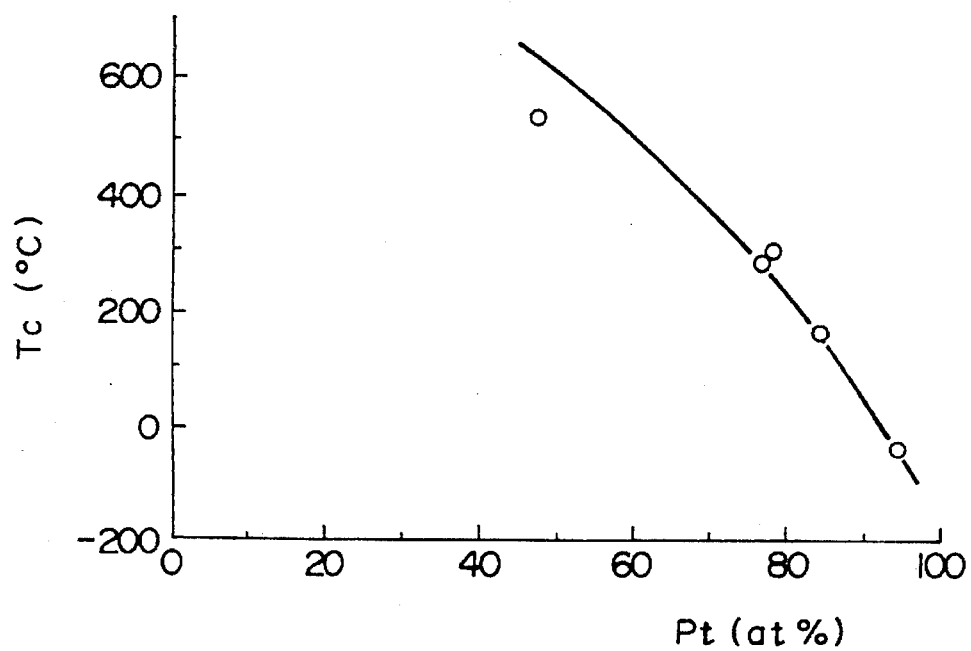
F I G. 28
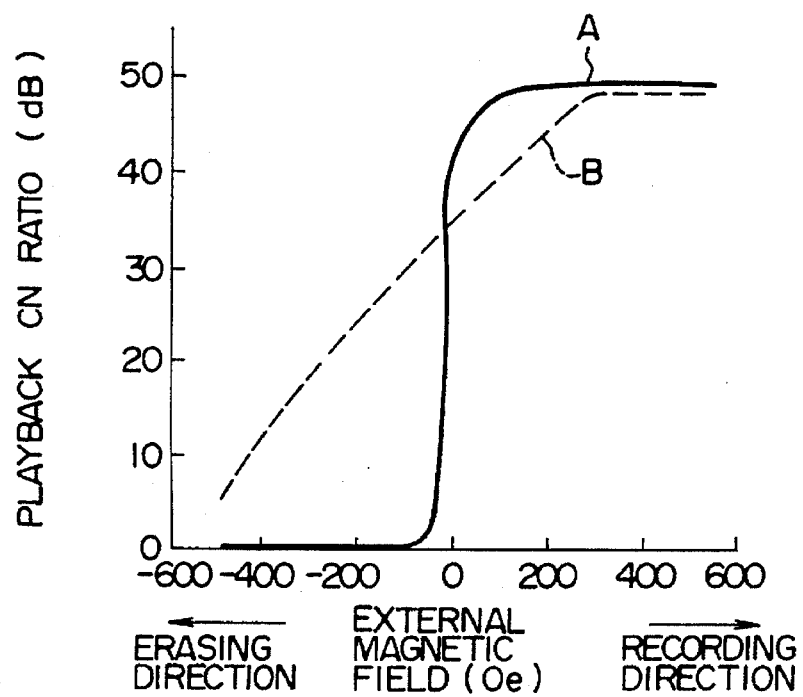

F I G. 29
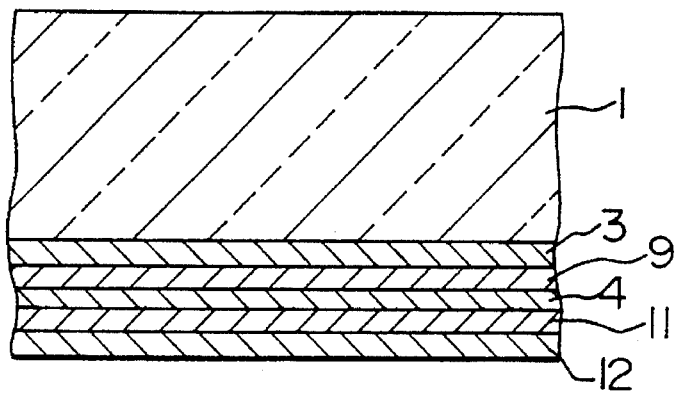
F I G. 30
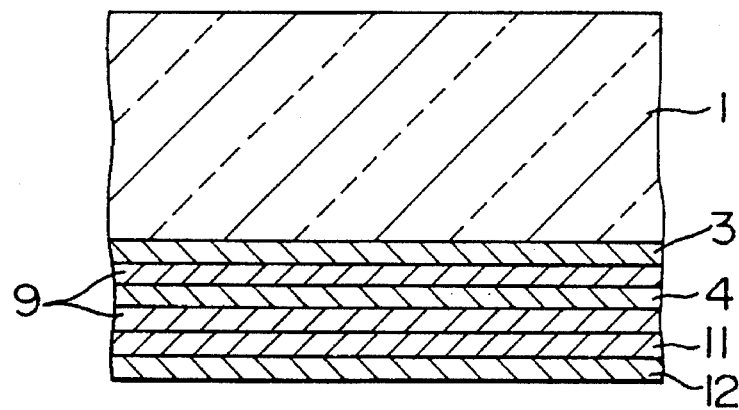
F I G. 31
| SiON | 1000Å |
|---|---|
| Pt$_{80}$Co$_{20}$ | 200Å |
| Tb$_{30}$Fe$_{55}$Co$_{10}$Cr$_5$ | 500Å |
| SiON | 800Å |
| SUBSTRATE | |

FIG. 32
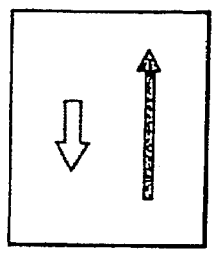
FIG. 33
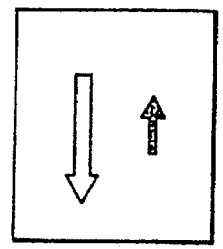
FIG. 34
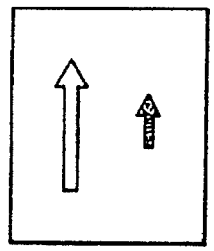
FIG. 35
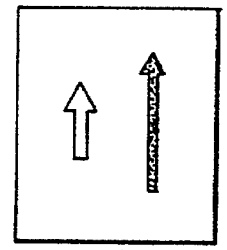
FIG. 36(a)
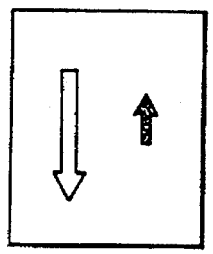
ROOM TEMPERATURE
FIG. 36(b)
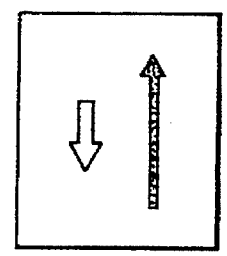
NEIGHBORHOOD OF CURIE TEMPERATURE 1: TRANSPARENT SUBSTRATE
2: PREFORMAT PATTERN
3: ENHANCE FILM
4: MAGNETO-OPTICAL RECORDING FILM
5: AUXILIARY MAGNETIC FILM
6: PROTECTIVE FILM
8: HEAT DIFFUSION FILM

5: AUXILIARY MAGNETIC FILM

F I G. 52
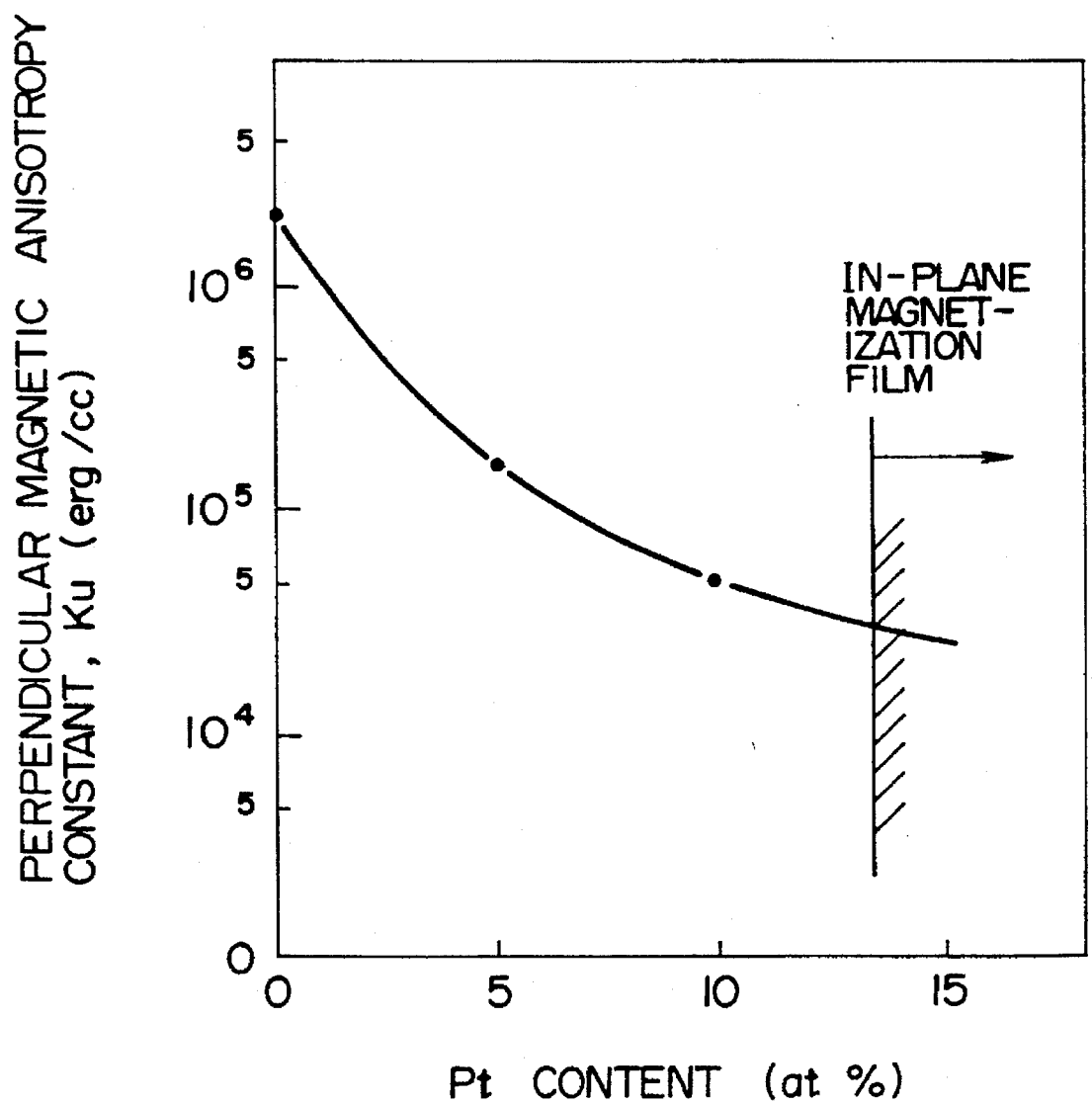

(MAXIMUM OUTPUT AT PULSE WIDTH OF 60 nS, BIT INTERVAL OF 1.53 μm AND LINEAR VELOCITY OF 7.54 m/s)

FIG. 59a
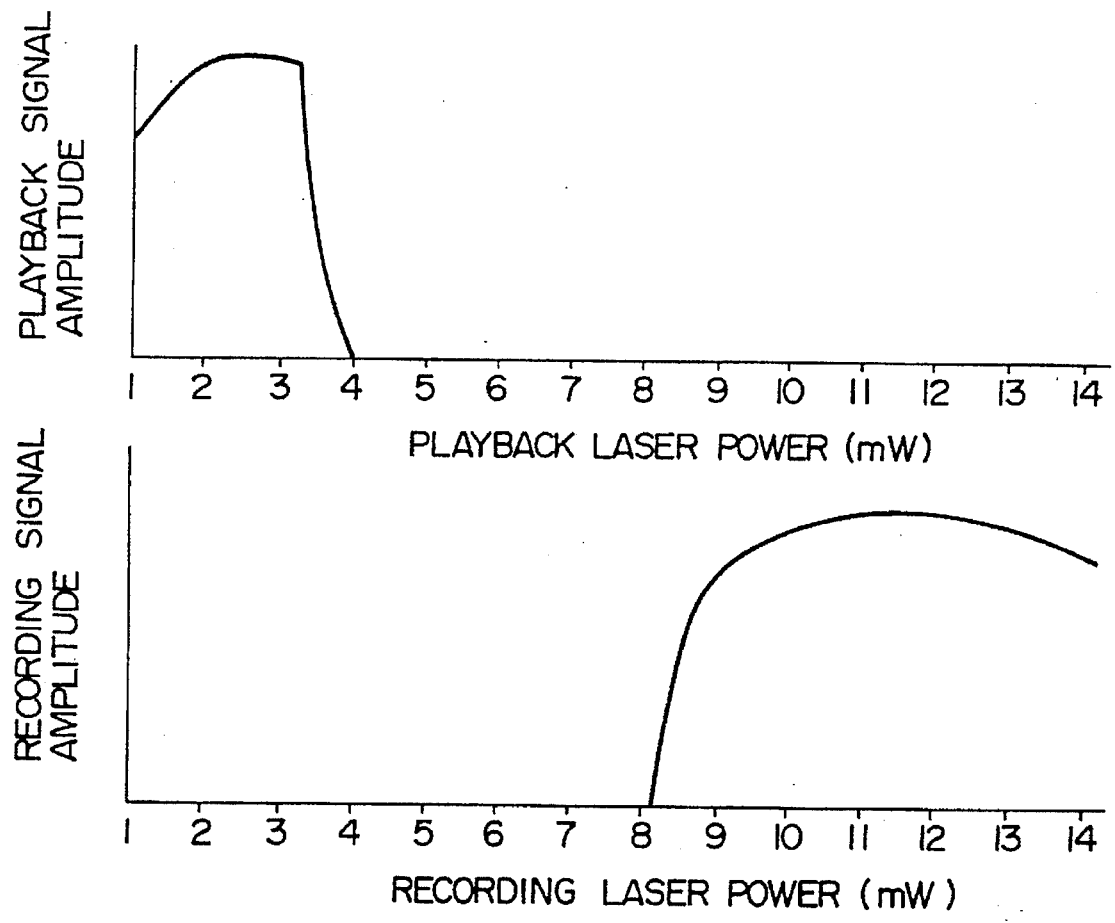
FIG. 59b
FIG. 60
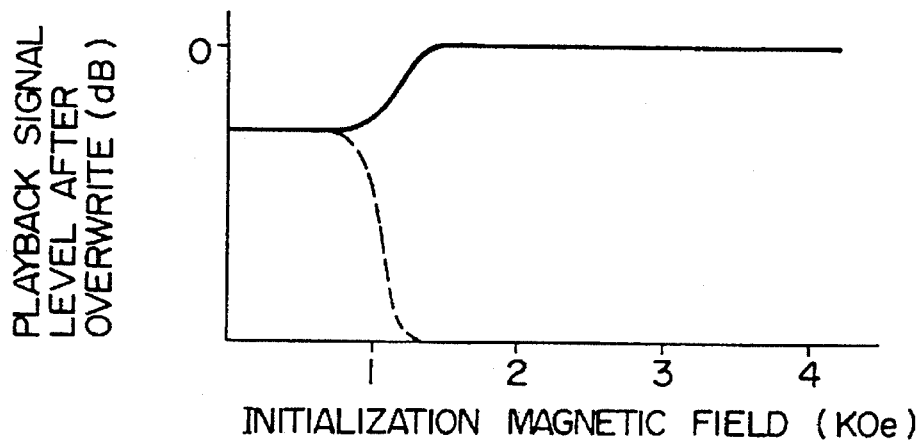

F I G. 61
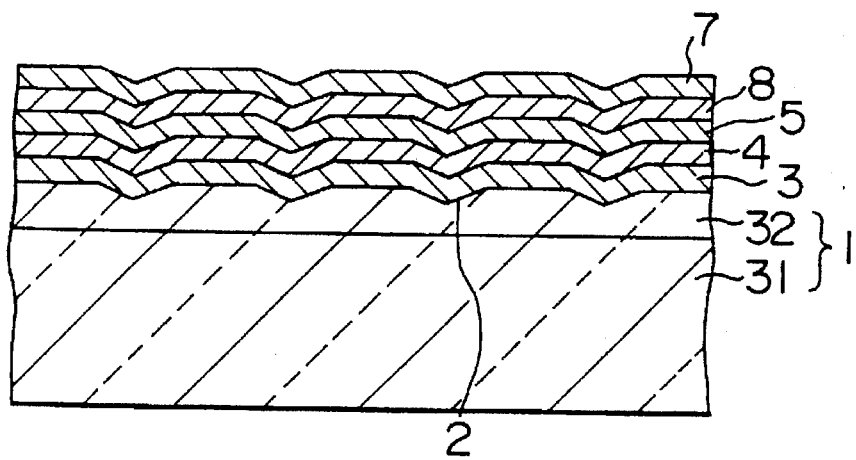
F I G. 62
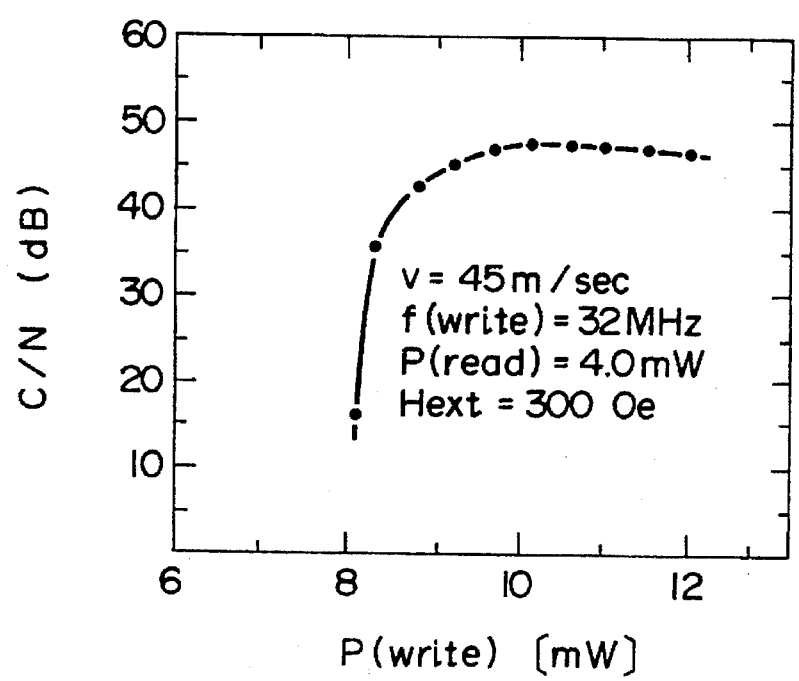

FIG. 63

| COMPOUND | EXPERIMENTAL EXAMPLE (UNIT : wt %) | | | | | | | | | | | | | | | | |
| --- | --- | --- | --- | --- | --- | --- | --- | --- | --- | --- | --- | --- | --- | --- | --- | --- | --- |
| No. | 10 | 11 | 12 | 13 | 14 | 15 | 16 | 17 | 18 | 19 | 20 | 21 | 22 | 23 | 24 | 25 | 26 |
| γ-GLYCIDOXYPROPYL-TRIMETHOXYSILANE | 1 | ○ | ○ | ○ | ○ | ○ | 5 | 10 | 0.1 | ○ | ○ | ○ | ○ | 15 | 0.05 | ○ | ○ |
| β-(3,4-EPOXYCYCLOHEXYL)-ETHYLTRIMETHOXYSILANE | ○ | 1 | ○ | ○ | ○ | ○ | ○ | ○ | ○ | ○ | ○ | ○ | ○ | ○ | ○ | ○ | ○ |
| N-β-(AMINOETHYL)-γ-AMINOPROPYL-TRIMETHOXYSILANE | ○ | ○ | ○ | 1 | ○ | ○ | ○ | ○ | ○ | ○ | ○ | ○ | ○ | ○ | ○ | ○ | ○ |
| γ-AMINOPROPYL-TRIETHOXYSILANE | ○ | ○ | ○ | ○ | ○ | 1 | ○ | ○ | ○ | ○ | ○ | ○ | ○ | ○ | ○ | ○ | ○ |
| N-PHENYL-γ-AMINO-PROPYLTRIETHOXYSILANE | ○ | ○ | ○ | ○ | 1 | ○ | ○ | ○ | ○ | ○ | ○ | ○ | ○ | ○ | ○ | ○ | ○ |
| γ-MERCAPTOPROPYL-TRIMETHOXYSILANE | ○ | ○ | ○ | ○ | ○ | ○ | ○ | ○ | ○ | 5 | 10 | 0.1 | ○ | ○ | ○ | ○ | ○ |
| TITANIUM STEARATE | ○ | ○ | ○ | ○ | ○ | ○ | ○ | ○ | ○ | ○ | ○ | ○ | ○ | ○ | ○ | 15 | 0.05 |

| FILLER | EXPERIMENTAL EXAMPLE (UNIT: wt %) | | | | | | | | | |
|---|---|---|---|---|---|---|---|---|---|---|
| | 27 | 28 | 29 | 30 | 31 | 32 | 33 | 34 | 35 | 36 |
| $SiO_2$ (EPOXYSILANE SURFACE-TREATED) | 40 | 0 | 0 | 0 | 60 | 0 | 80 | 0 | 0 | 0 |
| $Al_2O_3$ (EPOXYSILANE SURFACE-TREATED) | 0 | 40 | 0 | 0 | 0 | 0 | 0 | 0 | 0 | 0 |
| $SiO_2$ (AMINOSILANE SURFACE-TREATED) | 0 | 0 | 40 | 0 | 0 | 60 | 0 | 0 | 0 | 0 |
| $Al_2O_3$ (AMINOSILANE SURFACE-TREATED) | 0 | 0 | 0 | 40 | 0 | 0 | 0 | 80 | 0 | 0 |
| $SiO_2$ (UNTREATED) | 0 | 0 | 0 | 0 | 0 | 0 | 0 | 0 | 40 | 0 |
| $Al_2O_3$ (UNTREATED) | 0 | 0 | 0 | 0 | 0 | 0 | 0 | 0 | 0 | 40 |
| N-β(AMINOETHYL)-γ-AMINO-PROPYLTRIMETHOXYSILANE | 1 | 1 | 1 | 1 | 1 | 1 | 1 | 1 | 1 | 1 |

F I G. 69
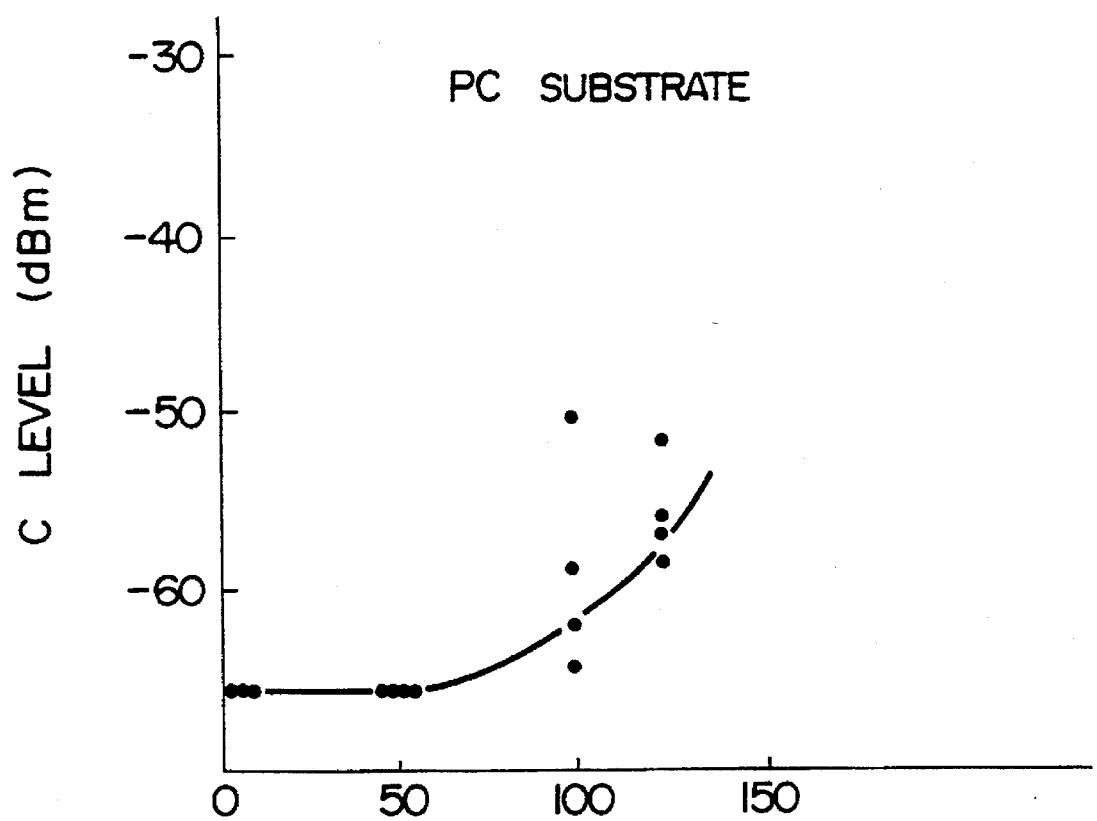

3: ENHANCE FILM (SiN)

4: VERTICAL MAGNETIZATION FILM (TbFeCo)

5: IN-PLANE MAGNETIZATION FILM (TbFeCo)

6: PROTECTIVE FILM (SiN)

7: REFLECTIVE FILM (Al)

11: 2P SUBSTRATE

12: GRASS PLATE

13: RESIN LAYER

F I G. 72
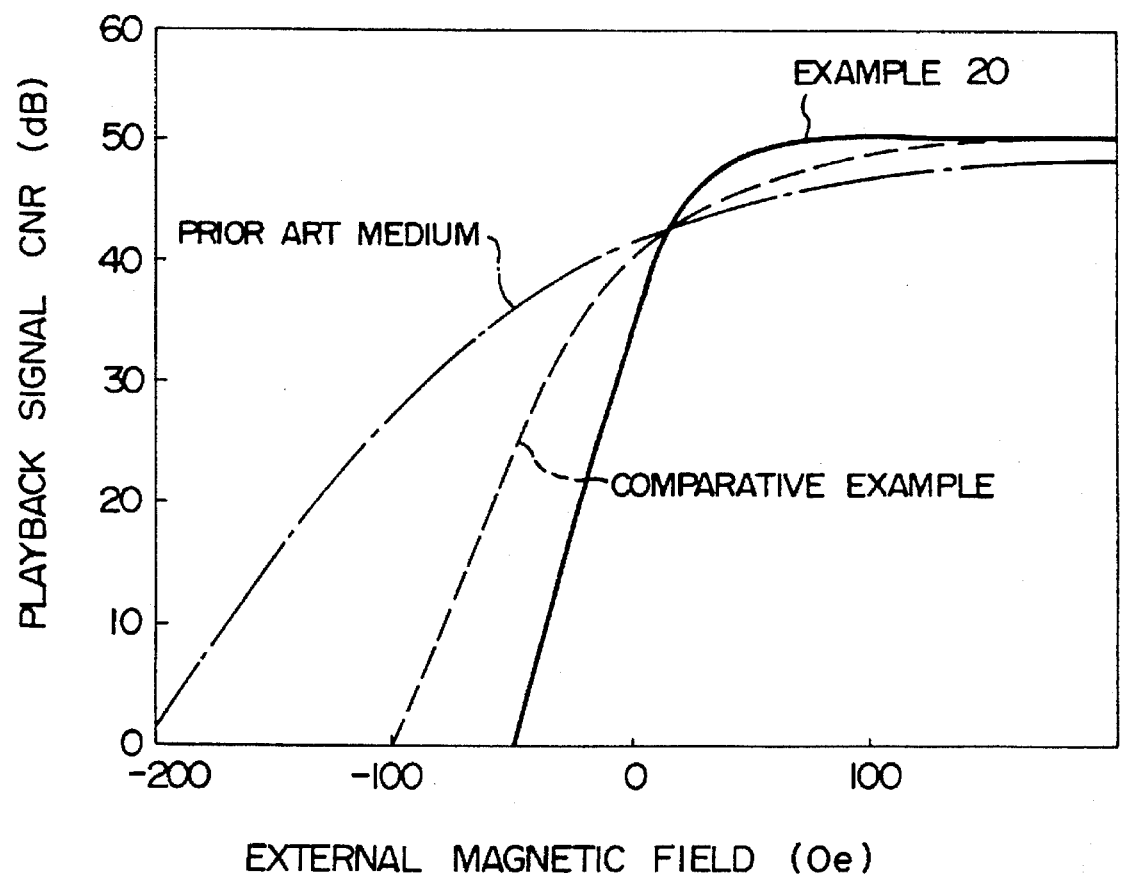

MAGNETO-OPTICAL RECORDING MEDIUM AND PROCESS FOR PRODUCING THE SAME

This application is a continuation-in-part of application Ser. No. 07/918,562, filed on Jul. 24, 1992, now abandoned, the entire contents of which are hereby incorporated by reference.

BACKGROUND OF THE INVENTION

The present invention relates to a magneto-optical recording medium. In more particular, the invention relates to magnetic characteristics of respective films of a magneto-optical recording medium comprising a transparent substrate and, supported thereon, a magneto-optical recording film comprising a perpendicular magnetic film made of an alloy of rare earth metal-transition metal formed on the substrate, and an auxiliary magnetic film having spontaneous magnetization provided in contact with the magneto-optical recording film.

Information recording systems using a magneto-optical recording medium have come into practical use and, accordingly, the development of a magneto-optical recording medium is becoming an increasingly more important technical problem which is capable of recording new information simultaneously with erasing previously recorded information, instead of erasing previously recorded information once and thereafter writing new information.

An overwrite recording system for magneto-optical recording media which is attracting the most attention at present is the light intensity modulating system, in which information is recorded by scanning a recording light intensity-modulated in the form of pulses corresponding to a "0" or a "1" of an information signal which has been converted into binary notation, while applying an external magnetic field of constant strength to the magneto-optical recording medium. Examples of magneto-optical recording media which have enabled overwrite recording of a light intensity modulation system include the one described in Japanese Patent Kokai (Laid-open) No. 62-175948 and the one described in International Publication No. WO90/02400.

A magneto-optical recording medium is a medium which records information by forming on a magnetic layer supported on a substrate inverted magnetic domains (i.e., magnetized domains) corresponding to information signals and playing back the recorded information by making use of the fact that the Kerr angle of rotation of reflected light changes in accordance with the direction of magnetization of the magnetic layer when a linear polarized light is irradiated to the magnetic layer on which the information has been recorded as mentioned above. The inverted magnetic domain is formed on the magnetic layer through either, as so-called, the light intensity modulation system or the magnetic field strength modulation system. In both systems, the magneto-magnetic layer must be brought up to a temperature near to or higher than the Curie temperature. Further, a magneto-optical recording medium is an information recording medium of the so-called erasable type in which the erasing and rewriting of information can be conducted repeatedly and also, in erasing information, the temperature of the magnetic layer must be increased to near or above the Curie temperature. The temperature increase of a magnetic layer has hitherto been performed by focusing a laser beam on the magnetic layer.

Thus, in a magneto-optical recording medium, information is recorded and erased by heating the magnetic layer to a predetermined temperature. In order to obtain a desired data transfer velocity, therefore, the Curie temperature of the magnetic layer, the heat conductivity of the part contacting to the magnetic layer, the intensity of laser beam irradiated to the magnetic layer and the linear velocity of the laser beam spot which travels on the magneto-optical recording medium must be all set in good balance.

A common magneto-optical disk of 5 inch diameter, which is in practical use thus far, is attached to a magneto-optical disk driving apparatus provided with a semiconductor laser of 30–40 mW and is rotationally driven at 2400 rpm (at a constant angular velocity). In such a disk, the Curie temperature of the magnetic layer and the heat conductivity of the part contacting the magnetic layer are so set that the recording and erasing of information can be performed under conditions which is optimum in the outermost peripheral recording region, where the linear velocity of the laser beam spot is the highest (that is, 15 m/sec). As prior art technologies relating thereto, reference may be made to Japanese Patent Kokai (Laid-open) Nos. 56-4090, 56-54070, 57-120253 and 57-169996, for example.

As described, for example, in "Wakari-yasui Hikari-disk" (For Easier Understanding of Optical Disk, published by Optronics K.K., Dec. 10, 1985), p. 52, there is already known an optical information recording medium of so-called closely adhered lamination structure formed by sticking the transparent substrates and the recording surfaces, respectively, of two magneto-optical recording single plates to each other. There is also known an optical information recording medium of so-called air sandwich structure formed by sticking the inner peripheral parts and the outer peripheral parts of the transparent substrates of two optical recording single plates respectively to each other through a spacer coated with an adhesive so as to provide an air layer between the opposing recording surfaces.

FIG. 41 shows the external magnetic field characteristics of a conventional magneto-optical recording medium having a perpendicular magnetic film supported thereon as a magneto-optical recording film and FIG. 42 shows the bit error occurrence characteristics of the above conventional magneto-optical recording medium. In FIG. 41, the ordinate axis indicates the playback signal output and the abscissa axis indicates intensity of the external magnetic field. The positive value on the abscissa axis shows the magnetic field of the recording direction and the negative value shows the magnetic field of the erasing direction. As shown in FIG. 43, the sample used was prepared by laminating successively on one side of a polycarbonate substrate 1 an SiN type first inorganic dielectric substance layer 2 higher in refractive index than the substrate 1, a TbFeCo type perpendicular magnetic film 3 as a magneto-optical recording film, a second inorganic dielectric substance layer 4 comprising the same inorganic dielectric substance as of the first inorganic dielectric substance layer 2 and an Al reflecting film 5 by continuous sputtering. As shown in FIG. 41, in this magneto-optical recording medium, the perpendicular magnetic film 3 cannot reach saturation magnetization unless an external magnetic field of at least 200 (Oe) is applied in the recording direction or in the erasing direction. Furthermore, as shown in FIG. 42, the bit occurrence rate cannot be reduced to the lowest level unless an external magnetic field of at least 200 (Oe) is applied in the recording direction.

Moreover, a magnetic torque of the sample taken out from the above magneto-optical recording medium was measured by a torque magnetometer (Torque Magnetometer: TRT-2 manufactured by Toei Kogyo Co., Ltd.) and the change in the magnetic torque with respect to the rotating angle of the external magnetic field was plotted to obtain the torque curve as shown in FIG. 39. In this case, the ranges of measurements are Y=2 dyn-cm/V, X=0.5 mV/dog and the recorder ranges are Y=0.1 V/cm, X=10 mV/cm. The measurement was conducted in the following manner. While an external magnetic field $H_{ex}$ of a strength specified by $H_c < H_{ex} < H_k$ when the magnetic domain wall coercive force at the measuring temperature is designated as $H_c$ and the vertical anisotropic magnetic field at the measuring temperature is designated as $H_k$ is being applied to the sample, the external magnetic field is rotated around the supporting axis of the sample and the magnetic torque acting on the supporting axis of the sample was measured. "0°" in FIG. 39 shows that the direction of the external magnetic field is perpendicular to the film face of the sample and "θ" shows the angle of rotation of the external magnetic field $H_{ex}$ from the direction perpendicular to the film face.

An optical recording single plate comprises a transparent substrate and one or more layers of film containing at least a recording layer or a reflecting layer adhered to the preformat pattern-carrying surface of the substrate. The transparent substrate is formed, for example, out of a transparent ceramic material, such as glass, etc., or a transparent plastic material, such as polycarbonate, poly(methyl methacrylate), polymethylpentene, epoxy resin, photocurable resin, etc. As the adhesive agent for adhering these optical recording single plates, polymeric adhesive agents such as hot melt adhesives and epoxy adhesives are mainly used.

In optical recording media of this type, further, various investigations have been made up to now on providing a transparent thin layer of oxide, nitride and the like between the transparent substrate and the optical recording film to make it function as an optical multiple interference film or a protective film.

In order to realize the overwrite of information, the sensitivity of a magneto-optical recording film to the external magnetic field must be sufficiently high irrespective of whether the light intensity modulation system or the magnetic field strength modulation system is adopted. Of the prior art examples of the magneto-optical recording medium applicable to overwrite recording of the light intensity modulation system mentioned above, the former has an auxiliary magnetic film having spontaneous magnetization laminated onto the magneto-optical recording film which is a perpendicular magnetic film, so that it can have an enhanced external magnetic field sensitivity in recording or erasing as compared with media of a perpendicular magnetic film alone.

However, even in the case of a recording medium of such a structure, an external magnetic field of 200 (Oe) or more is necessary in recording or erasing, so that the medium cannot be regarded as having a sufficiently high external magnetic field sensitivity for practical use. Furthermore, since the magneto-optical recording film and the auxiliary magnetic film are laminated directly, the exchange coupling force working between the two films becomes considerably higher than the desired value, so that when the light intensity modulation system is used an initialization magnet of at least 5–6 (KOe) becomes necessary and further, in company therewith, the recording magnetic domain tends to disappear.

Further, in a magneto-optical recording medium, one of the most important technical problems is to increase the data transfer velocity. In order that the data transfer velocity may be improved, the linear velocity of the laser beam spot relative to the magneto-optical recording medium (that is, for example, the rotational velocity of a magneto-optical disk) must be increased. However, when the linear velocity of the laser beam spot is increased, the irradiation time of the laser beam is shortened and hence the temperature of the magnetic layer is raised with more difficulty. Consequently, a technical problem of either improving the recording sensitivity of a magneto-optical recording medium or greatly increasing the output power of a semiconductor laser must be solved.

Further, in an optical information recording system of a lamination structure, an inorganic filler is frequently incorporated into the adhesive layer to decrease the water vapor permeability of the adhesive layer and thereby to prevent the penetration of water into the medium and prevent the corrosion of the recording layer or the reflecting layer. In such cases, since the reactivity between the inorganic filler and the adhesive agent is poor, peeling tends to occur, resulting in poor long term storability of the medium.

In the case of an optical information recording medium of the type in which an oxide layer is formed by means of vapor deposition or sputtering, the oxide layer tends to become chemically unstable and liberate oxygen, and the liberated oxygen gradually diffuses into the optical recording film and oxydizes the optical recording film, leading to deterioration of information-recording, -regeneration and-erasing characteristics.

On the other hand, since the adhesiveness of a nitride layer to a transparent substrate made of synthetic resin such as polycarbonate is poor, if it is used as the undercoat layer of optical recording film peeling will occur between the transparent substrate and the undercoat layer over a long period of time so as to decrease the usefulness of the medium for data storage.

From the problems described above, optical information recording media of the prior art are not satisfactory in reliability.

BRIEF DESCRIPTION OF THE DRAWINGS

FIG. 20 is a table showing one example of the compositions and the thicknesses of the respective films laminated into the magneto-optical recording medium in Example 3.

FIG. 21 is a graph showing the relation of the amount of N and the amount of O incorporated with the playback CN ratio as determined by using the magneto-optical recording medium of FIG. 20.

FIG. 24 is a table showing the process for production, playback magnetic field versus noise, hereinafter C/N ratio, saturation recording magnetic field, erasing magnetic field and amounts of N and O incorporated, of the magneto-optical recording media according to the respective Experimental Examples and Comparative Example in Example 3.

FIG. 27 is a graph showing the relation between the composition and the Curie temperature of the auxiliary magnetic film in Example 4.

FIG. 28 is a graph showing the recording and erasing characteristics of the magneto-optical recording medium according to Example 4 and a magneto-optical recording medium of the prior art in comparison with each other.

FIG. 29 is a sectional view showing the principal part of a modified version of the magneto-optical recording medium according to Example 4.

FIG. 30 is a sectional view showing the principal part of another modified version of the magneto-optical recording medium according to Example 4.

FIG. 31 is a diagram showing one example of the structure of a magneto-optical recording medium capable of overwriting by the light intensity modulating system.

FIG. 32 is a diagram for illustrating a ferrimagnetic substance which is transition metal-rich in the neighborhood of the Curie temperature.

FIG. 33 is a diagram for illustrating a ferrimagnetic substance which is rare earth metal-rich in the neighborhood of the Curie temperature.

FIG. 34 is a diagram for illustrating a ferromagnetic substance which is transition metal-rich in the neighborhood of the Curie temperature.

FIG. 35 is a diagram for illustrating a ferromagnetic material which is rare earth metal-rich in the neighborhood of the Curie temperature.

FIG. 36(a) is a diagram illustrating a ferrimagnetic substance which is rare earth metal-rich at room temperature and FIG. 36(b) is a diagram illustrating the same which becomes transition metal-rich in the neighborhood of the Curie temperature.

FIG. 52 is a graph showing the relation between the perpendicular magnetic anisotropy constant of the magneto-optical recording medium according to Example 9 and the amount of platinum added to the auxiliary magnetic film thereof.

FIGS. 59a and 59b are graphs showing the magnitude of playback signal amplitude versus playback laser power and the recording signal amplitude versus recording laser power necessary for overwriting information.

FIG. 60 is a graph showing the strength of the initialization magnetic field necessary for overwriting information.

FIG. 61 is a sectional view of the principal part of the magneto-optical recording medium according to Example 13.

FIG. 62 is a graph showing the playback C/N-recording laser power characteristic of the magneto-optical disk according to Example 14.

FIG. 63 is a table showing the composition of the coupling agent in the adhesive agent.

FIG. 69 is a graph showing the relation between the standing time and the external magnetic field sensitivity c.

FIG. 72 is a graph showing the magnetic field dependency of the C/N ratio of the magneto-optical recording medium according to Example 20.

SUMMARY OF THE INVENTION

Figure 1:
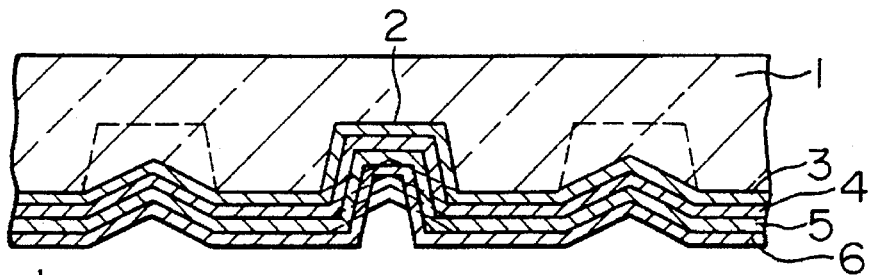
FIG. 1 is a sectional view of the principal part of the magneto-optical recording medium according to Example 1.

The first object of the present invention is to provide a magneto-optical recording medium which is capable of recording and playing back information with an inexpensive and simple head device.

The second object of the present invention is to provide a magneto-optical recording medium which enables size reduction of an initialization magnet and is capable of attaining a stable recording.

The third object of the present invention is to provide a magneto-optical recording medium which can attain a higher data transfer velocity by using a semiconductor laser of about 30–40 mW.

The fourth object of the present invention is to provide a novel optical disk which achieve the aforesaid objects of the invention due to the presence of the ROM domain and the rewrite domain mingled with each other.

The fifth object of the present invention is to provide an optical information recording medium excellent in long term storability in which two optical recording single plates or an optical recording single plate and a protective plate are strongly adhered to each other through an adhesive layer.

The sixth object of the present invention is to provide an optical information recording medium which can prevent oxygen from entering into the optical recording film out of the oxide layer and is resultantly excellent in reliability and durability.

In the case of magneto-optical recording medium comprising a perpendicular magnetic film as a magneto-optical recording film supported on a transparent substrate, complete recording or erasing of signals cannot be performed unless an external magnetic field of 200 (Oe) or more is applied. It is difficult to attain improvement of high-speed seeking properties of a head device, miniaturization and weight-saving of recording-regenerating devices, a reduction of consumption power and quantity of heat generated in recording-regenerating devices which use an electromagnet as the external magnetic field, and realization of overwrite recording by a magnetic field modulation system. In order to solve these problems, it is necessary to develop magnetic films which are magneto-optical recording films capable of being restrained from generation of bubble domain and capable of forming a complete reverse magnetic domain with a smaller external magnetic field.

The present invention solves these technical problems. One object of the invention is to provide a structure of a magnetic film capable of being restrained from generation of bubble domains.

To attain the first and the second objects described above, the present invention provides a magneto-optical recording medium comprising a transparent substrate and, supported thereon, a magneto-optical recording film comprising at least a perpendicular magnetic film based on a rare earth metal-transition metal and an auxiliary magnetic film having spontaneous magnetization which exerts, between itself and the magneto-optical recording film, an exchange coupling force, wherein the auxiliary magnetic film used is a magnetic film which readily rotates its direction of magnetization toward the direction of external magnetic field in the neighborhood of the Curie temperature of the magneto-optical recording film and has a squareness ratio of 1 or less.

DETAILED DESCRIPTION OF THE INVENTION

For the magneto-optical recording film mentioned above, there may be used a ferrimagnetic substance which is transition metal-rich in the neighborhood of the Curie temperature, a ferrimagnetic substance which is rare earth metal-rich in the neighborhood of the Curie temperature, a ferromagnetic substance which is transition metal-rich in the neighborhood of the Curie temperature and a ferromagnetic substance which is rare earth metal-rich in the neighborhood of the Curie temperature.

In order to control the exchange coupling force working between the magneto-optical recording medium and the auxiliary magnetic film, an intermediate layer comprising a magnetic oxide having the axis of easy magnetization in the film face direction and other substances also may be provided between the two films. Particularly preferred as specific materials for the intermediate layer are magnetic oxides comprising as the main component the oxide of at least one element selected from the group of elements consisting of iron, cobalt, chromium, manganese and nickel. In controlling the exchange bonding force, the film thickness of the intermediate layer is particularly important. Since a film thickness of the intermediate layer greater than 1000 Å affects adversely on recording and erasing of information, the film thickness is preferably selected at 1000 Å or less.

It is also possible, for improving the signal-to-noise ratio by increasing the apparent Kerr angle of rotation, to use as the magnetic oxide for constituting the intermediate layer those which have a higher refractive index than the substrate and to make use of the multiple interference which resultantly develops between the recording layer and the auxiliary layer, thereby to attain the enhancement of the Kerr angle of rotation.

In order to solve the above problems, the present invention provides a magneto-optical recording medium which comprises a transparent substrate and, supported thereon, a magnetic film formed of a rare earth metal-transition metal alloy wherein said magnetic film has a magnetic moment component in a direction inclined relative to the direction perpendicular to the film face and said inclined magnetic moment component and the magnetic moment component perpendicular to the film face approach zero when the magnetic film is heated to the neighborhood of its Curie temperature.

Further, as the magneto-optical recording film, there may be provided a magnetic film which has magnetic moment component in a direction inclined relative to the direction perpendicular to the magneto-optical recording film and in which said inclined magnetic moment component and the magnetic moment component perpendicular to the film face approach zero when the recording film is heated to the neighborhood of its Curie temperature. It is needless to say that the magneto-optical recording film may be one of those which have, in the film thickness direction, a portion wherein the magnetic moment points to a direction not perpendicular to the film face and a portion wherein the magnetic moment points perpendicularly to the film face, and in which the magnetic moment that points to a direction not perpendicular to the film face as well as the magnetic moment perpendicular to the film face both approach zero; when the film is heated to its neighborhood of the Curie temperature. In this case, it is preferable that, when the temperature at which the magnetic moment that points perpendicularly to the film face is designated as Tc, the magnetic moment that points in a direction not perpendicular to the film face approaches zero in the temperature range of Tc ±50° C.

Further, a magnetic film may be provided as the magneto-optical recording film, in place of the magnetic film mentioned above, which has at a part along the film thickness direction, a portion having a lower perpendicular magnetic anisotropic energy than the other portion.

More particularily, a magnetic film satisfying the conditions described below may be provided as the magneto-optical recording film: that is, a magnetic film in which, when the external magnetic field strength is designated as $H_{ex}$, the domain wall coercive force at the measuring temperature as $H_c$, the perpendicular anisotropic magnetic field at the measuring temperature as $H_k$, the direction perpendicular to the film face as 0° and the angle of rotation of the external magnetic field $H_{ex}$ from the direction perpendicular to the film face as θ, and when the magnetic torque T acting on the supporting axis of a sample is determined with a magnetic torque meter while an external magnetic field of a strength specified by $H_c<H_{ex}<H_k$ is being rotated round the supporting axis of the sample, either a region satisfying $\partial^2T/\partial\theta^2<0$ exists in the range of 0°≦θ≦90° and in the range of 180°≦θ≦270° (provided that, when $\theta_0$ satisfying $\partial T(\theta_0)/\partial\theta=0$ is present, a region satisfying $T(\theta_0)<T_{max}$ exists), or a region satisfying $\partial^2T/\partial\theta^2>0$ exists in the range of 360°≧θ≧270° and in the range of 180°≧θ≧90° (provided that, when $\theta_0$ satisfying $\partial T(\theta_0)/\partial\theta=0$ is present, a region satisfying $T(\theta_0)>T_{min}$ exists), provided that the conditions satisfying the above equations are not those of the non-differentiable point associated with the move of magnetic domain wall, and the torque components satisfying the above equations approach zero at the stage where the magnetic film is heated up to the neighborhood of the Curie temperature.

Furthermore, a magnetic film which satisfies the conditions described below may be provided on the transparent substrate: that is, when the perpendicular magnetic moment of the magnetic film is saturation magnetized in one direction and when the external magnetic field strength is designated as $H_{ex}$, the domain wall coercive force at the measuring temperature as $H_c$, the perpendicular anisotropic magnetic field at the measuring temperature as $H_k$, the state of said perpendicular magnetic moment being counter-parallel to the external magnetic field $H_{ex}$ as 0° and the angle of rotation of the external magnetic field $H_{ex}$ from the direction of said perpendicular magnetic moment being counter-parallel to the external magnetic field $H_{ex}$ as θ, and when the magnetic torque T acting on the supporting axis of a sample is determined with a magnetic torque meter while an external magnetic field of a strength specified by $H_{ex}<H_c<H_k$ is being rotated around the supporting axis of a sample, the greatest value of the magnetic torque T exists in $0°<\theta\leq 90°$, the minimum value of the magnetic torque T exists in $90°\leq\theta<180°$, the maximum value of the magnetic torque T exists in $180°<\theta\leq 270°$, and the smallest value of the magnetic torque T exists in $270\leq\theta<360°$, and the magnetic torque T at 0°, 180° and 360° are zero.

As is clear from these graphs, the magnetic film of the present invention has a main portion of the magnetic moment which is perpendicular to the direction of the film and furthermore, a portion different therefrom which is in inclined thereto.

Figure 77A:
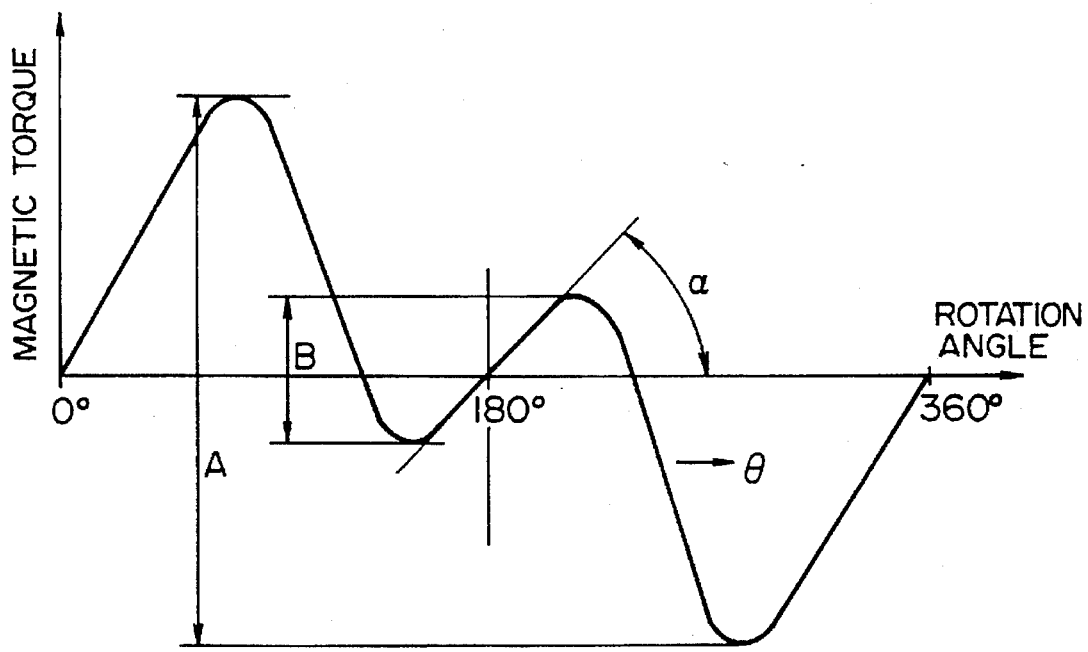
FIG. 77a and 77b are graphs illustrating the a second example of a magnetic torque curve of the magnetic film according to the present invention.
Figure 77B:
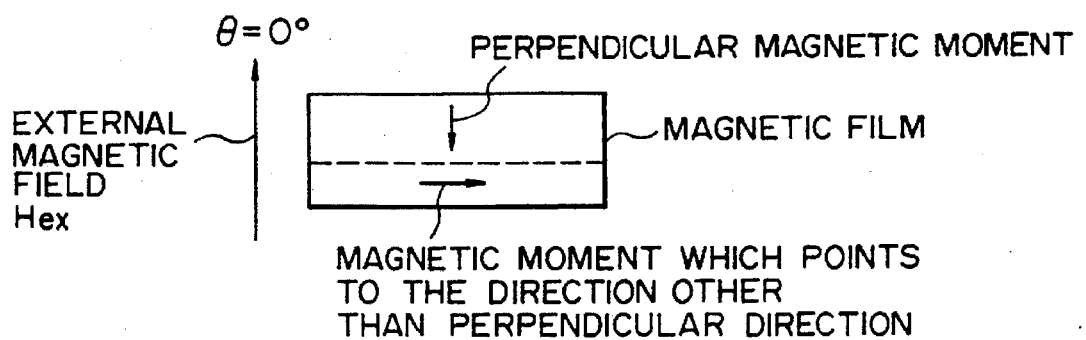

In the example shown in FIG. 77, when the perpendicular magnetic moment of the magnetic film is saturation magnetized in one direction and when the magnetic torque T acting on the supporting axis of a sample is determined with a magnetic torque meter while an external magnetic field of a strength specified by $H_{ex}<H_c<H_k$ ($H_{ex}$: the external magnetic field strength, $H_c$: the domain wall coercive force at the measuring temperature, $H_k$: the perpendicular anisotropic magnetic field at the measuring temperature) is being rotated around the supporting axis of a sample from the state of the perpendicular magnetic moment being counter-parallel to the external magnetic field $H_{ex}$ ($\theta=0°$), the greatest value of a local magnetic torque T exists in $0°<\theta\leq 90°$, the minimum value of the magnetic torque T exists in $90°\leq\theta<180°$, a local maximum value of the magnetic torque T exists in $180°<\theta\leq 270°$, and the smallest value of the magnetic torque T exists in $270°\leq\theta<360°$, and magnetic torque T at 0°, 180° and 360° is zero.

In this case, it is especially preferred to use a magnetic film of |Y|/|X|×100 being 35 or less where the difference between the greatest value and the smallest value of the magnetic torque T is designated as X and the difference between the maximum value and the minimum value of the magnetic torque T is designated as Y. Furthermore, it is especially preferred to use a magnetic film of $\alpha\leq 72°$, where the inclination of a tangent line at $\theta=180°$ of the magnetic torque curve is designated as $\alpha$.

Further, when the present invention is applied to a magneto-optical recording medium of a super-resolution type as described, for example, in Japanese Patent Kokai (Laid-open) No. 1-143042, among the 3 magnetic films constituting the magneto-optical recording medium of the super-resolution type, the third magnetic film which pertains to the preservation of a recording magnetic domain at the time of playback operation is constructed with a magnetic film wherein a rare earth element sublattice magnetization is predominant at room temperature.

The external magnetic field sensitivity can be further improved by, in addition to the structure described above, forming a layer of the oxide or nitride of a rare earth-transition metal-based amorphous alloy on the surface of at least one magnetic film of the three magnetic films constituting the magneto-optical recording medium of super-resolution type, or providing an auxiliary magnetic film which exerts, between its portion contacting any of the above-mentioned three magnetic films and the contacted portion of the magnetic film, an exchange coupling force, or adding at least one non-magnetic element selected from the group consisting of platinum, niobium, neodymium, holmium, gadolinium and chromium to the third magnetic film which pertains to the preservation of the recording magnetic domains at the time of a playback operation.

The oxide layer or nitride layer mentioned above can be obtained by heat-treating any desired magnetic film in a vacuum chamber containing a controlled amount of oxygen or nitrogen. As the auxiliary magnetic film mentioned above, there may be used a rare earth metal-transition metal amorphous alloy amorphous magnetic film in which a transition metal sublattice magnetization is predominant at a temperature where recording magnetic domains are formed in the third magnetic film, or one which has a magnetic moment component that points toward the direction of a recording external magnetic field applied to the third magnetic film, at a temperature where recording domains are formed in the third magnetic film.

The external magnetic field sensitivity of a magneto-optical recording medium can be improved, additionally, by devising a suitable method for drying treatment of the transparent substrate and proper timing from the drying treatment until completion of the film formation. That is, in a process for producing a magneto-optical recording medium which comprises forming a transparent substrate from a macro-molecular compound and then vacuum-forming a laminate of thin films comprising at least a perpendicular magnetic film on the preformat pattern-carrying surface of a transparent substrate, a preferred procedure comprises, after forming the transparent substrate, placing the substrate in a baking furnace, heating the substrate at a temperature of 80° C. and at atmospheric pressure for at least 4 hours to perform dehydration treatment, taking it out of the baking furnace into an environment of a temperature of 20° C. and relative humidity of 60% and then vacuum forming the thin film for 50 minutes.

Another adoptable procedure comprises, after forming the transparent substrate, placing the substrate in a vacuum chamber, heating the substrate under a vacuum of 20 Pa or below at 80° C. for at least 1 hour to perform dehydration treatment, taking it out of the vacuum chamber into an environment of a temperature of 20° C. and relative humidity of 60% and then vacuum forming the film for 50 minutes.

Further, when a transparent substrate comprising a transparent glass plate and a transfer layer of a preformat pattern formed out of a macro-molecular compound provided onto the one side of the glass plate is used, in a process for producing a magneto-optical recording medium which comprises, after preparing the substrate, vacuum-forming a laminate of thin films comprising at least a vertical magnetization film on the preformat pattern of the transfer layer, a preferred procedure comprises, preparing a transparent glass substrate, placing the glass substrate in a baking furnace, heating the substrate at a temperature of 80° C. and at atmospheric pressure for at least 4 hours to perform dehydration treatment, taking it out of the baking furnace into an environment of a temperature of 20° C. and a relative humidity of 60% and then vacuum forming the thin films for at least 4 hours.

To attain the third object described above, the present invention provides a magneto-optical recording medium of a single plate structure or an air-sandwich structure which comprises a transparent substrate and, formed thereon, a magnetic enhancement layer, a magnetic layer which is a magneto-optical recording film, a heat control layer and a reflecting layer laminated successively from the transparent substrate side, wherein the film thickness of the magnetic enhancement layer is adjusted to 70–80 nm, that of the magnetic layer to 10–20 nm, that of the heat control layer to 20–100 nm and that of reflecting layer to 50 nm or less and the Curie temperature of the magnetic layer is adjusted to 300° C. or below.

To obtain the fourth object described above, the present invention provides an optical disk comprising a reloadable optical disk and a disk for exclusive use in playback (hereinafter, playback—only disk), which have been stuck together. The reloadable disks include a phase change optical disk, a magneto-optical disk, etc. The recording film used in the former is a chalcogenide a film, namely, a film constituted of such an element as Ge, Sb, Te, Sn, In and the like. The recording film used for the latter is a film of alloy rare earth metal/transition metal, more specifically a film comprising a combination of Tb, Gd, Dy etc. as the rare earth metal with Fe, Co, Ni etc. as the transition metal.

The material used for the substrate of a reloadable optical disk or a playback—only optical disk is polycarbonate or PMMA (poly(methyl methacrylate)). The recording film can be prepared efficiently, in a large quantity and with good reproducibility by means of high frequency sputtering or direct current sputtering. In a playback—only disk, a film having a high reflectance, such as that of Al, Au etc., is formed on the substrate as a film corresponding to the recording film of a reloadable optical disk.

By using the optical disk according to the present invention, the user can read an application program from the playback—only optical disk side and load it on a hard disk (magnetic disk) in a personal computer. The user can write new information into the reloadable disk side or perform erasing and rewriting while running the loaded program.

To attain the fifth object, the present invention provides an optical information recording medium which comprises two optical recording single plates each comprising a replica substrate and one or plural layers of thin film containing at least a recording layer or a reflecting layer adhered to the preformat pattern-carrying surface of the substrate, the two single plates being stuck together by having the two replica substrates affixed to each other via an adhesive layer so that the thin films face inside, and an optical information recording medium which comprises an optical recording single plate and a protective plate formed out of the same material as that of the replica substrate, the replica substrate and the protective plate being affixed to each other via an adhesive layer so that the thin film faces inside, wherein the adhesive agent constituting the adhesive layer is incorporated with a silane coupling agent or a titanium coupling agent.

Further, the present invention provides an optical information recording medium which comprises two optical recording single plates each including a replica substrate and one or plural layers of thin film containing at least a recording layer or a reflecting layer, adhered to the preformat pattern-carrying surface of the substrate, the two replica substrates being stuck to each other via an adhesive layer so that the thin films face inside, and an optical information recording medium which comprises the aforesaid optical recording single plate and a protective plate formed out of the same material as that of the replica substrate, the replica substrate and the protective plate being affixed to each other via an adhesive layer so that the thin films face inside, wherein the adhesive agent constituting the adhesive layer is incorporated with an inorganic filler surface-treated with a silane coupling agent or a titanium coupling agent.

To attain the sixth object described above, according to the present invention, a layer of oxide of at least one metal or semimetal selected, for example, from the group consisting of Si, Zr, Y, Mg, Ti, Ta, Ca and Al and a layer of nitride of at least one metal or semimetal selected, for example, from the group consisting of Si, Zr, Y, Mg, Ti, Ta, Ca and Al are successively formed between the transparent substrate and the magneto-optical recording film mentioned above.

According to the means for attaining the first object mentioned above, a magnetic film which readily rotates its magnetization direction toward the direction of an external magnetic field in the neighborhood of the Curie temperature of the magneto-optical recording film and has a squareness ratio of exerting an exchange bonding force on the magneto-optical recording film of 1 or less is used as the auxiliary magnetic film. Consequently, the direction of magnetization of the auxiliary film and, in its turn, the direction of magnetization of the magneto-optical recording film can be switched upward or downward with a weaker external magnetic field as compared with the case wherein a magnetic film of a squareness ratio of 1 (namely, a vertical magnetization film) is used. Accordingly, the external magnetic field sensitivity of the medium is improved, and overwrite recording through a light intensity modulation system becomes possible by using a weak external magnetic field. Further, an overwrite recording through a magnetic field strength modulation system, which has been regarded as difficult to put into practice, becomes possible.

Hereunder, the action of the means constructed to attain the first object mentioned above is described in detail with reference, as examples, to a case wherein a ferrimagnetic substance which is transition metal rich in the neighborhood of the Curie temperature is used and to a case wherein a ferrimagnetic substance which is rare earth metal rich in the neighborhood of the Curie temperature is used as the magneto-optical recording film.

An amorphous alloy based on a rare-earth metal/transition metal shows as its magnetic property ferrimagnetism, in which the partial magnetization possessed by the rare earth element (heavy rare earth metal) and that possessed by the transition metal are counter-parallel. The direction of magnetization of the medium as a whole is observed as the difference between the partial magnetization of the rare earth metal and the partial magnetization of the transition metal and, depending on the relative magnitude of these partial magnetizations, the direction of magnetization as a whole becomes either the same as the direction of partial magnetization of the rare earth metal (that is, RE-rich) or the same as the direction of partial magnetization of the transition metal (that is, TM-rich). Further, since the partial magnetization of a rare earth metal has a higher dependency on temperature than that of a transition metal, the alloy sometimes has a compensation temperature, at which it inverts the direction of magnetization, between room temperature and a specific temperature (Curie temperature) at which the alloy loses magnetism and sometimes does not have said compensation temperature, depending on the composition of the alloy. Further, the coercive force of a medium also varies depending on the relative magnitude of magnetization. In the case of an alloy which is TM-rich at room temperature, the medium reduces its coercive force as the temperature increases from room temperature and loses the coercive force at the Curie temperature. On the other hand, some of the alloys which are RE-rich at room temperature exhibit a magnetic compensation point at which the coercive force diverges to infinity, between room temperature and Curie temperature, and become RE-rich at temperatures lower than the magnetic compensation point and become TM-rich at temperatures higher than the magnetic compensation point.

In an auxiliary magnetic film based on a noble metal-transition metal, the magnetization is in the in-plane direction (that is, the direction parallel to the film face of the auxiliary magnetic film) before an external magnetic field is applied. When an external magnetic field is applied to a magnetic film brought up to the neighborhood of the Curie temperature, the direction of magnetization rises from the in-plane direction and a magnetic moment component of the external magnetic field direction is produced. When the external magnetic field is removed, the direction of magnetization returns to the in-plane direction again.

The principle of overwrite of signals in a magneto-optical recording medium comprising a magneto-optical recording film which includes a ferrimagnetic substance which is TM-rich at least in the neighborhood of the Curie temperature and the above-mentioned auxiliary magnetic film laminated thereon will be described below with reference to FIG. 73. In the Figure, numeral 4 denotes a magneto-optical recording film, numeral 5 an auxiliary magnetic film, the empty arrow in the magneto-optical recording film 4 signifying the partial magnetization of the rare earth metal and the full arrow signifying the partial magnetization of transition metal. The length of the respective arrows indicates the magnitude of respective partial magnetizations.

Figure 73:
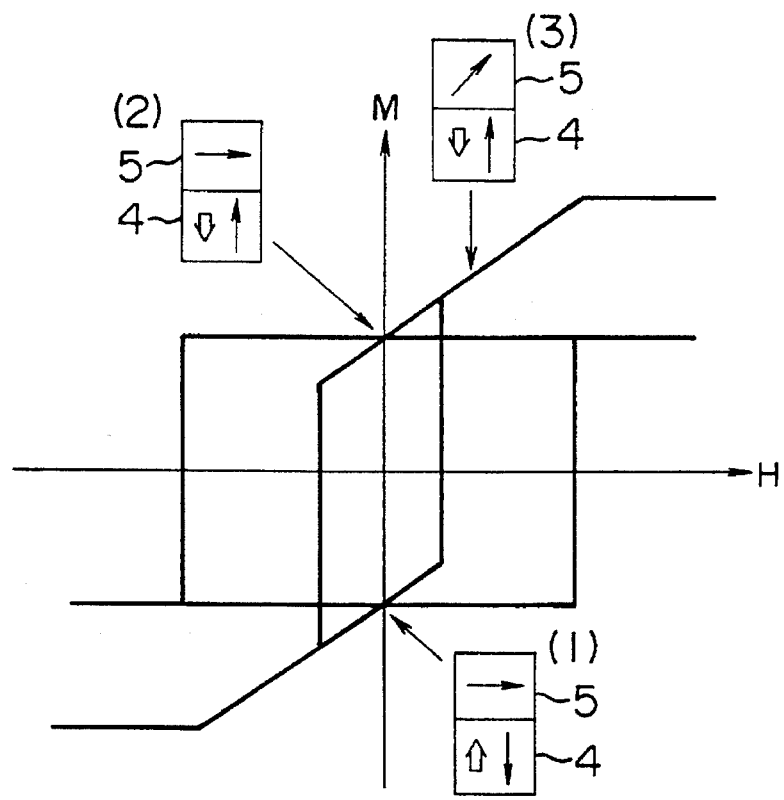
FIG. 73 is a diagram for illustrating the principle of overwrite through the magnetic field strength modulation system of a magneto-optical recording medium having an auxiliary magnetic film.

When the state of FIG. 73(1) is taken as the erasing state and the state of FIG. 73(2) as the recording state, and when an external magnetic field H of increasingly larger strength is applied upward (i.e., positive direction) to a portion which is in the erasing state of FIG. 73(1) while the auxiliary magnetic layer 5 and the magneto-optical recording film 4 are being brought up to the neighborhood of Curie temperature by irradiating a laser beam of constant strength to the portion, the direction of magnetization of the auxiliary magnetic layer 5 rises upward from the in-plane direction to produce a magnetic moment component of an external magnetic field direction. Consequently, the exchange bonding force between the magnetization of the layer 5 and the partial magnetization of the transition metal in the magneto-optical recording film 4 increases gradually and, at a stage where an external magnetic field of a certain specific strength is applied the partial magnetization of the transition metal in the magneto-optical recording film 4 reverses its direction (to upward), resulting in the state of FIG. 73(3), wherein the magnetization M of the whole is positive. Thereafter, when the external magnetic field H is removed and the auxiliary magnetic film 5 and the magneto-optical recording film 4 are cooled, the direction of magnetization of the auxiliary magnetic film 5 turns back to the in-plane direction and the direction of the magneto-optical recording film 4 remains upward (as shown in FIG. 73(2)). On the other hand, when an upward external magnetic field H is applied to a portion which is in the recording state of FIG. 73(2) while the temperatures of the auxiliary magnetic layer 5 and the magneto-optical recording film 4 are being raised up to the neighborhood of Curie temperature by irradiating a laser beam of constant strength to the portion, no change takes place because the magnetization of the magneto-optical recording film 4 coincides with the external magnetic field direction. Thus, recording can be performed by conducting the above-mentioned operations, irrespective of the state of magnetization of the magneto-optical recording film 4 at the initial state.

On the other hand, when an external magnetic field H of increasingly larger strength is applied to the left (negative direction) to a portion which is in the recording state of FIG. 73(2) while the temperatures of the auxiliary magnetic layer 5 and the magneto-optical recording film 4 are being raised up to the neighborhood of Curie temperature by irradiating a laser beam of constant strength to the portion, the direction of magnetization of the auxiliary magnetic layer 5 rises to the left from the in-plane direction, producing a magnetic moment component of an external magnetic field direction. Consequently, the exchange bonding force between the magnetization of the layer 5 and the partial magnetization of the transition metal in the magneto-optical recording film 4 increases gradually and, at a stage where an external magnetic field of a certain specific strength is applied, the partial magnetization of the transition metal in the magneto-optical recording film 4 reverses its direction upward, resulting in a state wherein the magnetization M of the whole is negative. Thereafter, when the external magnetic field H is removed and the auxiliary magnetic film 5 and the magneto-optical recording film 4 are cooled, the direction of magnetization of the auxiliary magnetic film 5 turns back to the in-plane direction and the direction of magnetization of the magneto-optical recording film 4 is kept to the right (that is, the state of FIG. 73 (1)). On the other hand, when an external magnetic field H is applied downward to a portion which is in the erasing state of FIG. 73(1) while the temperatures of the auxiliary magnetic layer 5 and the magneto-optical recording film 4 are being raised up to the neighborhood of Curie temperature by irradiating a laser beam of constant strength to the portion, no change takes place because the magnetization of the magneto-optical recording film 4 is in the downward direction from the beginning. Thus, erasing is performed by conducting the above-mentioned operations, irrespective of the state of magnetization of the magneto-optical recording film 4 at the initial state.

As shown in FIG. 73, a magneto-optical recording medium comprising an auxiliary magnetic film 5 and a magneto-optical recording film 4 in lamination undergoes inversion of magnetization at an external magnetic field of markedly smaller magnitude owing to the exchange bonding force working between the two films, as compared with a magneto-optical recording medium comprising a single layer of magneto-optical recording film. Therefore, the magneto-optical recording medium shown in the first means described above is capable of overwrite-recording through the magnetic field modulation system by using a weak external magnetic field. Although the above explanation was given with reference to a magneto-optical recording medium which is TM-rich at room temperature as an example, the overwriting of signals can be performed based on a similar principle with a magneto-optical recording medium which is RE-rich also at room temperature and has a compensation point between room temperature and the Curie temperature. Further, although the state of FIG. 73(1) was taken as the erasing state and the state of FIG. 73(2) as the recording state in the above explanation, when conversely the state of FIG. 73(1) is taken as the recording state and the state of FIG. 73(2) as the erasing state, the overwriting of signals can be performed based on a similar principle by reversing the direction of application of the external magnetic field H.

Next, the principle for the overwriting of signals in a magneto-optical recording medium comprising a magneto-optical recording film comprising a ferrimagnetic substance which is RE-rich at least in the neighborhood of the Curie temperature and an auxiliary magnetic film 5 laminated thereon is described below with reference to FIGS. 74–76. The meanings of reference numerals in the Figures are the same as in FIG. 73.

Figure 74:
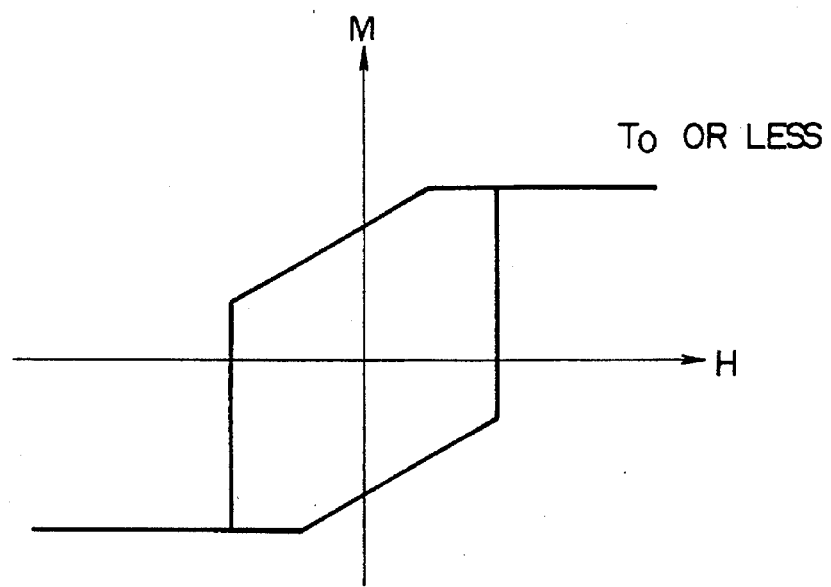
FIG. 74 is a diagram for illustrating the recording and erasing characteristics at a low temperature of a magneto-optical recording film which is rare-earth rich at immediately below the Curie temperature.
Figure 75:
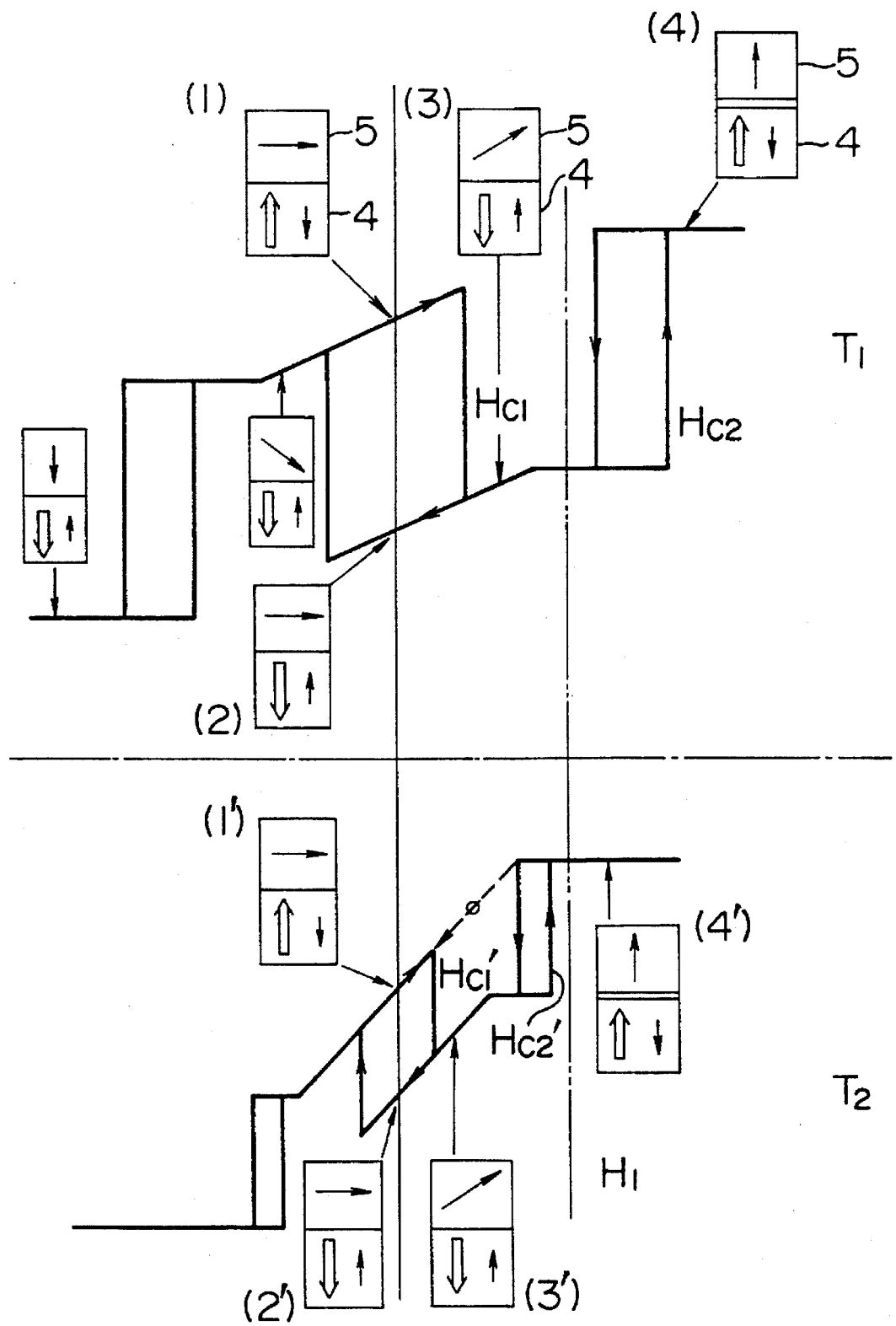
FIG. 75 is a diagram for illustrating the principle of overwrite through the an optical intensity modulation system of a magneto-optical recording medium having an auxiliary magnetic film.

This magneto-optical recording medium has an M-H loop as shown in FIG. 74 up to a certain temperature $T_0$ which is lower than the Curie Temperature $T_c$, but has an M-H loop as shown in FIG. 75 in the range of temperature from that temperature $T_0$ to the Curie temperature $T_c$. When the state of FIG. 75(1) is taken as the erasing state and that of FIG. 75(2) as the recording state and when an external magnetic field H of increasingly greater strength is applied upward (that is in the positive direction) to a portion which is in the erasing state of FIG. 75(1) while a laser beam of an intensity such that the medium temperature $T_1$ satisfies $T_0<T_1<T_c$ is being irradiated to the portion, the direction of magnetization of the auxiliary magnetic layer 5 rises upward from the in-plane direction, producing a magnetic moment component in the external magnetic field direction. Consequently, the exchange bonding energy between the magnetization of the layer 5 and the partial magnetization of the transition metal in the magneto-optical recording film increases gradually and, at a stage where an external magnetic field $Hc_1$ of a certain specific strength is applied, the partial magnetization of the transition metal in the magneto-optical recording film reverses its direction (to upward) and the partial magnetization of the rare earth metal becomes downward, resulting in the state of FIG. 75(3), wherein the magnetization M of the whole is in downward direction. Thereafter, when the auxiliary magnetic film 5 and the magneto-optical recording film 4 are cooled and the external magnetic field is removed, the direction of magnetization of the auxiliary magnetic film 5 turns back to the in-plane direction and the direction of magnetization of the magneto-optical recording film 5 is kept downward as before (that is, the state of FIG. 75(2)). When, starting from the state of FIG. 75(3), a still stronger external magnetic field H is applied upward, at the stage where an external magnetic field $Hc_2$ of a certain strength is applied, the energy based on the interaction between the external magnetic field H and the magneto-optical recording film 4 becomes higher than the energy corresponding to the exchange bonding force which has been stored at the interface magnetic domain wall between the auxiliary magnetic layer 5 and the magneto-optical recording film 4. As a result, the partial magnetization of the auxiliary magnetic layer 5 turns completely toward the external magnetic field direction and, simultaneously therewith, the partial magnetization of the rare earth metal in the magneto-optical recording film reverses its direction upward, resulting in the state of FIG. 75(4). Thereafter, when the auxiliary magnetic film 5 and the magneto-optical recording film 4 are cooled and the external magnetic field H is removed, the direction of magnetization of the auxiliary magnetic film 5 turns back to the in-plane direction, the energy corresponding to the exchange bonding force which has been stored at the interface magnetic domain wall between the auxiliary magnetic layer 5 and the magneto-optical recording film 4 again becomes higher than the energy based on the interaction between the external magnetic field H and the magneto-optical recording film 4, and the partial magnetization of the rare earth metal in the magneto-optical recording film 4 reverses its direction downward, resulting in the state of FIG. 75(2). Also when a strong external magnetic field H is applied to a portion which is in the recording state of FIG. 75(2), the state of FIG. 75(4) is formed once in a similar manner to the above. However, when the auxiliary magnetic film 5 and the magneto-optical recording film 4 are cooled and the external magnetic field H is removed, it returns to the previous state of FIG. 75(2). Thus, recording is performed by conducting the above-mentioned operations, irrespective of the state of magnetization of the magneto-optical recording film 4 at the initial stage.

On the other hand, when an external magnetic field H of increasingly higher strength is applied upward (that is, in positive direction) to a portion which is in the erasing state of FIG. 75(1') while a laser beam of such an intensity that the temperature of the medium $T_2$ satisfies $T_1<T_2<T_c$ is being irradiated to the portion, the direction of magnetization of the auxiliary magnetic layer 5 rises from the in-plane direction, producing a magnetic moment component of the external magnetic field direction. Consequently, the exchange bonding energy between the magnetization of the layer 5 and the partial magnetization of the transition metal in the magneto-optical recording film 4 increases gradually and, at the stage where an external magnetic field $Hc'_1$ of a certain specific strength is applied, the partial magnetization of the transition metal in the magneto-optical recording film 4 reverses its direction upward and the partial magnetization of the rare earth metal turns to the downward direction, resulting in the state of FIG. 75(3'), wherein the magnetization M of the whole is in the downward direction. Thereafter, when, starting from the state of FIG. 75(3'), a still stronger external magnetic field H is applied upward, at the stage where an external magnetic field $Hc'_2$ of a certain specific strength is applied the energy based on the interaction between the external magnetic field H and the magneto-optical recording film 4 becomes higher than the energy corresponding to the exchange bonding force which has been stored at the interface magnetic domain wall between the auxiliary magnetic layer 5 and the magneto-optical recording film 4. As the result, the partial magnetization of the auxiliary magnetic layer 5 turns completely to the external magnetic field direction and simultaneously the partial magnetization of the rare earth metal in the magneto-optical recording film 4 reverses its direction upward, resulting in the state of FIG. 75(4'). Thereafter, when the auxiliary magnetic film 5 and the magneto-optical recording film 4 are cooled and the external magnetic field H is removed, the direction of magnetization of the auxiliary magnetic film 5 turns back to the in-wall direction, while the partial magnetization of the magneto-optical recording film 4 is quenched as it was in the state of FIG. 75(4). Thus, the system returns to the erasing state of FIG. 75(1') jumping over the broken line portion of FIG. 75. Also when a strong external magnetic field H is applied to a portion which is in the recording state of FIG. Fig. 75(2'), the state of FIG. 75(4') once results similarly to the above, and thereafter, when the external magnetic field H is removed and the auxiliary magnetic film 5 and the magneto-optical recording film 4 are cooled, the system returns to the erasing state of FIG. 75(1') jumping over the broken line portion (← • −) of FIG. 75. Thus, erasing can be performed by conducting the above operations, irrespective of the state of magnetization of the magneto-optical recording film 4 at the initial state.

As shown in FIG. 75, the magnitude $Hc_2'$ of an external magnetic field which causes magnetization inversion in the magneto-optical recording film 4 at a high temperature (at $T_2$) is smaller than the magnitude $Hc_2$ of an external magnetic field which causes magnetization inversion in the magneto-optical recording film 4 at a low temperature (at $T_1$), because the coercive force of the magneto-optical recording film 4 decreases at an elevated temperature: thus, $Hc_2'<Hc_2$. Accordingly, the external magnetic field $H_1$ is adjusted so as to satisfy $Hc_2'<H_1<Hc_2$ and, simultaneously, the low level power of the laser beam is adjusted so as to raise the temperature of the auxiliary magnetic layer 5 and magneto-optical recording film 4 to $T_1$ and the high level power of laser beam is adjusted so as to raise the temperature of the auxiliary magnetic layer 5 and the magneto-optical recording film 4 to $T_2$, whereby an overwrite-recording through the light intensity modulation system which requires no initialization magnetic field becomes possible.

Figure 76A:
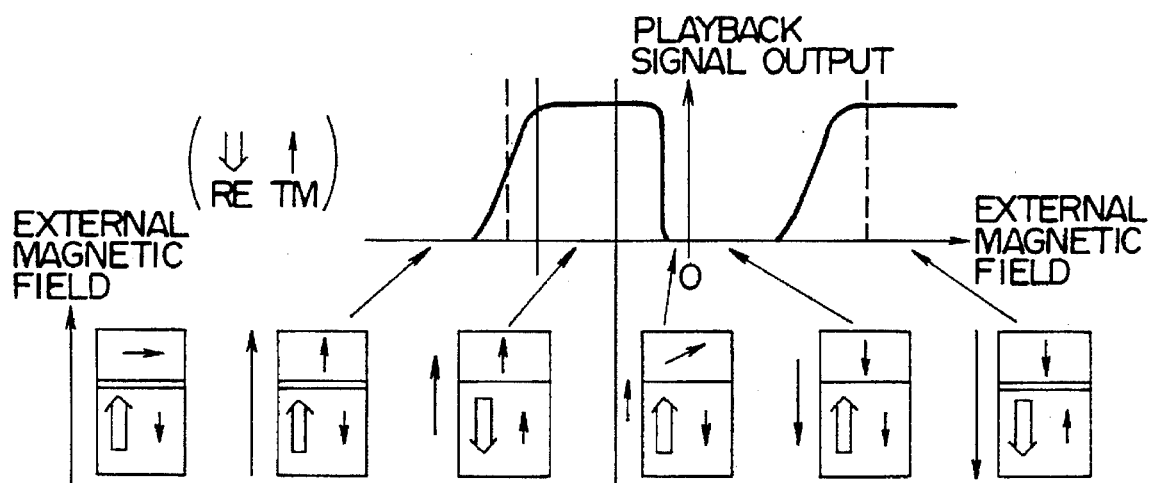
FIG. 76a and FIG. 76b are diagrams for illustrating the method for selecting the external magnetic field strength and the laser power.
Figure 76B:
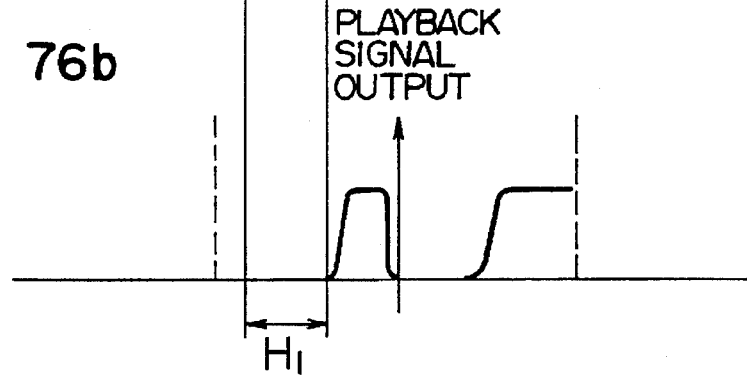

The external magnetic field $H_1$, the low level power of the laser beam and the high level power of the laser beam respectively necessary for enabling the above-mentioned overwrite recording can be determined as follows. First, the low level power of the laser beam and the high level power of laser beam are set appropriately so as to satisfy $T_0<T_1<T_2<Tc_0$. Then, signal recording is conducted by variously changing the strength of the external magnetic field H and the direction of application of the field. Subsequently, the recorded signals are read out, and the correlation between the external magnetic field H and the output value of playback signal is plotted, whereby graphs shown in FIGS. 76(a) and 76(b) are obtained. Herein, the strength of the external magnetic field H which makes signal recording possible at temperature $T_1$ and makes signal recording impossible at temperature $T_2$ is the strength of the magnetic field $H_1$ necessary for enabling the overwrite recording of signals. The value of the external magnetic field $H_1$ varies depending on temperatures $T_1$ and $T_2$. Accordingly, the above-mentioned test is made repeatedly while variously changing the low level power and the high level power of the laser beam and variously changing the temperatures $T_1$ and $T_2$ to select an optimum laser power.

To realize the overwrite recording as described above, the difference between the Curie temperature of the auxiliary magnetic film 5 and the Curie temperature of the magneto-optical recording film 4 is preferably restricted to 150° C. or less, and the smaller the difference, the more preferable. Further, though in the above explanation the state of FIG. 75(1) and (1)' was taken as the erasing state and the state of FIG. 75(2) and (2)' as the recording state, also when conversely the state of FIG. 75(1) and (1)' is taken as the recording state and the state of FIG. 75(2) and (2)' as the erasing state, the overwriting of signals can be performed based on a similar principle to the above by inverting the direction of application of the external magnetic field H.

In the case of a magnetic film which has a portion of the magnetic moment being in the direction not perpendicular to the film face, namely, a magnetic film which has a portion having a magnetic moment component in an in-plane direction in at least a part, when it is heated to the neighborhood of its Curie temperature, the magnetic moment having the component in the in-plane direction is very prone to rotate in the direction of the applied external magnetic field. Accordingly, if the magnetic film is formed so that the portion having the in-plane direction component and the portion having the magnetic moment perpendicular to the film face can be bonded by exchanging interaction, the magnetic moment perpendicular to the film face which is inherently difficult to rotate in the magnetization direction becomes easy to rotate by the influence of the magnetic moment having the in-plane direction component which is easy to rotate and, as a result, the whole film can have an excellent responsibility.

Since the magnetic moment in the in-plane direction exerts exchanging force to the neighboring magnetic moment in the direction parallel to itself, it acts to direct the neighboring magnetic moments to in-plane. However, when heated to the neighborhood of Curie temperature, magnetic susceptibility/saturation magnetization increases and, when such a property that easily inclines to the perpendicular direction by a weak external magnetic field is imparted, the exchange bonding force in the perpendicular direction is exerted to the circumference and thus, inversion of magnetization of the whole magnetic layer can be accelerated. Therefore, in order to obtain the above-mentioned effects, it becomes necessary that the in-plane component approaches zero at the neighborhood of Curie temperature, more accurately, at the neighborhood of Curie temperature of the perpendicular magnetic component in the magnetic film. If the in-plane magnetization at that temperature is great, the moment cannot be inclined and rather is suppressed by magnetization in in-plane to deteriorate the external magnetic field sensitivity. Furthermore, if the magnetic film reaches its Curie temperature at considerably lower than that temperature, the magnetic properties are lost and the effects are also lost. According to detailed experiments, it is especially preferable that the in-plane magnetization also approaches zero at Tc ±50° C. when the Curie temperature of the perpendicular magnetic component in the magnetic film is designated as Tc.

DESCRIPTION OF THE PREFERRED EMBODIMENT

Hereunder, examples embodying the means for attaining the first object mentioned above are described.

EXAMPLE 1

Example 1 of the present invention is described with reference to FIGS. 1 to 5. FIG. 1 is a sectional view of the principal part of the magneto-optical recording medium according to the present Example. As shown in the Figure, the magneto-optical recording medium of the present invention comprises a transparent substrate 1 and, successively laminated on the preformat pattern 2-carrying surface of the substrate 1, from the substrate 1 side, an enhancement film 3 comprising an inorganic dielectric substance having a higher refractive index than the substrate 1, a magneto-optical recording film 4, an auxiliary magnetic film 5 and a protective film 6.

The substrate 1 is formed into a desired shape such as a disk, card, etc. out of a plastic material such as polycarbonate, poly(methyl methacrylate), polyolefin, epoxy resin, etc. or another transparent material such as glass, etc.

On one side of the transparent substrate 1, is formed in the form of minute irregularities a preformat pattern 2 comprising a guide channel for guiding a laser spot and a prebit string for expressing the address of a recording track demarcated along the guide channel so that the tracking servo signal and the preformat signal may be optically read out. Though the preformat pattern is formed directly on one side of the transparent substrate 1 in FIG. 1, it is also possible to provide on one side of a transparent substrate formed in the form of plate a photocurable resin layer having approximately the same refractive index as that of the substrate and to transfer the preformat pattern 2 mentioned above onto the surface of the photocurable resin layer.

The enhancement film 3 is provided for the purpose of causing constructive interferences through the multiple reflections of the playback light beam between the magneto-optical recording film 4 and the transparent substrate 1, thereby to increase the apparent Kerr angle of rotation. The film 3 comprises an inorganic dielectric substance having a higher refractive index than the transparent substrate 1, for example, oxides or nitrides of silicon, aluminum, zirconium, titanium and tantalum, and formed into a film thickness of 600–1000 Å. Sputtering is particularly preferred as the means for forming the enhancement film 3.

The magneto-optical recording film 4 is formed of an amorphous alloy of a rare earth metal-transition metal having perpendicular ferrimagnetism. Particularly preferred amorphous perpendicular magnetic films based on an amorphous alloy, rare earth metal transition are those represented by the following formula $$Tb_xFe_{(100-x-y-z)}Co_yM_z$$

wherein X, Y and Z respectively satisfy the equations:

15 atomic % ≦ X ≦ 30 atomic %

5 atomic % ≦ Y ≦ 15 atomic %

0 atomic % ≦ Z ≦ 10 atomic % and M is at least one element selected from Nb, Cr and Pt.

The perpendicular magnetic film can be made to be either TM-rich or RE-rich immediately below the Curie temperature by changing the composition variously. The perpendicular magnetic film can be formed into a film thickness of 200–500 Å by sputtering a target formed out of an alloy of Tb, Fe, Co and with an additive element M, or out of a sintered body comprising these elements.

The auxiliary magnetic film 5 is formed out of a material which has a reflectance for the playback light of 70% or more and a heat conductivity at room temperature restricted to within the range of 0.05–2.0 W/cm·deg and suitably has a film thickness of 200–400 Å. That is, one of the characteristic features of the magneto-optical recording medium of the present Example consists in returning the playback light which has passed through the magneto-optical recording film 4 to the transparent substrate 1 side with the aid of the auxiliary magnetic film 5, thereby increasing the apparent Kerr angle of rotation through the Faraday effect which the incident light and returned light receive when they pass through the magneto-optical recording film 4, and thereby aiming at improving the playback CN ratio. Therefore, the higher the reflectance for the playback light, the better the obtainable result. Accordingly, the auxiliary magnetic film 5 more preferably has a reflectance of at least 70% for the playback light.

When the heat conductivity of the auxiliary magnetic film 5 is too low, difficulties arise in that the magneto-optical recording film 4 is heated excessively at the time of recording or erasing of information, which, when repeated, tends to deteriorate the magneto-optical recording film 4 (for example, to cause crystallization of the amorphous perpendicular magnetic film) or to cause the deformation of the preformat pattern 2 of the transparent substrate 1, and resultantly the playback output level becomes lower in a short period of time. On the other hand, when the heat conductivity of the auxiliary magnetic film 5 is too high, the magneto-optical recording layer 4 is brought up to the temperature necessary for recording or erasing information with difficulty results in the lowering of the recording sensitivity or in the increase of recording/playback error due to incomplete erasing of previously recorded signals and a resultant necessity of mounting a laser light source of higher power.

Figure 2:
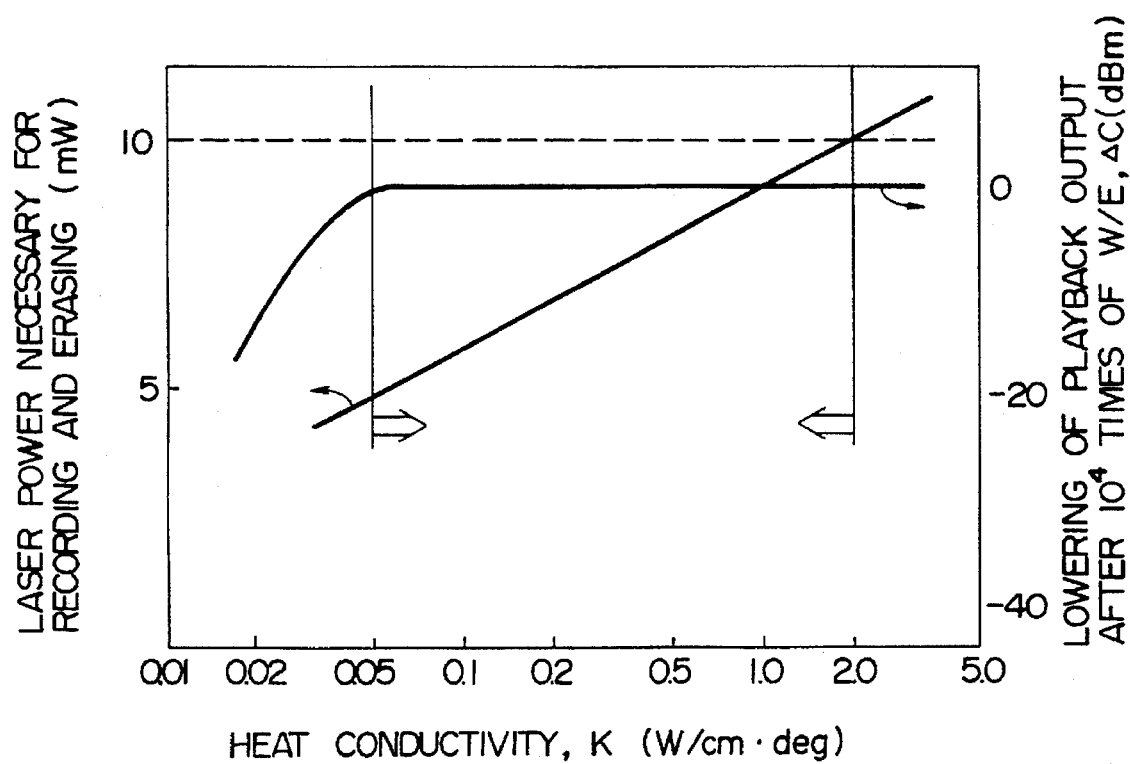
FIG. 2 is a graph showing the effect of the ferromagnetic reflecting film in Example 1.

FIG. 2 shows the relationship of the heat conductivity of the auxiliary magnetic film 5 with the lowering of playback output after 4000 times of repetition of recording/erasing operation and the laser power necessary for the operation of recording/erasing of information. As is apparent from the Figure, when an auxiliary magnetic film 5 having a heat conductivity of 0.05 W/cm·deg or less is used, the playback output lowers abruptly after 4000 times of repetition of recording/erasing operation, revealing that such a film is not usable in practice. When an auxiliary magnetic film 5 having a heat conductivity higher than 2.0 W/cm·deg is used, a laser power higher than 10 mW (film surface) is necessary for the recording/erasing of information, revealing that the film also is difficult to put into practice. From these data, the heat conductivity of the auxiliary magnetic film 5 is specified in the above-mentioned range.

As a specific example of the auxiliary magnetic film 5, mention may be made of a film of an alloy comprising at least one element selected from the group of noble metal elements consisting of Pt, Al, Ag, Au, Cu, Rh, etc. and at least one element selected from the group of transition metal elements consisting of Fe, Co, Ni, etc. An auxiliary magnetic film based on noble metal-transition metal can be prepared, by regulating the composition such that the magnetization of the film is in the in-wall direction (that is, the direction parallel to the film face of the auxiliary magnetic film) before an external magnetic field is applied, and when an external magnetic field is applied at a state heated to the neighborhood of the Curie temperature, the direction of magnetization rises from the in-wall direction, producing a magnetic moment component of the external magnetic field direction and, further, when the external magnetic field is removed, the direction of magnetization again turns back to the in-wall direction. Therefore, an auxiliary magnetic film 5 of this type changes the strength of the external magnetic field which it requires for complete erasing of previously recorded signals, depending on the ratio of the contents of the constituent elements even when the constituent elements are the same.

Figures 3, 4A, 4B:
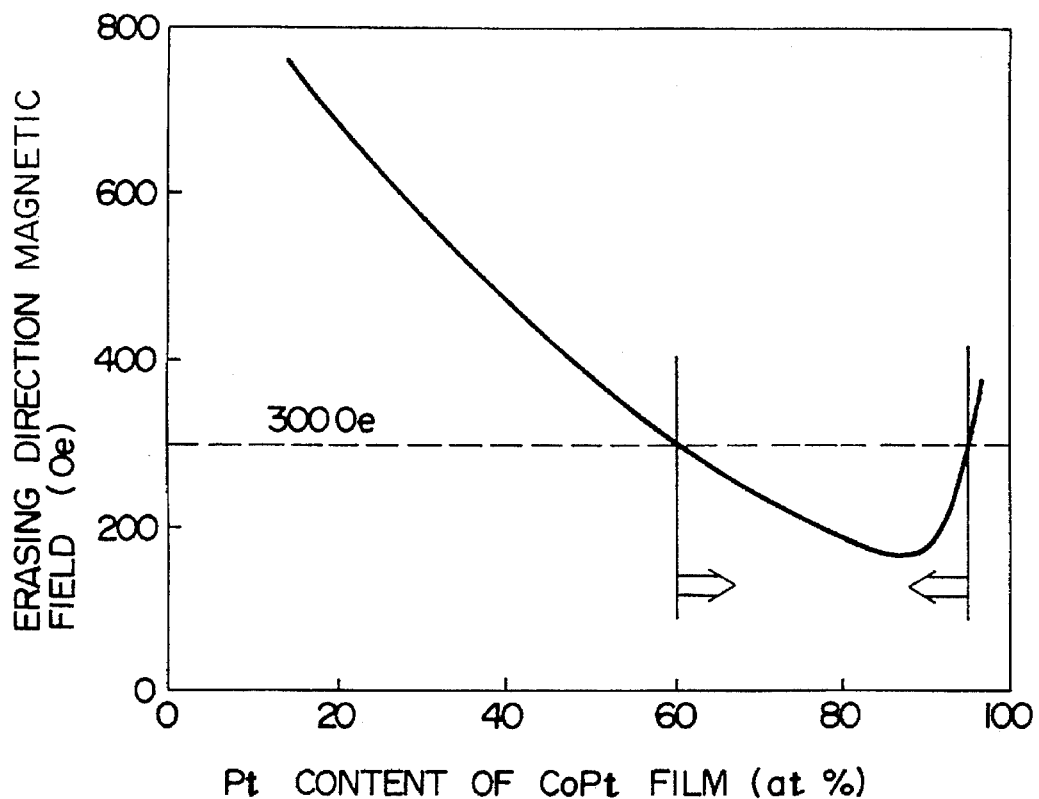
FIG. 3 is a graph showing the relation between the composition of a Pt-Co film and the magnetic field in the erasing direction in Example 1.
FIGS. 4a and 4b are diagrams illustrating magneto-optical recording media according to Experimental Example 1 and a Comparative Example, respectively.

FIG. 3 shows, with reference to a Co-Pt alloy film as an example, the relation between the Pt content of the film (film thickness: 200 Å) and the erasing direction magnetic field. The term "erasing direction magnetic field" means herein the minimum magnetic field at which recording becomes impossible when the recording of information is conducted while applying an external magnetic field of increasingly greater strength in the erasing direction, and approximately represents the magnitude of external magnetic field necessary for complete erasing of previously recorded signals. As is apparent from FIG. 3, a Pt content at which the erasing direction magnetic field becomes a minimum exists in a Co-Pt alloy film. On account of the requisite of the drive side, an external magnetic field mountable on a drive is 300 (Oe) at the highest. It can be seen from FIG. 3 that in order to erase previously recorded signals completely with such an external magnetic field, the Pt content of the Co-Pt alloy film must be adjusted to 60–95 atomic %.

The protective layer 6 is formed out of an inorganic dielectric substance similar to that used for the enhancement layer 3 or an organic material such as photocurable resin, etc. When an inorganic dielectric substance is used as the protective layer material, it is formed into a film thickness of 500–2000 Å.

Hereunder, a more specific Experimental Example and Comparative Example are shown to compare the recording-erasing characteristics of the media of the two examples.

EXPERIMENTAL EXAMPLE 1

On the preformat pattern-carrying surface of a polycarbonate substrate formed by injection molding, were successively formed by sputtering 800 Å of a SiON enhancement layer, 500 Å of a $Te_{18}Fe_{67}Co_{10}Cr_5$ amorphous perpendicular magnetic film, 200 Å of a $Pt_{80}Co_{20}$ auxiliary magnetic film and 1000 Å of a SiON protective layer, to prepare a magneto-optical recording medium shown in FIG. 4(a). The $Pt_{80}Co_{20}$ auxiliary magnetic film has a magnetic moment component perpendicular to the film face at a temperature immediately below the Curie temperature of the magnetic film, and the magnetic moment rotates under the influence of an applied external magnetic field to form a component of the external magnetic field direction and exerts an exchange coupling force on the magneto-optical recording film, mentioned above. The magnetic film has a reflectance for playback light of at least 70%. Further, since the film thickness was adjusted to 200 Å, it has a heat conductivity of 0.05–2.0 W/cm·deg at ordinary temperature. On the other hand, the $Te_{18}Fe_{67}Co_{10}Cr_5$ amorphous perpendicular magnetic film is TM-rich at a temperature immediately below the Curie temperature of the magneto-optical recording film and functions such that when the magnetic moment of the auxiliary magnetic film begins to have a component of external magnetic field direction by application of external magnetic field, an exchange bonding force forms between the magnetic moments of partial magnetization possessed by the transition metals of the two films, and thereby turns the direction of magnetization of the magneto-optical recording film toward the direction of the external magnetic field.

COMPARATIVE EXAMPLE 1

On the preformat pattern-carrying surface of a polycarbonate substrate formed by injection molding, there were successively formed, by sputtering, 800 Å of a SiON enhancement layer, 500 Å of a $Te_{18}Fe_{67}Co_{10}Cr_5$ amorphous perpendicular magnetic film and 1000 Å of a SiON protective layer in order to prepare the magneto-optical recording medium shown in FIG. 4(b).

Figure 5:
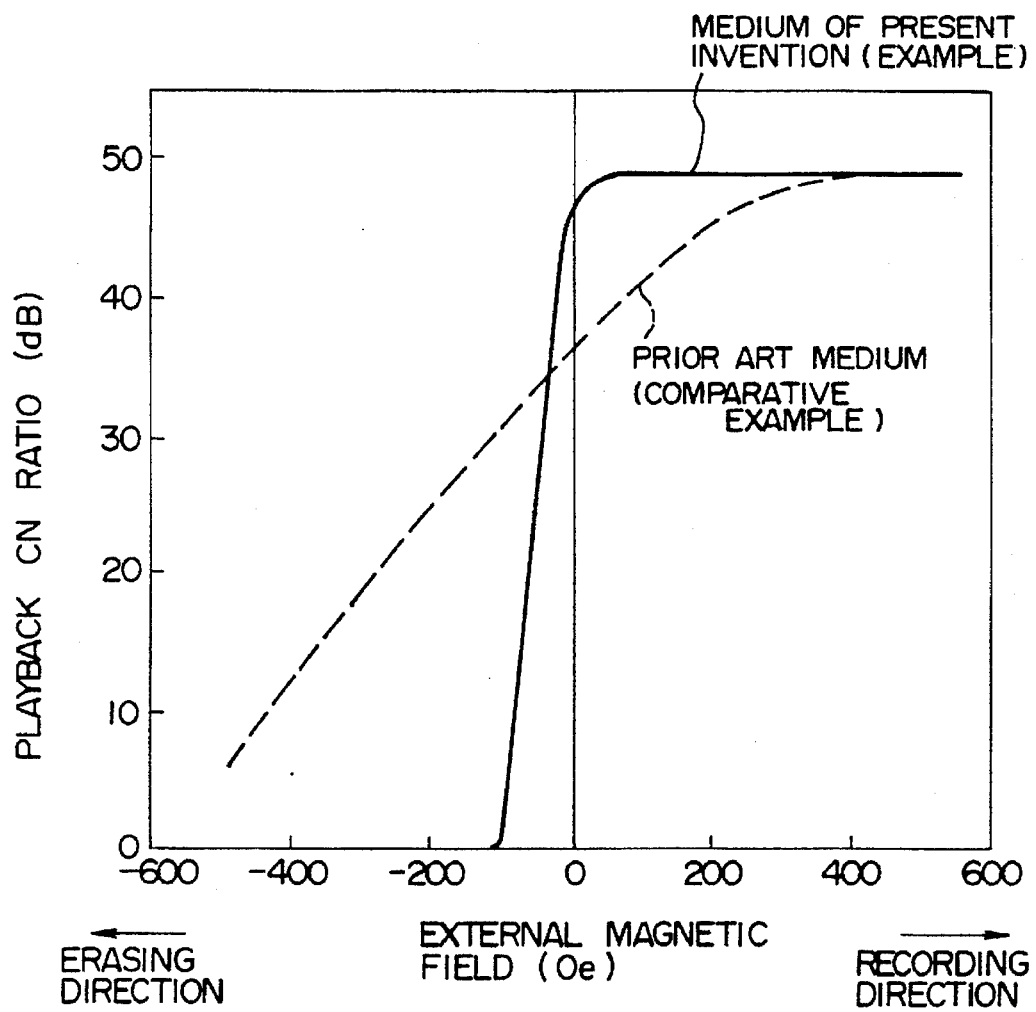
FIG. 5 is a graph showing the recording and erasing characteristics of magneto-optical recording media according to an Experimental Example and for the Comparative Example of Example 1, in comparison with one another.

FIG. 5 shows the recording-erasing characteristic of the magneto-optical recording medium of Experimental Example 1 and the recording-erasing characteristic of the magneto-optical recording medium according to Comparative Example 1. The "recording-erasing characteristic" refers herein to the change of playback CN ratio which takes place when the direction and the magnitude of an external magnetic field applied at the time of recording are changed. In FIG. 5, the direction and the magnitude of the external magnetic field applied at the time of recording are plotted as abscissas and the playback CN ratio as ordinates.

As is clear from FIG. 5, whereas in the magneto-optical recording medium of Comparative Example 1 the playback CN ratio does not reach its saturation value unless an external magnetic field of about 500 [Oe] is applied in the recording direction, in the magneto-optical recording medium of Experimental Example 1 the playback CN ratio reaches the saturation value merely by application of an external magnetic field of about 50 [Oe] in the recording direction. This reveals that the magneto-optical recording medium of the Experimental Example can perform complete recording with a weaker external magnetic field. Further, whereas the magneto-optical recording medium of Comparative Example 1 cannot attain a playback CN ratio of zero unless an external magnetic field of about 620 [Oe] is applied in the erasing direction, the magneto-optical recording medium of Experimental Example 1 can attain a playback CN ratio of zero merely by application of an external magnetic field of about 80 [Oe] in the erasing direction. This reveals that the magneto-optical recording medium of Experimental Example 1 can perform complete erasing with a weaker external magnetic field. Thus, since the recording and erasing of information can be conducted with a weak external magnetic field of about 100 [Oe] in the magneto-optical recording medium of Experimental Example 1, the medium permits overwriting through the magnetic field modulation system on the basis of the principle described above in the section of "action". Further, it can be seen that the saturation value of the playback CN ratio are approximately the same both in the magneto-optical recording medium of Experimental Example 1 and in the medium of Comparative Example 1. Thus the medium of the present Example has a sufficiently high CN ratio.

Though an enhancement film 3 was provided between the transparent substrate 1 and the magneto-optical recording film 4 in the Example 1, it may be omitted when the reflectance of the auxiliary magnetic film 5 is high and a sufficiently high playback CN ratio can be obtained.

Further, though a protective film 6 was provided on the outermost surface of the medium in the Example 1, it may be omitted when an auxiliary magnetic film 5 which is excellent in corrosion resistance is used.

Furthermore, though the auxiliary magnetic film 5 was laminated directly on the back side of the magneto-optical recording film 4 in the Example 1, a second enhancement film comprising an inorganic dielectric substance similar to that of the enhance film 3 may also be provided between the magneto-optical recording film 4 and the auxiliary magnetic film 5.

EXAMPLE 2

Figure 6:
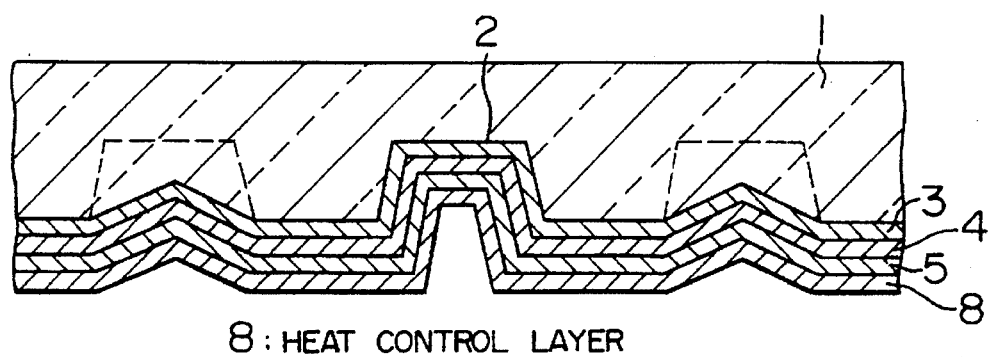
FIG. 6 is a sectional view of the principal part of the magneto-optical recording medium according to Example 2.

Example 2 of the present invention is described below with reference to FIGS. 6–17. As shown in FIG. 6, the magneto-optical recording medium of the present Example is characterized by laminating on the surface of the auxiliary magnetic film 5 a heat control layer 8 which plays the role of both a reflecting film and a protective film, in place of the protective layer 6 used in the Example 1. The other structures are the same as in the magneto-optical recording medium of the Example 1, so that the corresponding parts are respectively denoted by the same numerals without further explanation.

The heat control layer 8 is constructed of an alloy comprising at least one metallic element selected from the group of elements consisting of Al, Ag, Au, Cu and Be and at least one metallic element selected from the group of elements consisting of Cr, Ti, Ta, Sn, Si, Rb, Pe, Nb, Mo, Li, Mg, W and Zr. Particularly preferred are those formed out of Al-Ti alloy containing 6–10 atomic % of Ti and having a film thickness regulated to the range of 500–1000 Å.

Figure 7:
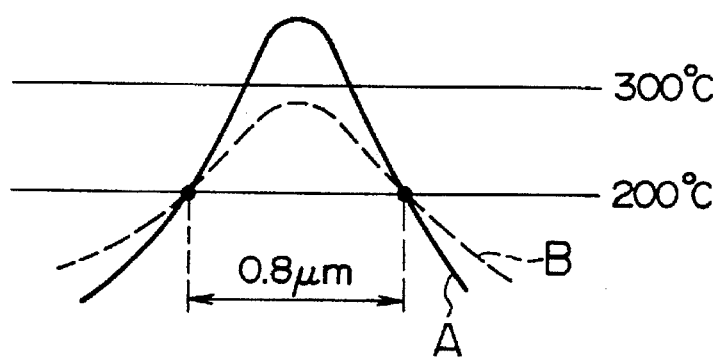
FIG. 7 is a graph illustrating the temperature distribution of the laser beam-irradiated part in Example 2.

When a Tb-Fe-Co alloy is used as the material of the magneto-optical recording film 4, the temperature in the film in the laser light-irradiated region must be raised to 200° C. or more at the time of recording or erasing of information, because the alloy of the above-mentioned composition has a Curie point of about 200° C. When the magneto-optical recording film 4 has reached such a thermal state by irradiation of recording laser light, the central part of the laser light-irradiated region is at a maximum temperature. That is, as shown in FIG. 7 for example, a record bit of a definite size (for example, having a diameter of 0.8 μm) is to be formed, the inside of the diameter must be brought to 200° C. or higher temperature. Thus, the circumferential line of a circle 0.8 μm in diameter becomes the isothermal line of 200° C. and the inside of the line is inevitably at temperatures of 200° C. or more.

At this time, the temperature of the central part of the laser light-irradiated region differs depending on the heat conductivity of the heat control layer 8. The curves in FIG. 7 schematically show the temperature distributions. The curve B of dotted line refers to a case wherein a heat control layer 8 having a relatively good heat conductivity is used and the curve B of full line to a case wherein a heat control layer 8 having a relatively poor heat conductivity is used. As is apparent from the Figure, a difference is produced in the temperature of the central part in the laser light-irradiated portion by a difference in the heat conductivity of the heat control layer 8. In other words, the maximum temperature of the magneto-optical recording film 4 can be controlled by regulating the heat conductive property (that is, heat conductivity, film thickness, etc.) of the heat control layer 8.

Figure 8:
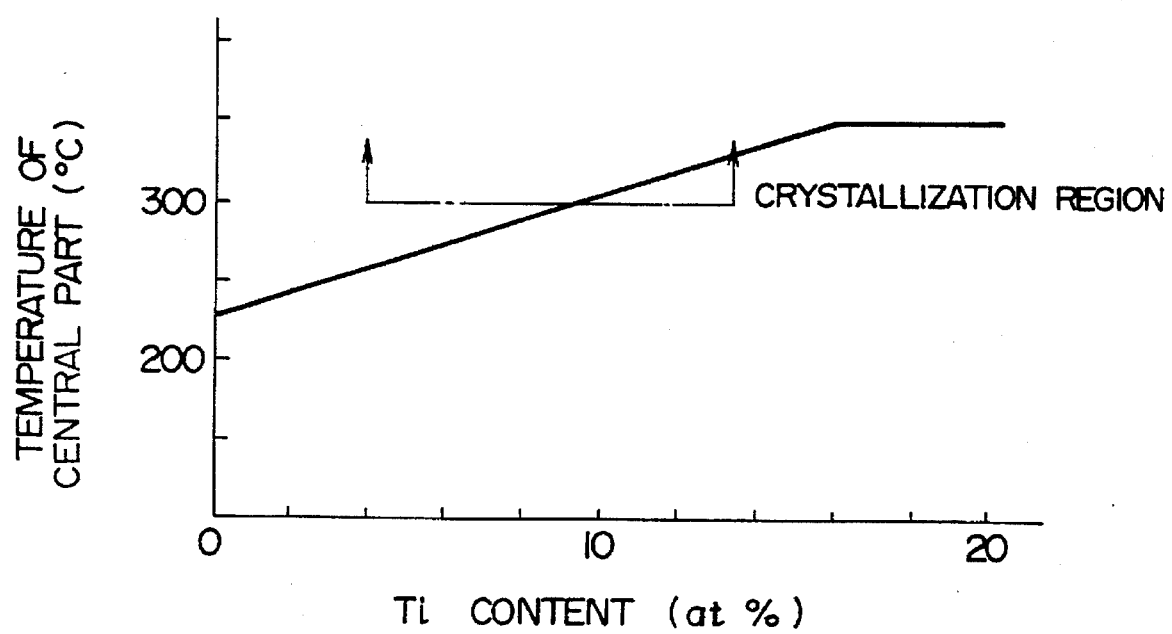
FIG. 8 is a graph showing the relation between the composition of the heat control layer and the temperature of the laser beam-irradiated part in Example 2.

FIG. 8 shows the result of investigation of the dependency of the maximum temperature of a magneto-optical recording film versus the Ti content of the heat layer 8 using a Tb-Fe-Co alloy as the magneto-optical recording film and an Al-Ti alloy as a protective film, as described above.

The numbers on the abscissa in the Figure indicate the Ti content in the Al-Ti alloy and the numbers on the ordinate indicate the temperature of the central part in the laser light-irradiated portion. The "temperature of the central part" refers herein to the temperature of the central part observed when the diameter of the region having a film surface temperature of 200° C. or more is set at 1 μm.

As described above, in a magneto-optical recording film based on $Tb_xFe_{(100-x-y-z)}Co_yM_z$, when the laser light-irradiated portion reaches to a temperature of 300° C. more, crystallization will proceed and affect adversely the recording and playback characteristic. Thus, the temperature must be controlled so as not to reach 300° C. or more. To attain this, as is clear from FIG. 8, the Ti content in the Al-Ti alloy must be restricted to 10 atomic % or less.

Figure 9:
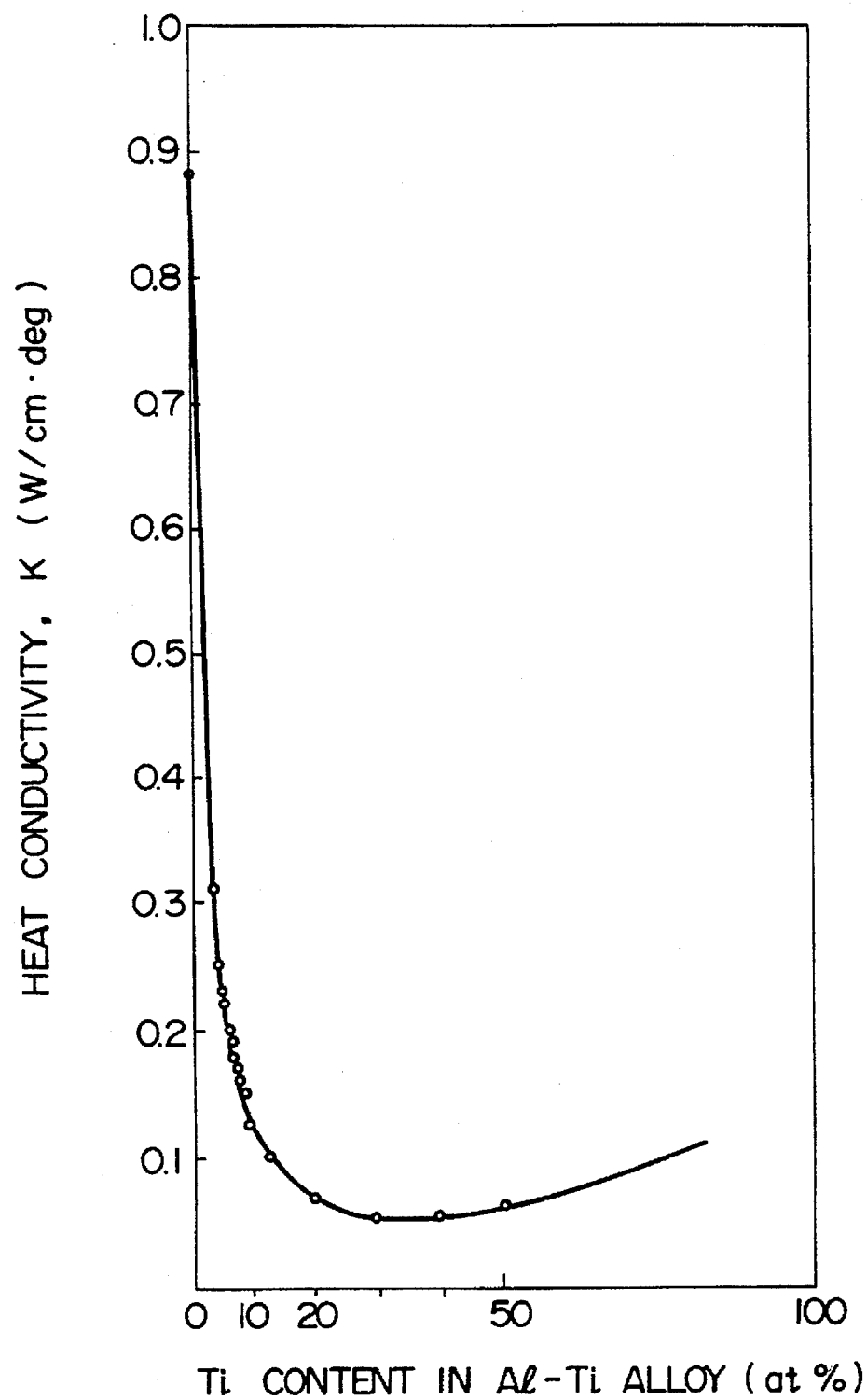
FIG. 9 is a graph showing the relation between the composition and the heat conductivity of the heat control layer in Example 2.

FIG. 9 is a graph showing the relation between the Ti content of the Al-Ti alloy and the heat conductivity K of the alloy at normal temperature. As is apparent from the Figure, the heat conductivity K of the Al-Ti alloy changes according to the Ti content, and a Ti content of 10 atomic % corresponds to a heat conductivity of 0.13 W/cm·deg or more.

The present inventors have found, on the basis of the result of various experiments, that the heat conductivity K of the heat control layer at normal temperature must be restricted to the range defined by $2.0 \geq K \geq 0.1$ W/cm·deg. When the heat conductivity K of the heat control layer at normal temperature is higher than 2.0 W/cm·deg, heat diffusion is too fast and a high laser power is necessary in recording and erasing, which is economically disadvantageous. On the other hand, when the heat conductivity K of the heat control layer at normal temperature is less than 0.1 W/cm·deg, heat diffusion is too slow on the contrary, the recording film tends to undergo relaxation of the amorphous structure and to crystallize in the course of repeated recording and playback. Therefore, the heat conductivity K of the heat control layer at normal temperature must be restricted to the range defined by $2.0 \geq K \geq 0.1$ W/cm·deg, more preferably $0.25 \geq K \geq 0.14$ W/cm·deg.

Figure 10:
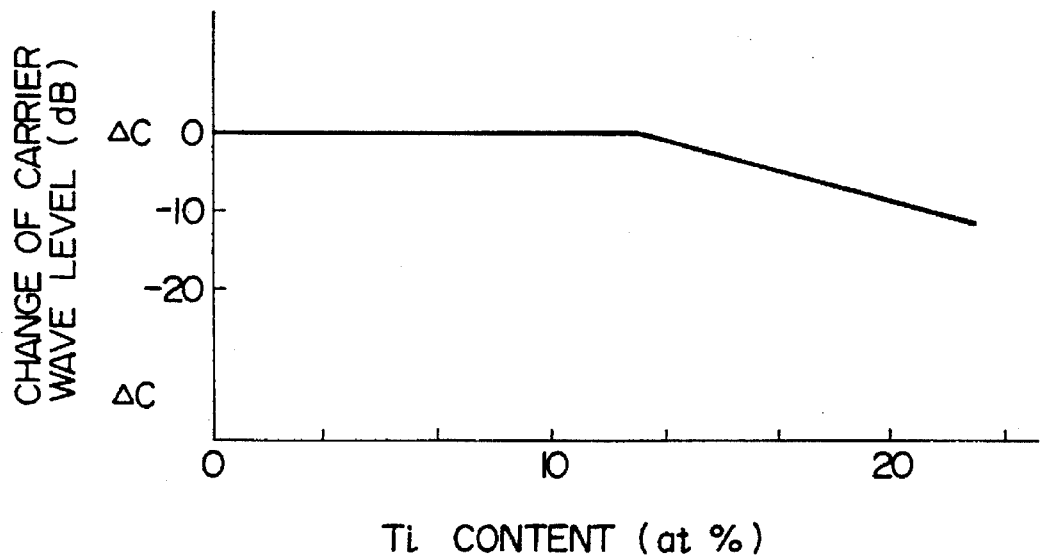
FIG. 10 is a graph showing the relation between the composition of the heat control layer and the durability to repeated recording and playback in Example 2.

FIG. 10 is a graph showing the relationship between the Ti content in Al-Ti alloy and the lowering of carrier wave level of signals recorded and played back after repeating 10,000 cycles of recording and playback, with the film thickness of the Ti-Al alloy set at 750 Å.

As is apparent from the Figure, when the Ti content of the Al-Ti alloy slightly exceeds 10 atomic %, the carrier wave level tends to lower. This is presumably due to the development of relaxation of the amorphous structure of the recording film and ensuing progress of crystallization.

In the present magneto-optical recording medium, the thicknesses of respective films on the substrate are as follows:

first enhance film—600–1000 Å, magneto-optical recording film—200–500 Å, second enhance film—0–400 Å.

In the case of a magneto-optical recording medium thus constructed, the control of the laser power required in the steps of recording and erasing can be accomplished by regulation of the heat control layer mentioned above.

Figure 15:
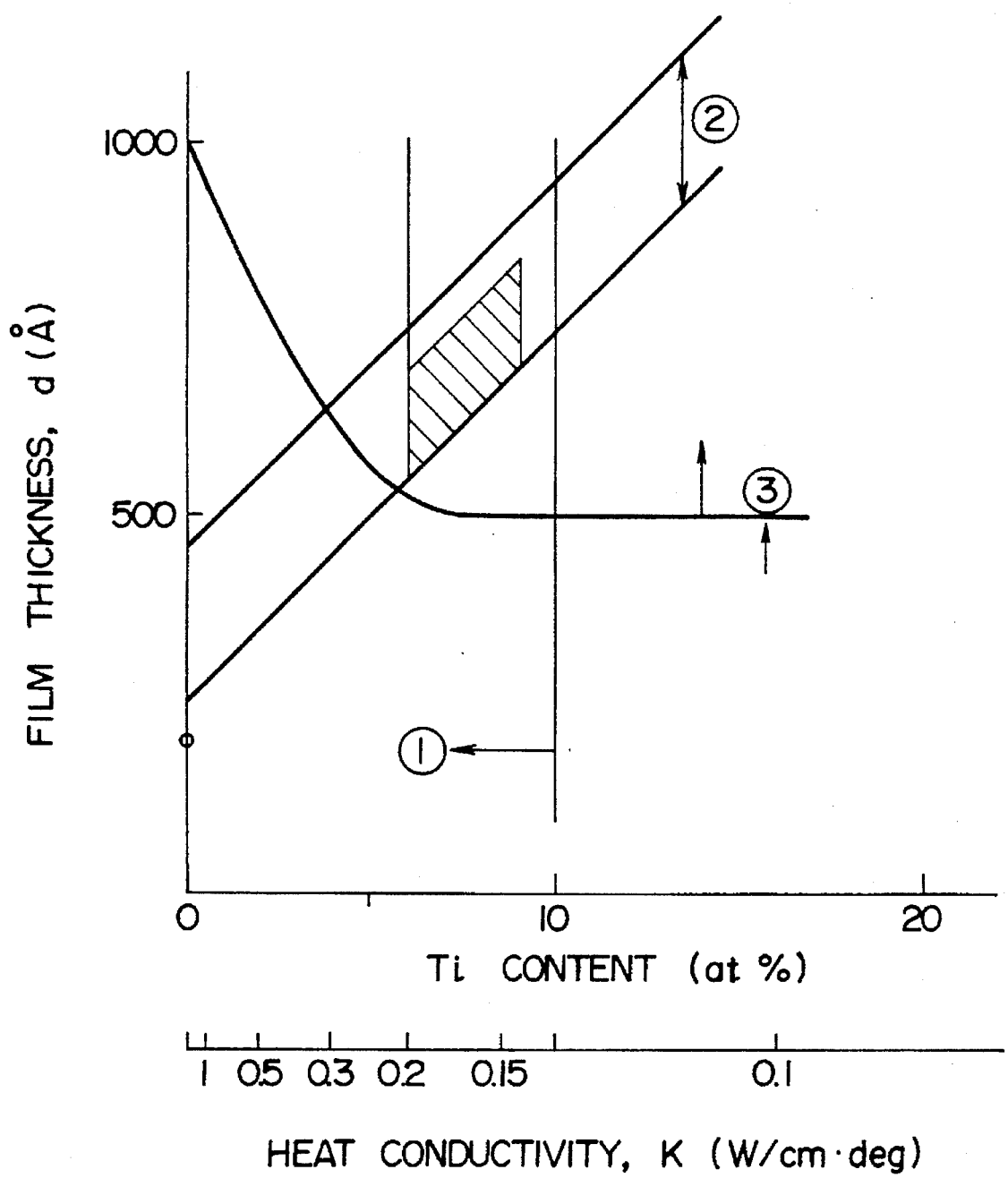
FIG. 15 is a graph showing the relation of the composition and the heat conductivity with the film thickness of the heat control layer in Example 2.

In order that recording and erasing can be performed with a laser power of 5–10 mW (in terms of the power that reaches the film surface), with a magneto-optical disk of 5 inch diameter rotated at 2400 rpm (linear velocity of 7.5–15 m/sec), playback can be performed with a laser power of 1–3 mW, the film thickness of the heat control layer and the Ti content of Al-Ti alloy must be in the region indicated by ② in FIG. 15. Above the upper limit of the region ②, a laser power of at least 10 mW is necessary (when track offset margin is additionally taken into consideration) when erasing is conducted at a linear velocity of 15 m/sec. On the other hand, below the lower limit of the region ②, there is a risk of data failure occurring when signals are played back with a laser power of 1–3 mW.

The heat control layer has also the function of protecting the recording film. The protective effect varies depending on the composition and the film thickness of the heat control layer. In the Al-Ti alloy, the composition and thickness which can maintain the error rate of $1 \times 10^{-6}$ or less in an environment of 80° C. and 90% relative humidity (RH) for 1000 hours are in the, region indicated by ③ in FIG. 15. It has been confirmed that in a region wherein the Ti content of Al-Ti alloy is 6 atomic % or more, the heat control layer has a stable protective effect so long as it has a film thickness of 500 Å or more. This indicates the corrosion preventive effect of Ti, and the corrosion preventive effect is not always satisfactory when the Ti content is less than 6 atomic %. Therefore, the Ti content of the Al-Ti alloy must be restricted to 6 atomic % or more and the film thickness to 500 Å or more.

As described above, by restricting the Ti content of the Al-Ti alloy of the heat control layer to 6–10 atomic % and the film thickness of the layer to 500 Å or more, a magneto-optical recording medium can be obtained which is excellent in durability to recording-erasing cycles, the recording, erasing and playback power characteristic and protective effect on the recording film.

Figure 11:
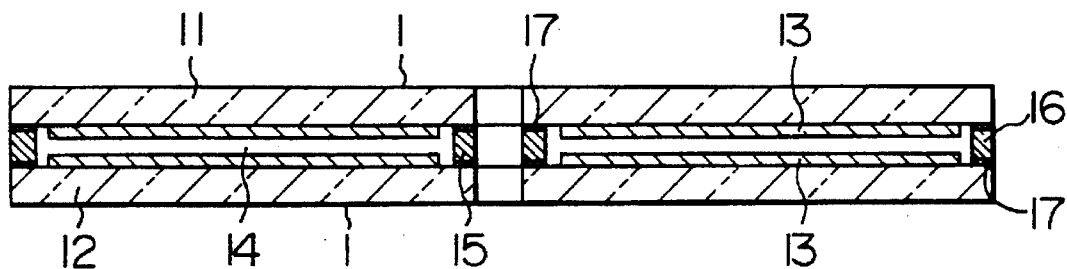
FIG. 11 is a sectional view showing the physical structure of a magneto-optical recording medium in Example 2.
Figure 12:
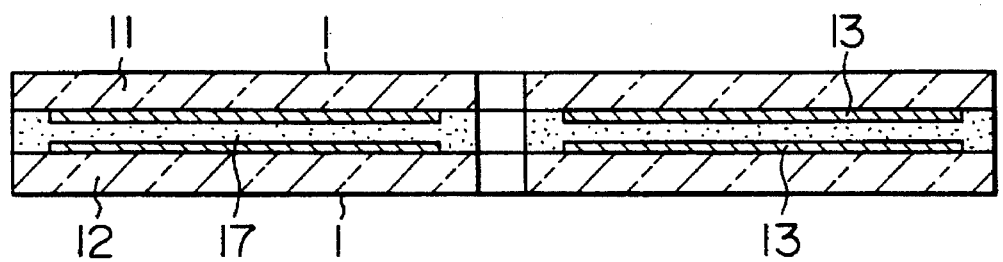
FIG. 12 is a sectional view showing the physical structure of a magneto-optical recording medium in Example 2.
Figure 13:
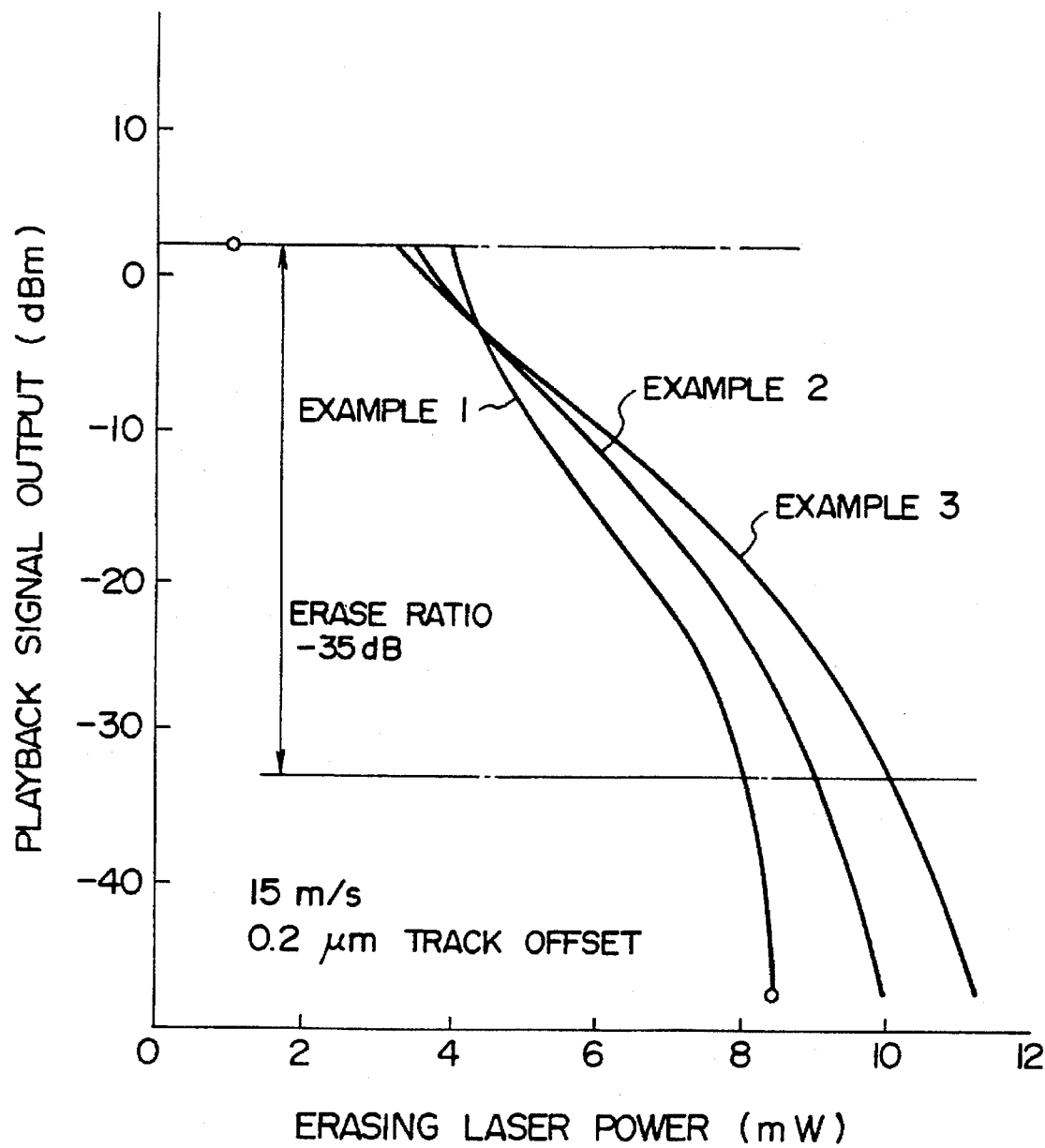
FIG. 13 is a graph showing the playback signal output characteristics of the magneto-optical recording media according to respective Experimental Examples in Example 2.
Figure 14:
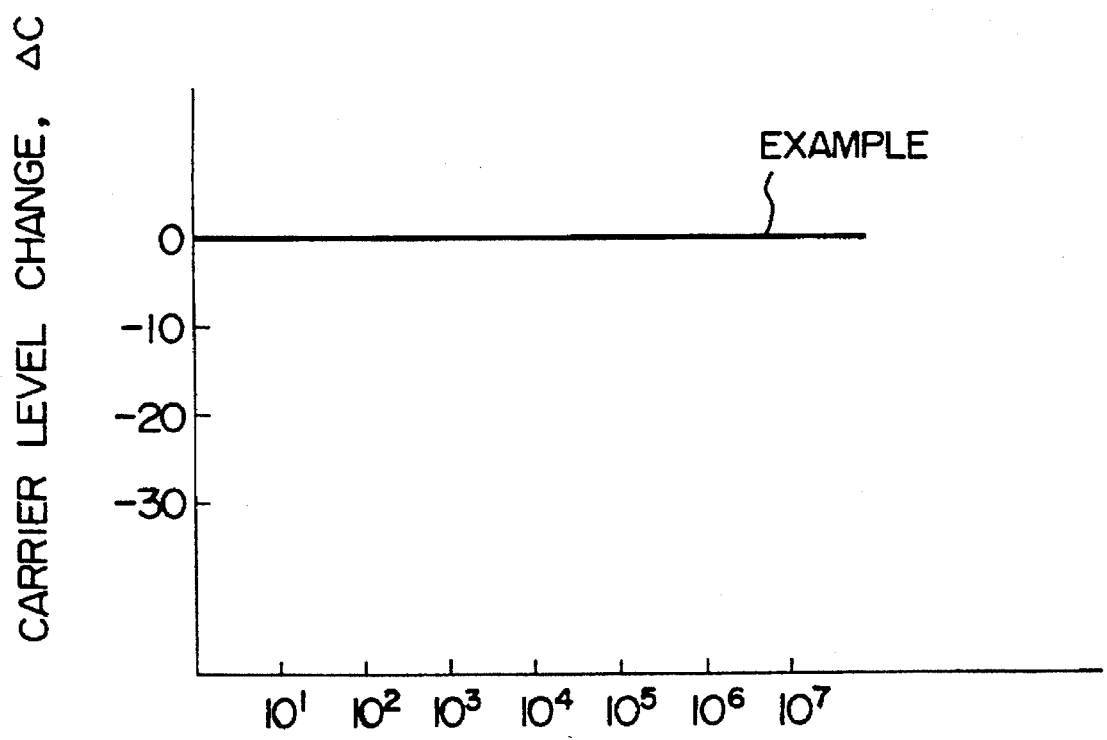
FIG. 14 is a graph showing the durability to repeated recording and playback in the magneto-optical recording medium in Example 2.

FIGS. 11 and 12 are diagrams showing an example of the present invention. FIG. 11 shows a magneto-optical recording medium of a lamination type and FIG. 12 shows a magneto-optical recording medium of an air sandwich type. In the Figures, numerals 11 and 12 each denote a recording disk, 13 a lamination film having respective films 3–6 shown in FIG. 6, 14 an adhesive layer, 15 an inner peripheral spacer, 16 an outer peripheral spacer and 17 an air gap.

Although the above Example was described for a case wherein an Al-Ti alloy was used for the heat control layer, a similar effect as in the Example can be obtained with other heat control layers comprising an alloy of at least one metallic element selected from the group of elements consisting of Al, Ag, Au, Cu and Be with at least one metallic element selected from the group consisting of Cr, Ti, Ta, Sn, Si, Rb, Pt, Nb, Mo, Mg, W and Zr and having a heat conductivity K regulated to fall within the range specified by $2.0 \geq K \geq 0.1$ W/cm·deg.

Figure 16:
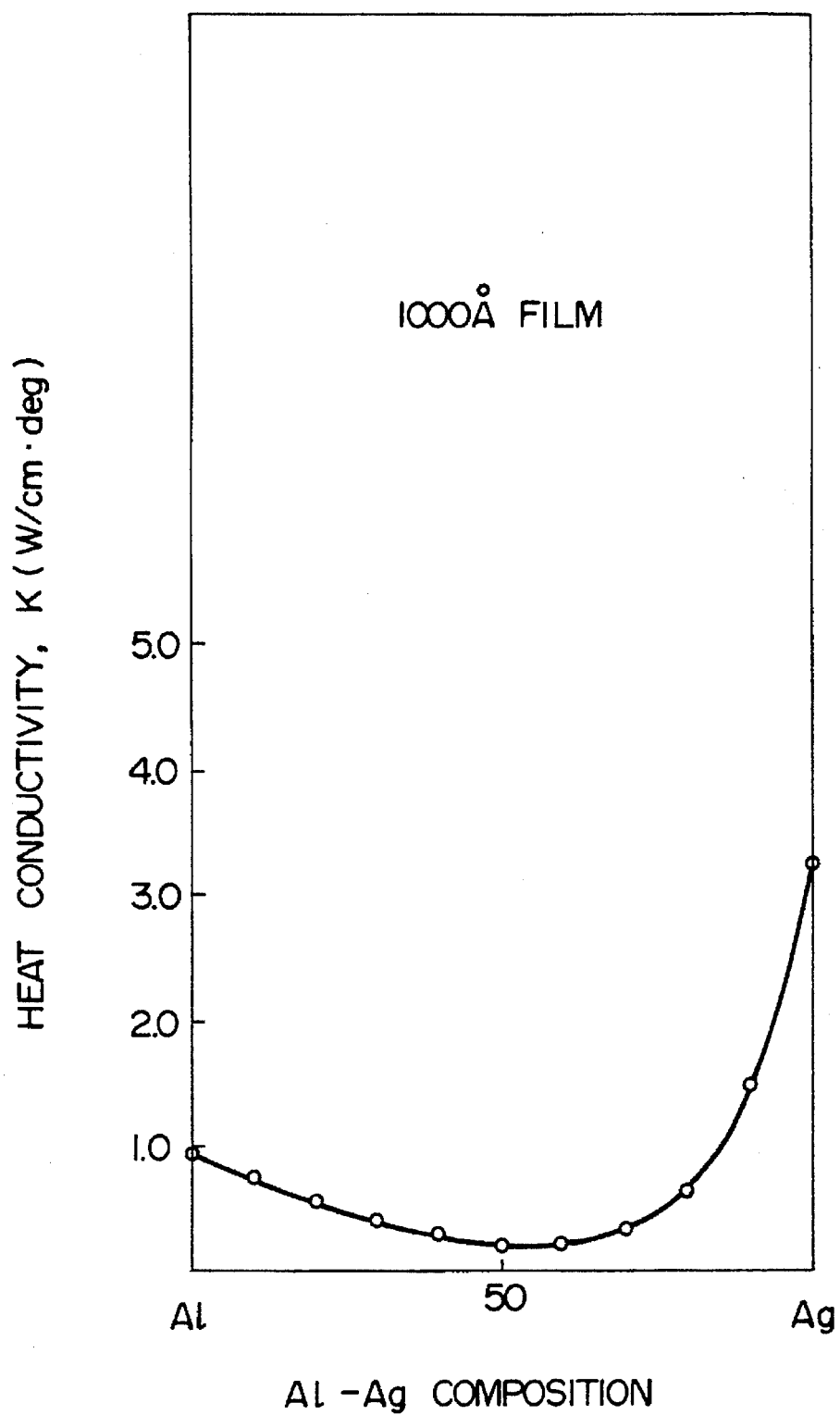
FIG. 16 is a graph showing the relation between the composition and the heat conductivity of the heat control layer in Example 2.
Figure 17:
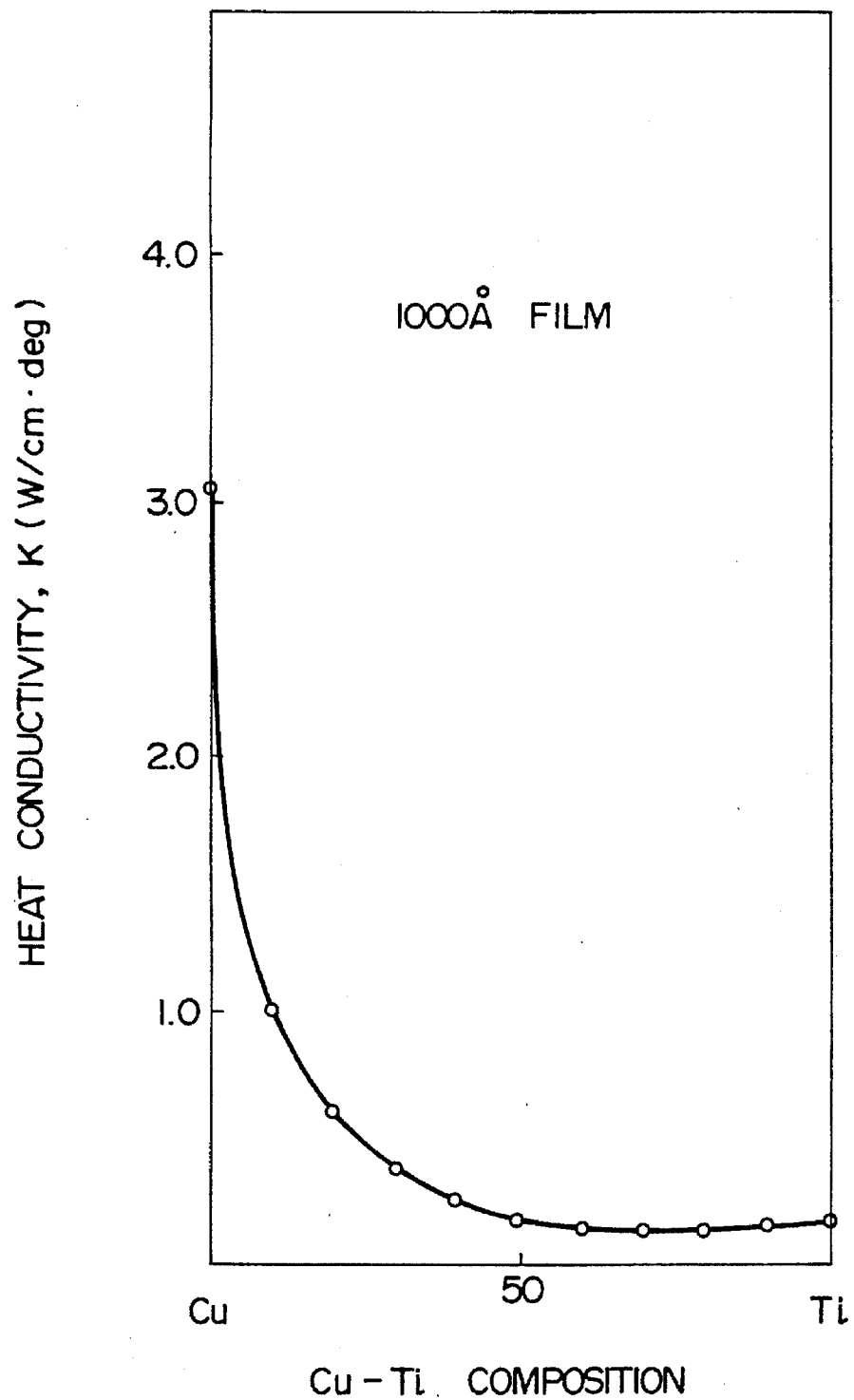
FIG. 17 is a graph showing the relation between the composition and the heat conductivity of the heat control layer in Example 2.

FIG. 16 is a characteristic diagram showing the relation between the composition of an Al-Ag alloy usable in the present invention and the heat conductivity of the alloy. FIG. 17 is a characteristic diagram showing the relation between the composition of a Cu-Ti alloy and this heat conductivity of the alloy. Similar effects can be obtained by using these Al-Ag alloys and Cu-Ti alloys as the heat control layer and restricting the range of its heat conductivity.

EXAMPLE 3

Example 3 of the present invention is described below with reference to FIGS. 18–24. The magneto-optical recording medium of the present Example is characterized in that the external magnetic field sensitivity of the magneto-optical recording film is improved by varying the compositions of the magneto-optical recording film described in Examples 1 and 2. Accordingly, the contents of the present Example excepting the part relating to the magneto-optical recording film are the same as in Examples 1 and 2, so that explanation of these same portions is omitted.

The magneto-optical recording film of the present Example comprises an amorphous perpendicular magnetic film based on rare earth metal-transition metal containing either nitrogen (N) or oxygen (O) or both N and O in a total amount of 0.1–5.0 atomic % incorporated into the film and is formed into a film thickness of 200–500 Å. Thus, although N and O which got mixed into a magneto-optical film have previously been recognized as impurities and technical investigation has been made toward preventing N and O from getting into a magneto-optical recording film, the present inventors have made extensive study on the relation between the percentage of $N_2$ or $O_2$ incorporated into an amorphous perpendicular magnetic film and residual Kerr angle of rotation, the relation between said percentage of incorporation and perpendicular magnetic anisotropy constant and the relation between said percentage of incorporation and the CN ratio, and as a result have found that a suitable range of percentage of incorporated N or O exists in which the perpendicular magnetic anisotropy energy alone can be lowered without lowering the Kerr angle of rotation. According to the study of the present inventors, when N or O or both N and O are incorporated in the range of amount of 0.1–5.0 atomic % into an amorphous perpendicular magnetic film based on rare earth metal-transition metal, the perpendicular magnetic anisotropy energy alone can be lowered and the external magnetic field sensitivity of a magneto-optical recording film can be improved without lowering the Kerr angle of rotation. The percentages of N and O to be incorporated in the magneto-optical recording film in the present invention have been determined on the basis of above finding. Although the amorphous perpendicular magnetic film based on rare earth metal-transition metal may be of any composition known to the art, particularly preferred are those based on ternary alloys comprising a rare earth metal, such as Tb, Gd, Nd and Dy, a transition metal, such as Fe, Co and Ni and an additive element, such as Cr, Ti and Nb.

Processes for forming the magneto-optical recording film are enumerated below.

① The first enhance film is formed on a transparent substrate, then an amorphous perpendicular magnetic film formed of a rare earth metal-transition metal is formed thereon by a suitable method, and the amorphous perpendicular magnetic film is heated in a vacuum chamber adjusted to a degree of vacuum of $1.0 \times 10^{-5} – 1.0 \times 10^{-3}$ Pa at 20°–120° C. for 5–90 minutes to nitride or oxidize the amorphous perpendicular magnetic film, whereby a desired magneto-optical recording film is obtained.

② The first enhancement film is formed on a transparent substrate, then an amorphous perpendicular magnetic film formed of a rare earth metal-transition metal alloy is formed thereon in an atmosphere containing 0.1–5.0%, in terms of partial pressure, of $N_2$ or $O_2$ or gas mixture of $N_2$ and $O_2$, and the amorphous perpendicular magnetic film based on rare earth metal-transition metal is nitrided or oxidized in the course of the film forming process.

The environment mentioned in the method ② containing a partial pressure of 0.1–5.0% of $N_2$ or $O_2$ gas mixture of $N_2$ and $O_2$ may be prepared as follows.

(1) A vacuum chamber is evacuated to a high degree of vacuum of the order of $10^{-5}$ Pa and then N or O or gas mixture of N and O is supplied into the vacuum chamber to adjust the partial pressure of N or O or gas mixture of N and O during the film forming step to 0.1–5.0%.

(2) In the evacuation step conducted in advance to forming the amorphous perpendicular magnetic film based on rare earth metal-transition metal, the degree of vacuum in the vacuum chamber is adjusted to $1.0 \times 10^{-4} – 5.0 \times 10^{-4}$ Pa to leave a partial pressure of 0.1–5.0% of air behind in the vacuum chamber.

The amorphous perpendicular magnetic film based on rare earth metal-transition metal can be prepared by any desired vacuum film forming method including sputtering, ion plating, vacuum vapor deposition, etc.

Figure 19:
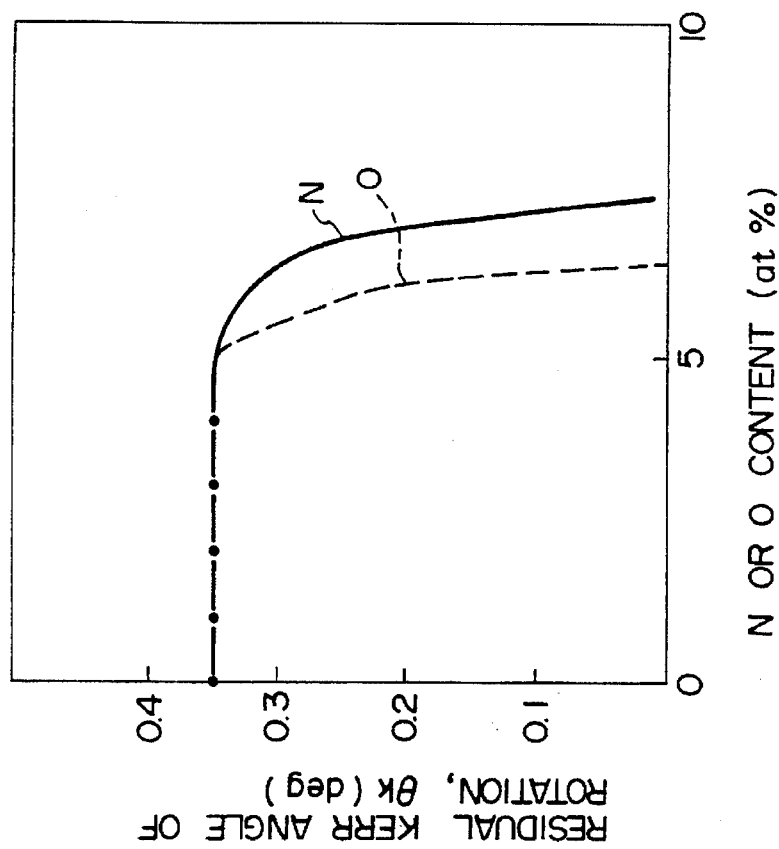
FIG. 19 is a graph showing the relation of the amount of N and the amount of O incorporated into the magneto-optical recording film with the residual Kerr angle of rotation in Example 3.
Figure 18:
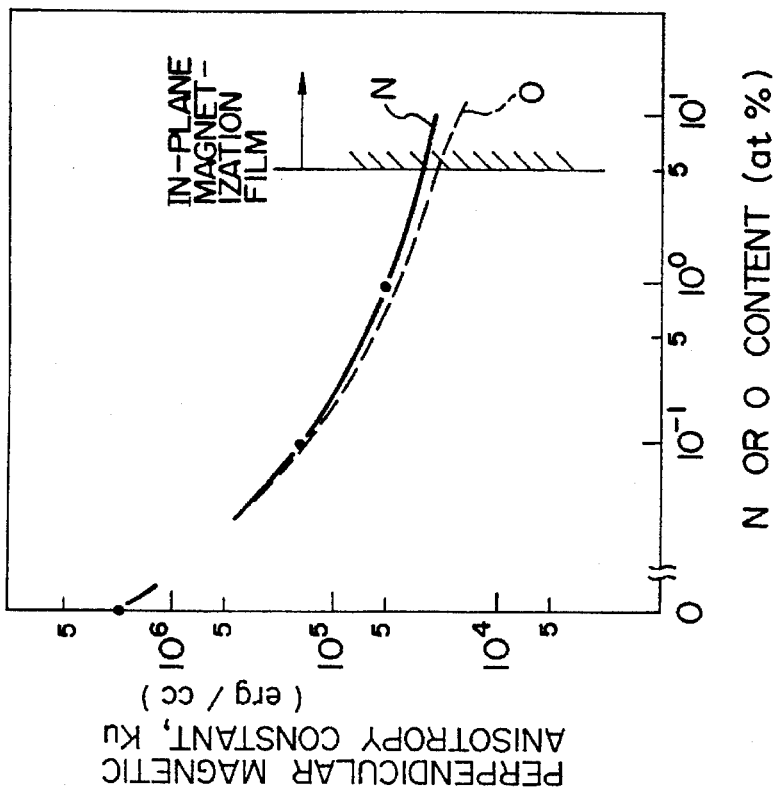
FIG. 18 is a graph showing the relation of the amount of N and the amount of O incorporated into the magneto-optical recording medium with the vertical magnetic anisotropy constant in Example 3.

FIG. 18 shows the relationship between the percentage of N and percentage of O incorporated into the magneto-optical recording film 4 and the perpendicular magnetic anisotropy constant. FIG. 19 shows the relationship between the percentage of N and percentage of O incorporated into the magneto-optical recording film 4 and the residual Kerr angle of rotation.

As shown in FIG. 18, the perpendicular magnetic anisotropy constant of a magneto-optical recording film decreases sensitively by incorporation of N or O, and decreases gradually with the increase of the percentage of N or O incorporated. When the percentage of N or O incorporated exceeds 5.0 atomic %, it becomes smaller than the demagnetizing field and the magnetic moment comes to incline toward the in-plane direction.

On the other hand, the residual Kerr angle of rotation is relatively stable to the incorporation of N and O and undergoes virtually no lowering when the percentage of incorporation is in the range of 0–5.0 atomic %, and hence is more excellent for practical use.

Figure 22:
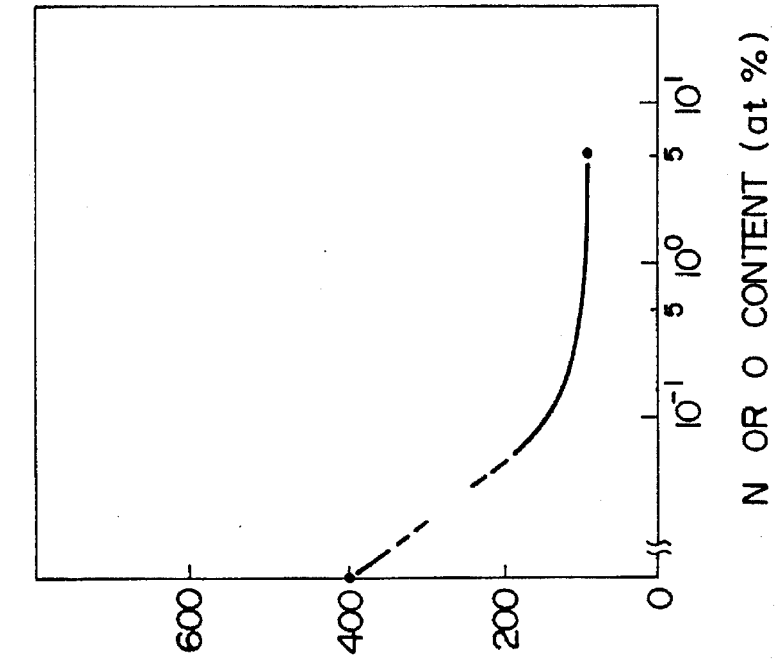
FIG. 22 is a graph showing the relation of the amount of N and the amount of O incorporated with the saturation recording magnetic field as determined by using the magneto-optical recording medium of FIG. 20.
Figure 23:
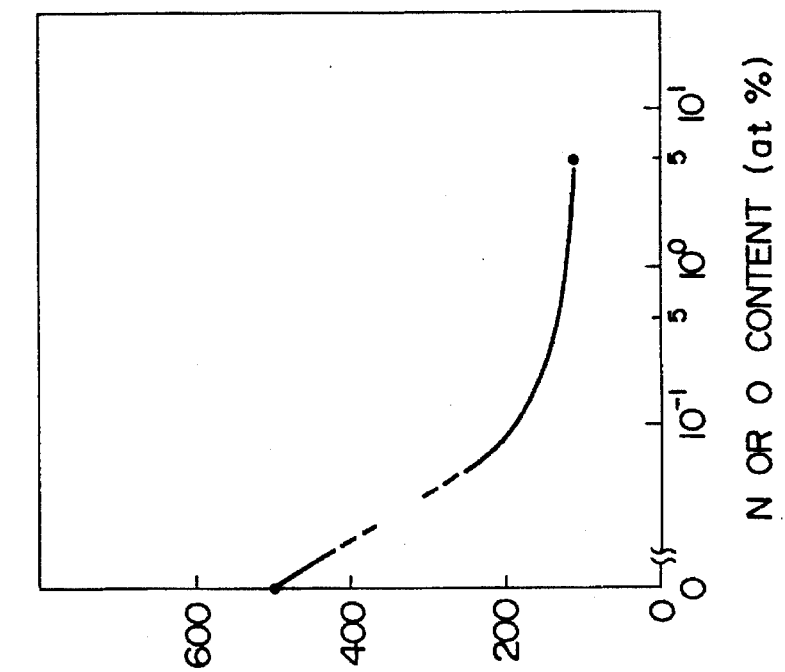
FIG. 23 is a graph showing the relation of the amount of N and the amount of O incorporated with the erasing magnetic field as determined by using the magneto-optical recording medium of FIG. 20.

FIGS. 21, 22 and 23 respectively show the relation of the percentage of N and percentage of O incorporated in the magneto-optical recording film 4 with the playback CN ratio, saturation recording magnetic field and the magnitude of external magnetic field at which the erase ratio becomes −40 dB, namely the erasing magnetic field. The sample used is a disk-shaped magneto-optical recording medium having the film structure shown in FIG. 20.

Thus, the data of FIGS. 21, 22 and 23 correspond to the data shown in FIGS. 18 and 19, and the most outstanding effect is obtained at a percentage of incorporated N and percentage of incorporated O in the range of 0–5%.

Hereunder, Experimental Examples and a Comparative Example are described to show the playback CN ratio, saturation recording magnetic field, erasing magnetic field and the percentages of incorporated N and O of respective magneto-optical recording medium of these Examples.

FIG. 24 shows the outline of the processes for producing the magneto-optical recording media according to Experimental Examples 5–9 and Comparative Example 2 mentioned above, and the playback CN ratio, saturation recording magnetic field, erasing magnetic field and the percentages of N and O incorporated into the recording film, of the magneto-optical recording medium produced by each of the methods. The sample used is a magneto-optical disk comprising a polycarbonate substrate and, formed on the preformat pattern-carrying surface of the substrate respectively by means of sputtering, an AlSiON enhancement film of 800 Å thickness and a TbFeCo magneto-optical recording film of 250 Å thickness.

As is apparent from these Figures, in the magneto-optical recording media of Experimental Examples 5–9, the saturation recording magnetic field decreases to about 50% of that of Comparative Example 2 (prior art example) and the erasing magnetic field decreases to 40% of that in the prior art example although the playback CN ratio is approximately the same as that of the magneto-optical recording medium of the prior art example. Consequently, the size reduction and weight reduction of the external magnetic field necessary for recording and erasing of information can be attained and further, simplification of the power source part of magnet, reduction of power consumption, size reduction of the recording/playback apparatus and speed-up of recording and erasing operations can be attained. Further, when viewed from the medium side, a magneto-optical recording medium excellent in reliability can be obtained because big allowance can be afforded for the fluctuation of distance between the external magnetic field and the magneto-optical recording medium and for the fluctuation of magnetic field due to heat generation.

Though explanation was given in the Example 3 above referring, as example, to a magneto-optical recording medium comprising a substrate and, laminated on the preformat pattern-carrying surface of the substrate, the first enhancement film, a magneto-optical recording film, the second enhancement film and a heat diffusion film, the spirit and scope of the present invention is not limited thereto, and the present invention can be applied to magneto-optical recording media of any desired structure so long as they at least have a magneto-optical recording film.

EXAMPLE 4

Figure 25:
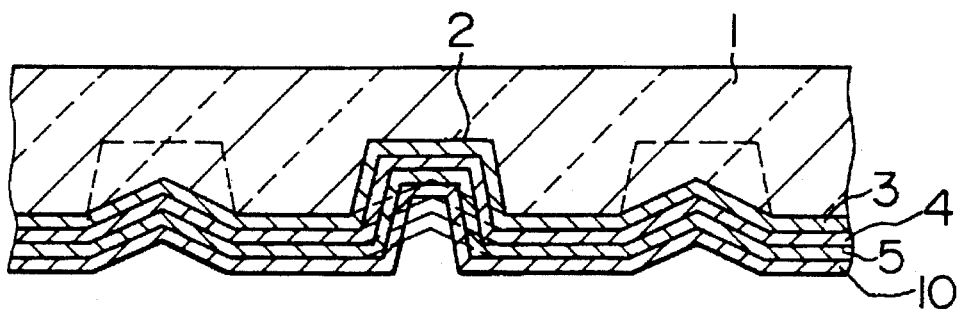
FIG. 25 is a sectional view of the principal part of the magneto-optical recording medium according to Example 4.

Example 4 of the present invention is described below with reference to FIGS. 25–30 and FIG. 35. The magneto-optical recording medium of the present Example also is featured by improving the external magnetic field sensitivity of the magneto-optical recording film by changing the composition of the magneto-optical recording film used in Examples 1 and 2 described above. FIG. 25 is a sectional view of the principal part of the magneto-optical recording medium according to the present Example. As shown in the Figure, the magneto-optical recording medium of the present Example comprises a transparent substrate 1 and, successively laminated from the transparent substrate 1 side on the preformat pattern 2-carrying surface of the substrate 1, an enhancement film 3, a magneto-optical recording film 4, an auxiliary magnetic film 5 and a protective film 10. Since the transparent substrate 1, preformat pattern 2, enhancement film 3 and magneto-optical recording film 4 are respectively the same as in the Example 1, the explanation therefor is omitted. If necessary and desired, a reflecting layer may be laminated on the protective film 10.

The auxiliary magnetic film 9 used herein is a magnetic film which is formed out of a ferromagnetic substance, for example, alloys of a noble metal, such as Au, Pt, Ag, Cu, Rh, Pd, etc., with a transition metal, such as Fe, Co, Ni, Mn, Cr, etc., more specifically such alloys as Pt-Co alloy, Ag-Co alloy, Pd-Co alloy, Rh-Co alloy, Rh-Fe alloy, Ag-Fe alloy and the like, or Al-Co alloy, Al-Fe alloy, and the like; a ferrimagnetic substance, for example, various ferrites such as $Fe_3O_4$, etc., iron garnet, chromite, rare earth metal-transition metal alloys, and the like; or mixtures of these magnetic metals with their oxides or nitrides, and in which the difference between the Curie temperature of the film and the Curie temperature of the magneto-optical recording film 4 has been adjusted to be not more than 150° C. The auxiliary magnetic film 5 has a film thickness of 20–1000 Å, preferably 300–500 Å. Further, the auxiliary magnetic film 5 may be provided either to the substrate side or to the opposite side relative to the magneto-optical recording film 4. Further, the film 5 may also be provided to the intermediate position of the magneto-optical recording film 4.

When the auxiliary magnetic film 5 having a Curie temperature which is different by 150° C. or less from the Curie temperature of the magneto-optical recording film 4 is formed so as to contact with the magneto-optical recording film 4, a magnetic interaction develops between the magneto-optical recording film 4 and the auxiliary magnetic film 5, which makes it possible to attain the overwriting of signals through the magnetic field modulation system.

FIG. 27 is a characteristic diagram showing the relationship between the Pt content of a Co-Pt alloy film and the Curie temperature (Tc) of the alloy film. As shown in the Figure, by regulating the content of Pt, the Curie temperature Tc of the alloy film can be changed as desired.

Figure 26:
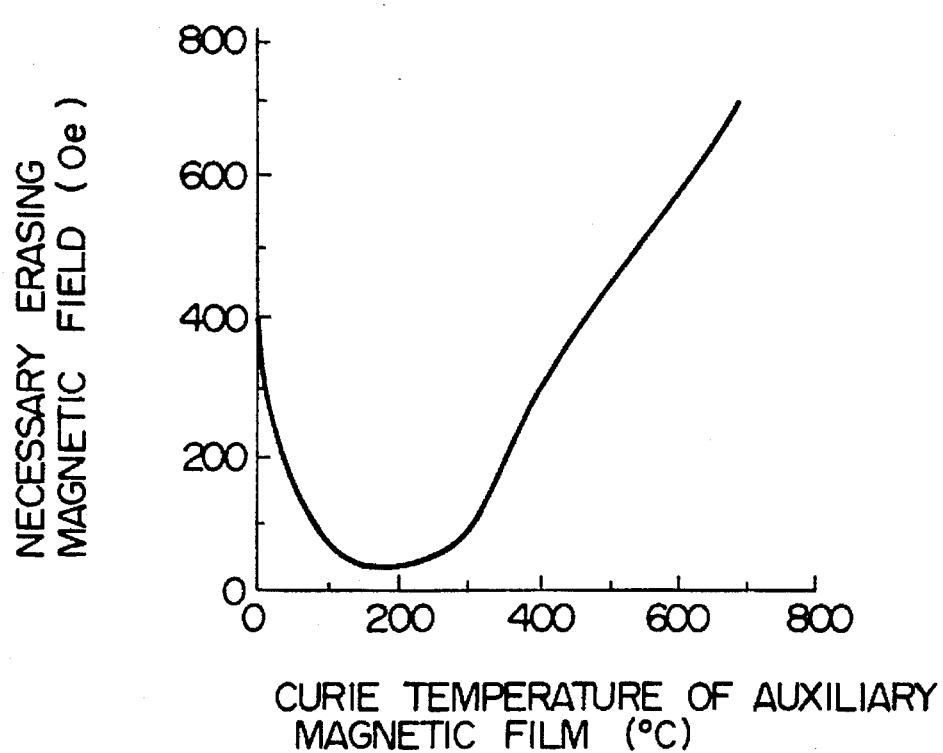
FIG. 26 is a graph showing the relation between the Curie temperature of the auxiliary magnetic film and the necessary erasing magnetic field in Example 4.

FIG. 26 is a characteristic diagram showing the relationship between the Curie temperature of an auxiliary magnetic film 9 and the necessary erasing magnetic field. In this case, a Tb-Fe-Co alloy film of a film thickness of 300 Å was formed as the magneto-optical recording film 4 and a Co-Pt alloy of a film thickness of 500 Å was formed thereon as the auxiliary magnetic film 9. The Curie temperature of the auxiliary magnetic film 9 was changed over the range of 10°–60° C. by varying its alloy composition. The Curie temperature of the magneto-optical recording film 4 in this case was adjusted to 200° C.

By using the magneto-optical recording medium thus prepared, information was recorded while applying an external magnetic field in the erasing direction, and the minimum magnetic field strength at which recording is possible was determined and termed the "necessary erasing magnetic field". The necessary erasing magnetic field corresponds to the strength of external magnetic field necessary to complete erasing of previously recorded signals.

When overwriting is conducted through the magnetic field modulation system, the external magnetic field mountable on the recording-playback apparatus is about 200 [Oe] at the highest owing to the requisite from the recording-playback apparatus side. As clear from the result shown in FIG. 26, when the Curie temperature exceeds 360° C., external magnetic field shielding takes place; on the other hand, when the Curie temperature is below 50° C., virtually no magnetic interaction develops between the magneto-optical recording film 4 and the auxiliary magnetic film 9. As the result, the necessary erasing magnetic field exceeds 200 (Oe), which is unpractical.

As contrasted, when an auxiliary magnetic layer 9 which contacts directly with the magneto-optical recording film 4 and has a Curie temperature in the range of 50°–350° C. is formed, complete erasing of information is possible at a weak external magnetic field of 200 [Oe] or less. It can be seen that particularly when the Curie temperature of the auxiliary magnetic layer 9 is restricted to the range of 100°–300° C., complete erasing of information is possible at an external magnetic field of 100 [Oe] or less.

When a Tb-Fe-Co alloy having a composition of a Tb content of 23% by weight, Fe content of 66% by weight and Co content of 11% by weight is used as the magneto-optical recording film 4 and a Pt-Co alloy having a composition of a Pt content of 80% by weight and Co content of 20% by weight is used as the auxiliary magnetic film, the Curie temperature of the magneto-optical recording film 4 is 200° C. and that of the auxiliary magnetic film 9 is 180° C., and hence the difference of Curie temperature between the magneto-optical recording film 4 and the auxiliary magnetic film 9 is 20° C.

FIG. 28 shows the recording-erasing characteristic of the magneto-optical recording medium according to the Example of the present invention shown in FIG. 25 and that of a magneto-optical recording medium of the prior art having no auxiliary magnetic film 9, in comparison with each other. The term "recording-erasing characteristic" referred to herein means the change of playback CN which takes place when the strength and the direction of external magnetic field applied at the time of recording is changed. In the Figure, curve A is the characteristic curve of the magneto-optical recording medium according to the Example of the present invention and curve B is the characteristic curve of a prior art magneto-optical recording medium.

As is apparent from the Figure, whereas in the prior art magneto-optical recording medium (curve B) the playback CN ratio does not reach the saturation value unless an external magnetic field of at least about 330 [Oe] is applied in the recording direction, in the magneto-optical recording medium according to Example #4 of the present invention (curve A) the playback CN ratio reaches the saturation value by mere application of an external magnetic field of about 100 [Oe] in the recording direction. This also reveals that the magneto-optical recording medium of the present invention makes complete recording possible with a weaker external magnetic field. Further, as contrasted with the prior art magneto-optical recording medium (curve B), which cannot give a playback CN ratio of zero unless an external magnetic field of at least about 600 [Oe] is applied in the erasing direction, magneto-optical recording medium according to Example #4 of the present invention (curve A) can give a playback CN ratio of zero by mere application of an external magnetic field of about 50 [Oe] in the erasing direction. This also reveals that the magneto-optical recording medium of the present invention can attain complete erasing with a weaker external magnetic field. Thus, it is demonstrated that the magneto-optical recording medium of the present invention has a recording-erasing characteristic that enables a secure overwriting of information through the external magnetic field modulation system.

FIGS. 29 and 30 are each an enlarged sectional view of the principal part showing a modified version of the present Example. In these Figures, numeral 1 is a transparent substrate, 3 an enhancement film, 4 a magneto-optical recording film, 12 a protective film, 11 a reflecting film and 9 an auxiliary magnetic film. In the Example of FIG. 29, the auxiliary magnetic film 9 is formed between the enhance film 3 and the magneto-optical recording film 4. In the Example of FIG. 30, on the other hand, the auxiliary magnetic film 9 is formed on both surfaces of the magneto-optical recording medium 4.

Further, when a magneto-optical recording film 4 is used that has been adjusted so as to be RE-rich at least at immediately below the Curie temperature by regulating its composition is used, a direct overwrite through the light intensity modulation system also becomes possible. That is, as described above, the amorphous perpendicular magnetic film made of a rare earth metal-transition metal alloy can be rendered, at least at immediately below the Curie temperature, either to be TM-rich or to be RE-rich by changing the composition variously; and by laminating the auxiliary magnetic film 5 shown in Example 1 or Example 4 in contact with a magneto-optical recording film which is RE-rich at least at immediately below the Curie temperature and by properly selecting the strength of the external magnetic field and the laser power, a direct overwrite through the light intensity modulation system can be conducted based on the principle shown in the section of "action". FIG. 31 shows one example of the structure of a magneto-optical recording medium capable of conducting direct overwrite through light intensity modulation system.

EXAMPLE 5

The magneto-optical recording medium of the present Example is characterized by being provided on the magneto-optical recording film 4 with a magnetic film based on a rare earth metal-transition metal alloy which has a magnetic moment component in a direction inclined relative to the direction perpendicular to the film face and in which both of the inclined magnetic moment component and the magnetic component whose direction is perpendicular to the film face become insignificant when the magnetic film is heated up to the neighborhood of its Curie temperature.

FIGS. 37(a)–(j) illustrate magneto-optical recording films which have a magnetic moment component in a direction inclined relative to the direction perpendicular to the film face. In the Figures, the rectangle shows an magneto-optical recording film. The arrows respectively indicate the direction at respective parts. The lower edge of the rectangle is the interface at a transparent substrate side, and the upper edge is the interface of a reflecting film side.

As shown in the Figures, in the magneto-optical recording medium of the present Example #5 the magneto-optical recording film is formed of a single layer. In the magneto-optical recording film of FIG. 37(a), the magnetic moments point vertically upward in the region from the interface of the transparent substrate side until the approximately middle part of the film thickness direction, the moments point obliquely upward in the part above said region, and the moments point to the in-plane direction at the interface of reflecting film side. In the magneto-optical recording film of FIG. 37(b), at parts near the interface of transparent substrate side the magnetic moments point to the in-plane direction, at parts just above this they point obliquely upward, and at approximately middle parts of the film thickness direction the magnetic moments point vertically upward. Above the middle parts the magnetic moments incline the reverse direction, and at the interface of reflective film side they point to the in-plane direction. In the magneto-optical recording film of FIG. 37(c), the magnetic moments point vertically upward at parts near to the interface of transparent substrate side, they point obliquely upward at parts just above this, and the magnetic moments point to the in-wall direction at approximately middle parts of the film thickness direction. At still more upper parts from this the magnetic moments lean again in the same direction, and at the interface of reflecting film side they point vertically upward. In the magneto-optical recording film of FIG. 37(d), the magnetic moments uniformly point obliquely upward in the region from the interface part of transparent substrate side to the interface part of reflective film side. In the magneto-optical recording film of FIG. 37(e), the magnetic moments rotate helically through the region from the interface part of transparent substrate side to the interface part of reflecting film side. In the magneto-optical recording film of FIG. 37(f), magnetic moments pointing obliquely to upper right and those pointing obliquely to upper left are formed alternately in the film thickness direction. In the magneto-optical recording film of FIG. 37(g), the magnetic moments point to the in-wall direction at parts near to the interface of transparent substrate side, and at more upper parts than them the magnetic moments successively rotate clockwise and ultimately point vertically upward. At still more upper parts the magnetic moments rotate in the same direction, and at approximately middle parts of the film thickness direction they point to the in-wall direction. At the further more upper parts the magnetic moments rotate in the reverse direction and ultimately point vertically upward. At still more upper parts than this the magnetic moments rotate in the reverse direction and at the interface part of reflecting film side they point to the in-wall direction. In the magneto-optical recording film of FIG. 37(h), the magnetic moments point vertically upward in the region from the interface of transparent substrate side to the approximately middle part, and the moments incline obliquely upward in the neighborhood of the interface of the reflecting film side. In the magneto-optical recording film of FIG. 37(i), the magnetic moments incline obliquely upward, and point vertically upward in the region from the approximately middle part to the interface of reflecting film side. In the magneto-optical recording film of FIG. 37(j), the magnetic moments point vertically upward in the region from the interface of transparent substrate side to the approximately middle part, and in the region from this part to the interface of reflecting film side the magnetic moments incline obliquely downward.

As is apparent from these Figures, the magnetic film of the present example (Example #5) is of a single layer structure and has in itself respective portions in which the magnetic moments point vertically, obliquely, or to the in-plane direction. Therefore, the magnetic film is fundamentally different from one comprising a vertical magnetization film and an in-wall magnetization film in lamination.

Among the respective magneto-optical recording films shown in FIGS. 37(a)–(j), those which have in the film thickness direction a region wherein the magnetic moments point to the direction not perpendicular to the film face and a region wherein the magnetic moments point to the direction perpendicular to the film face are adjusted such that, when the magneto-optical recording film is heated to the neighborhood of the Curie temperature, both the magnetic moments pointing in directions not perpendicular to the film face and the magnetic moment pointing in the direction perpendicular to the film face disappear. The temperature at which the magnetic moments pointing in directions not perpendicular to the film face disappear and the temperature at which the magnetic moments pointing in the direction perpendicular to the film face disappear are preferably close to each other. In particular, when the temperature at which the magnetic moments pointing in the direction perpendicular to the film face disappear the Curie temperature Tc, it is preferable that the magnetic moments pointing in directions not perpendicular to the film face disappear in the temperature range of Tc ±50° C.

Figure 38:
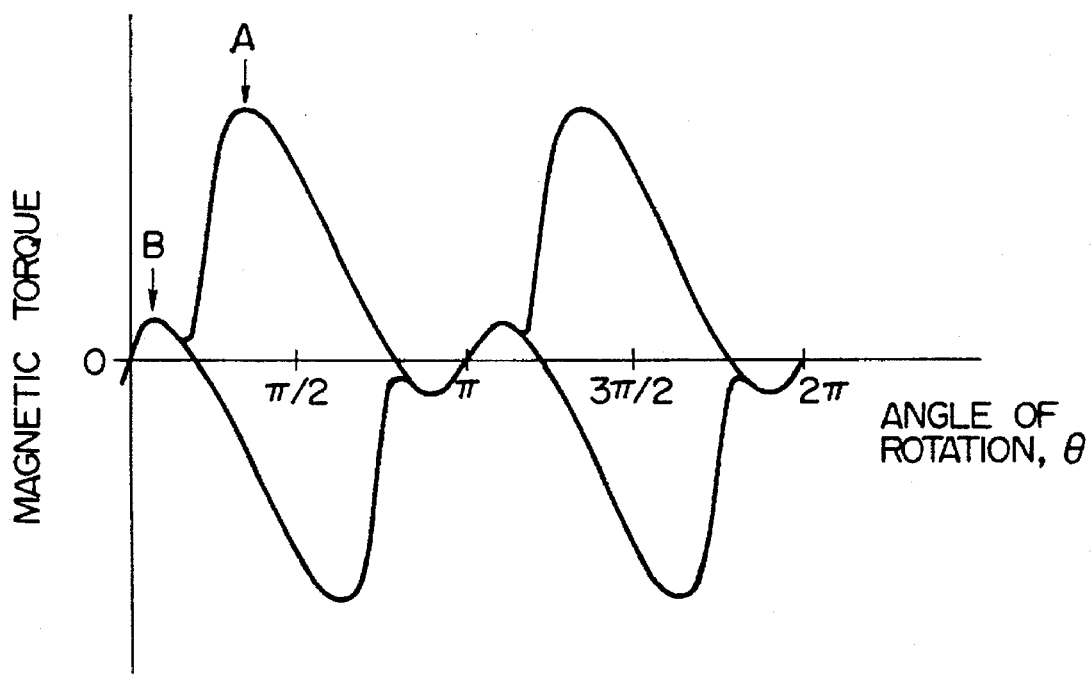
FIG. 38 is a graph illustrating a torque curve of the magneto-optical recording medium according to Example 5.

The magneto-optical recording media of the present invention, when subjected to a determination of magnetic torque using a magnetic torque meter, all show a torque curve as shown in FIG. 38. Thus, when the strength of the external magnetic field is designated as $H_{ex}$, the magnetic domain wall coercive force at the measuring temperature as $H_c$, the vertical anisotropic magnetic field at the measuring temperature as $H_k$, the direction perpendicular to the film face as 0°, and the angle of rotation of the external magnetic field $H_{ex}$ from the direction perpendicular to the film face as θ, and when the magnetic torque T acting on the supporting axis of a sample is determined with a magnetic torque meter while an external magnetic field of a strength specified by $H_c < H_{ex} < H_k$ is being rotated round the supporting axis of the sample, either a region satisfying $\partial^2 T/\partial \theta^2 < 0$ exists in the range of 0°≤θ≤90° and in the range of 180°≤θ≤270° (provided that when a $\theta_0$ satisfying $\partial T(\theta_0)/\partial \theta = 0$ is present, a region satisfying $T(\theta_0) < T_{max}$ exists) or a region satisfying $\partial^2 T/\partial \theta^2 > 0$ exists in the range of 360°≥θ≥270° and in the range of 180°≥θ≥90° (provided that when a $\theta_0$ satisfying $\partial T(\theta_0)/\partial \theta = 0$ is present, a region satisfying $T(\theta_0) > T_{min}$ exists). It is needless to say that the conditions satisfying the above equations are not those of a non-differentiable point associated with the move of magnetic domain wall.

In the example shown in FIG. 77(a), when the magnetic torque T is determined under the same conditions as above, the greatest value of the magnetic torque T exists in 0°<θ≤90°, the minimum value of the magnetic torque T exists in 90°≤θ<180°, the maximum value of the magnetic torque T exists in 180°<θ≤270°, and the smallest value of the magnetic torque T exists in 270°≤θ<360°, and magnetic torque T at 0°, 180° and 360° is zero.

Figure 40:
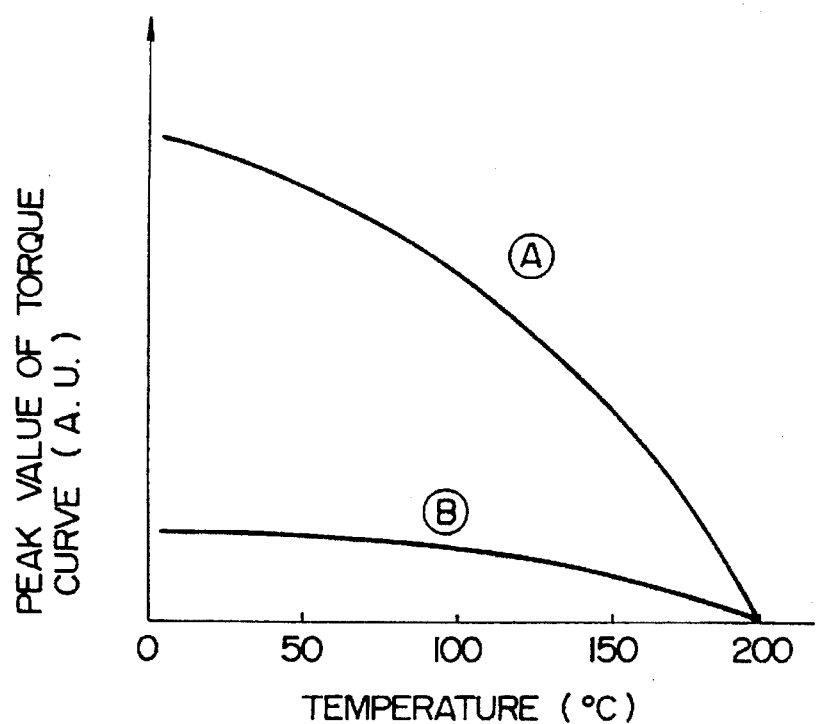
FIG. 40 is a graph showing the correlation between the temperature of a sample and a peak value of the torque curve.

The magneto-optical recording medium having the magnetic film which shows the torque curve as illustrated in FIG. 38 shows the characteristics as shown in FIG. 40 when it is subjected to the above-mentioned torque curve determination at varied sample temperatures, and the correlation between the sample temperature and the peak values of A and B shown in FIG. 38 is plotted as a graph. That is, as the sample temperature increase, the peak values of A and B both gradually decrease and reach zero at approximately the same temperature (one and the same temperature in the example of FIG. 40). The temperature at which the peak value of A becomes zero and the temperature at which the peak value of B becomes zero must not necessarily be the same. When the temperature at which the peak value of A becomes zero is designated as Tc, it is only necessary that the temperature at which the peak value of B becomes zero is in the range of Tc ±50° C.

Figure 39:
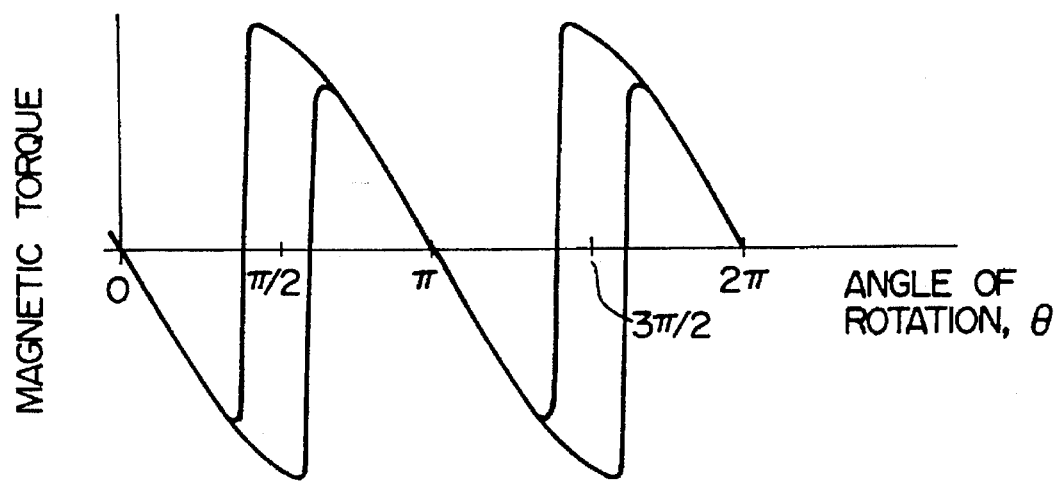
FIG. 39 is a graph illustrating a torque curve of the magneto-optical recording medium according to a prior art example.

FIG. 39 shows, as a Comparative Example, a torque curve of a magneto-optical recording medium having a magneto-optical recording film with a single layer vertical magnetization film. The torque curve does not show the peak corresponding to B of FIG. 38.

In the case of the magneto-optical recording medium of the present invention, the external magnetic field intensity necessary for recording and erasing can be reduced by more than 150 Oe as compared with the conventional magneto-optical recording media having a perpendicular magnetic film as a magneto-optical recording film.

Figure 78:
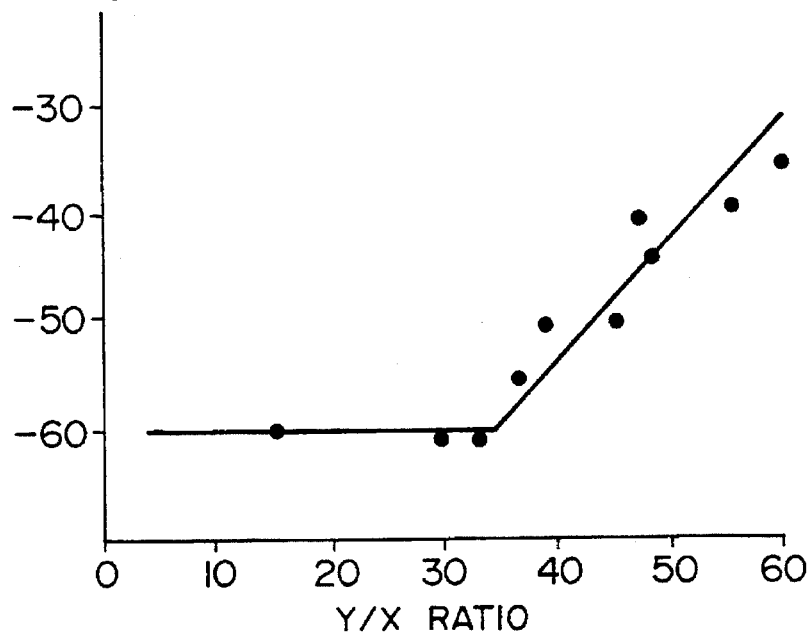
FIG. 78 is a graph showing the external magnetic field sensitivity-Y/X ratio characteristics of the magneto-optical recording medium according to the present invention.
Figure 79:
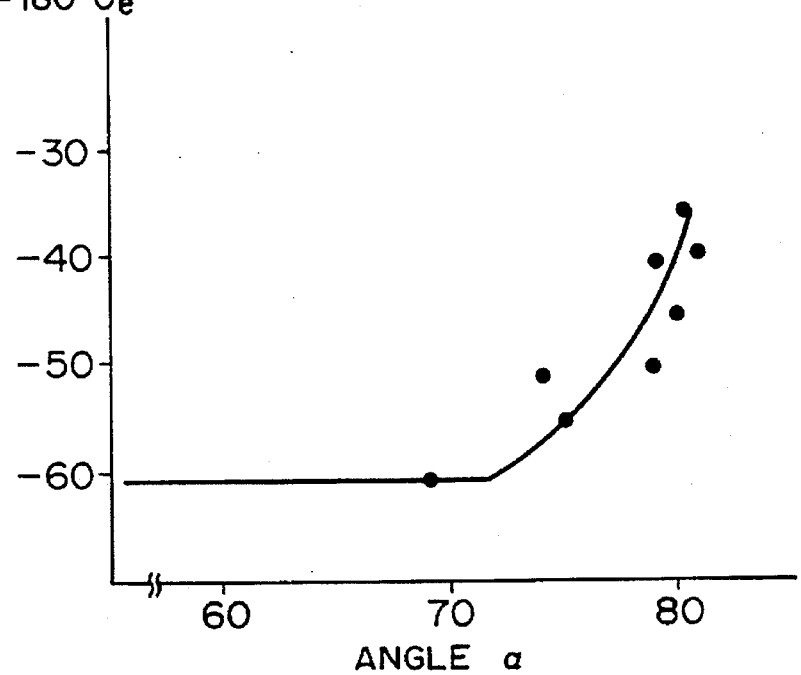
FIG. 79 is a graph showing the external magnetic field sensitivity-$\alpha$ value characteristics of the magneto-optical recording medium according to the present invention.

FIGS. 78 and 79 show magnetic field sensitivity characteristics of a magneto-optical recording medium having a magnetic film which shows the magnetic torque curve of FIG. 77(a). FIG. 78 is a graph obtained by plotting the correlation between the carrier level c when an external magnetic field of 180 Oe is applied to the magneto-optical recording medium using a dynamic characteristics detector having PIN photo diode differential detector and the value of |Y|/|X|×100 when the difference between the greatest value and the smallest value of the magnetic torque T is designated as X and the difference between the maximum value and the minimum value of the magnetic torque T is designated as Y. FIG. 79 is a graph obtained by plotting the correlation between the above-mentioned carrier level and the inclination α of tangent line at the point of θ=180° of the magnetic torque curve.

As is clear from FIG. 78, when the value of |Y|/|X|×100 is in the range of 0—about 35, the recorded signal can be completely erased by the external magnetic field of 180 Oe, but when the value of |Y|/|X|×100 is more than about 35, the recorded signal cannot be completely erased by the external magnetic field of 180 Oe. In general, since the external magnetic field intensity which can be mounted on a drive device is at most about 180 Oe, it is preferred to adjust the recording film to have a value of |Y|/|X|×100 of 35 or less. Furthermore, as is clear from FIG. 79, when the inclination α of the tangent line at the point of θ=180° of the magnetic torque curve is in the range of about 72°, the recorded signal can be completely erased by an external magnetic field of 180 Oe, but when the inclination α of the tangent line exceeds about 72°, the recorded signal cannot completely be erased by an external magnetic field of 180 Oe. Therefore, it is preferred to adjust the recording film so that the inclination α of the tangent line is smaller than 72°.

Examples of production processes of magneto-optical recording medium of the present invention and the structure of the magnetic film produced by the processes are enumerated below.

Figure 43:
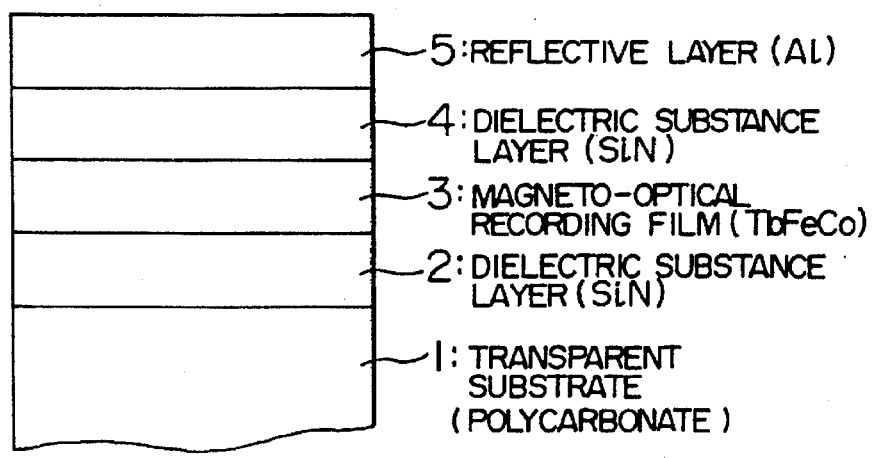
FIG. 43 is a sectional view illustrating the film structure of the magneto-optical recording medium according to Example 5.

(1) On a transparent substrate are laminated successively by means of continuous sputtering the first inorganic dielectric substance layer, an amorphous perpendicular magnetic film formed of a rare earth metal-transition metal alloy the second inorganic dielectric substance layer and a reflecting layer, to form a magneto-optical recording medium having a film structure of FIG. 43. Then, the magneto-optical recording medium is heated at 60°–150° C. for 2–10 minutes. Thus, a magnetic film as shown in FIG. 37 can be formed.

When the magneto-optical recording media of the present invention are respectively subjected to the above-mentioned torque curve determination at varied sample temperatures and the correlation between the sample temperature and the peak values of A and B shown in FIG. 38 is plotted as a graph, they all show a characteristic feature as shown in FIG. 40. That is, as the sample temperature increases the peak value of A and the peak value of B both gradually decrease and reach zero at approximately the same temperature (one and the same temperature in the example of FIG. 40). The temperature at which the peak value A becomes zero and the temperature at which the peak value B becomes zero must not necessarily the same. When the temperature at which the peak value of A becomes zero (i.e., Curie temperature) is designated as Tc, it is only necessary that the temperature at which the peak value of B becomes zero is in the range of Tc ±50° C.

That is, the magneto-optical recording medium of Example 5 of the present invention comprises: the magnetic film which has a magnetic moment component of a direction inclined toward the direction perpendicular to the film face, and the inclined magnetic moment component mentioned above and the magnetic moment component in the direction perpendicular to the film face both approach zero when the magnetic film is heated up to the neighbourhood of its Curie temperature; or the magnetic film which has, in the film thickness direction, a portion in which a magnetic moment is in the direction not perpendicular to the film face and a portion in which a magnetic moment is in the direction perpendicular to the film face, and the magnetic moment in the direction not perpendicular to the film face and the magnetic moment in the direction perpendicular to the film face both approach zero when heated up to the neighbourhood of its Curie temperature; or the magnetic film which has, in the film thickness direction, a portion in which perpendicular magnetic anisotropy energy is smaller than that in other portions.

Figure 41:
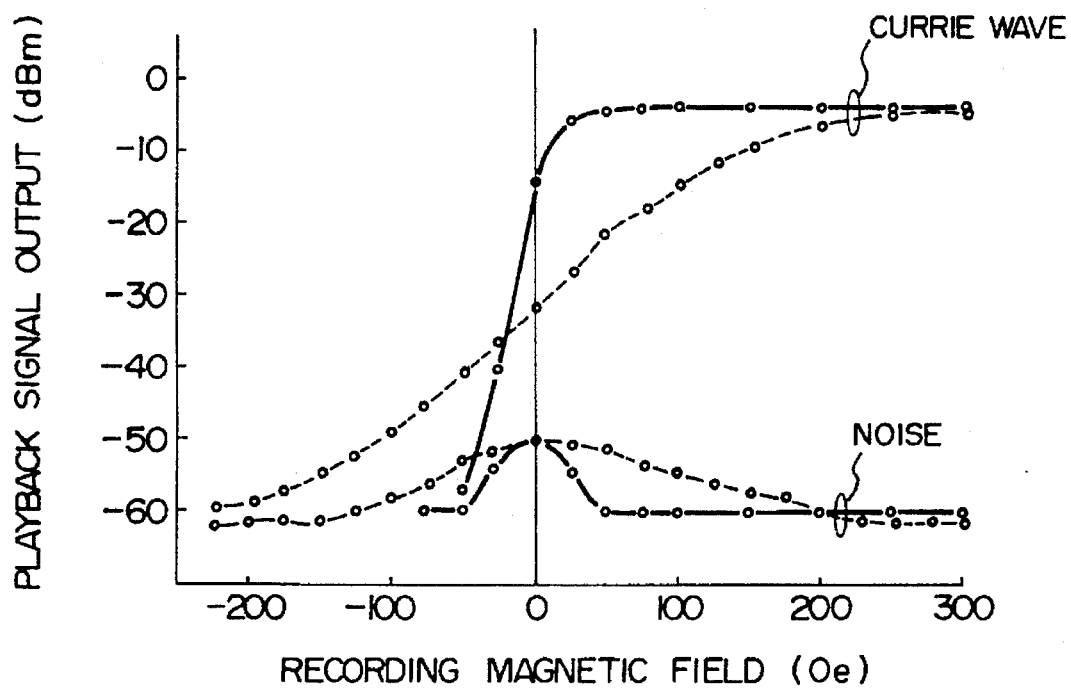
FIG. 41 is a graph showing the external magnetic field characteristic of the magneto-optical recording medium according to Example 5.
Figure 42:
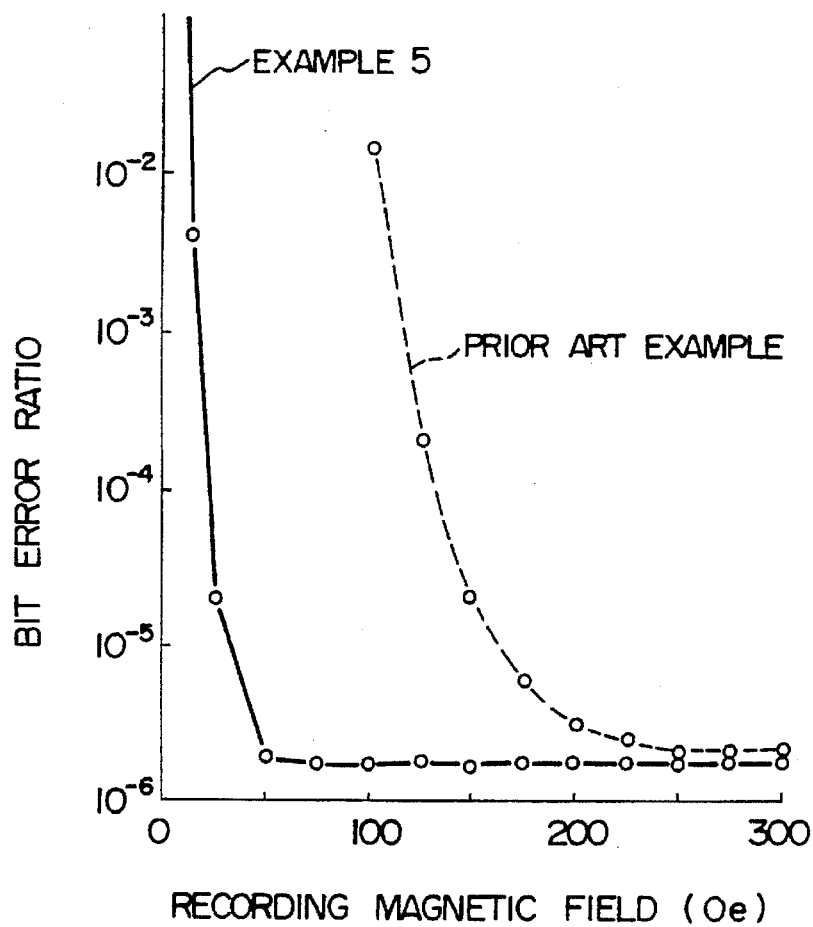
FIG. 42 is a graph showing the bit error occurrence characteristic of the magneto-optical recording medium according to Example 5.

FIG. 41 shows the external magnetic field characteristic of the magneto-optical recording medium according to the present Example, and FIG. 42 shows the bit error occurrence characteristic of the magneto-optical recording medium according to the present Example. The sample used is a magneto-optical recording medium having a film structure as shown in FIG. 43. As shown in FIG. 41, the magneto-optical recording medium of the present Example can reach saturation magnetization by application of an external magnetic field of at least 50 Oe in the recording direction or in the erasing direction and, as shown in FIG. 2, can reduce the bit error occurrence rate to the lowest level by application of an external magnetic field of at least 50 (Oe) in the recording direction.

The magneto-optical recording medium of the present Example can reduce the strength of external magnetic field necessary for recording and erasing of information by 150 Oe or more as compared with prior art magneto-optical recording medium (indicated with broken lines in FIGS. 41 and 42) which uses a perpendicular magnetic film as the magneto-optical recording film.

Hereunder, examples of the process for producing the magneto-optical recording medium according to the present invention and the structures of magnetic films produced by the respective processes are enumerated.

Figure 37A:
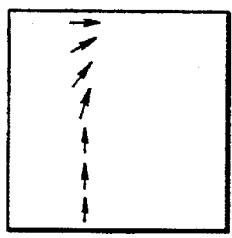
FIGS. 37a through 37j are schematic diagrams showing the structure of the magnetic film according to Example 5.
Figure 37B:
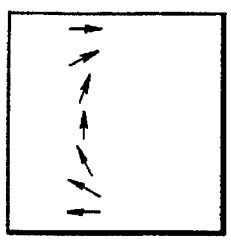
Figure 37C:
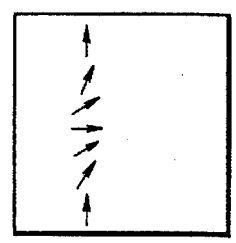
Figure 37D:
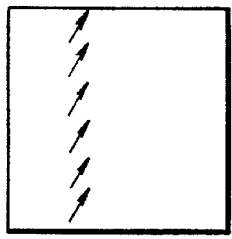

① On a transparent substrate are laminated successively by means of continuous sputtering the first inorganic dielectric substance layer, an amorphous perpendicular magnetic film based on rare earth metal-transition metal, the second inorganic dielectric substance layer and a reflecting layer, to form a magneto-optical recording medium having a film structure of FIG. 9. Then, the magneto-optical recording medium is heated at 60°–150° C. for 2–10 minutes. Thus, a magnetic film as shown in FIG. 37(d) can be formed.

② The first inorganic dielectric substance layer is formed by sputtering on a transparent substrate. Then, an amorphous alloy based on rare earth metal-transition metal is sputtered onto the inorganic dielectric substance layer to a desired film thickness while appropriately changing the composition of sputtering gas. For example, each time the film thickness of the magnetic layer reaches ½ to 1/10 of the total film thickness, the sputtering gas is changed from pure Ar to an Ar gas containing 1–20% by volume of $N_2$ gas or an Ar gas containing 0.5–10% by volume of $O_2$ gas. In this way, magnetic films as shown in FIGS. 37(a), (b), (c) and (g) can be formed. Subsequently, the second inorganic dielectric substance, layer and a reflecting film are laminated on the magnetic film prepared above by means of continuous sputtering.

③ The first inorganic dielectric substance layer is formed by sputtering on a transparent substrate, and then magnetic films different in perpendicular magnetic anisotropy are alternately formed on the second inorganic dielectric substance layer. As the example of the combination of magnetic films different in perpendicular magnetic anisotropy, mention may be made of an amorphous alloy based on a rare earth metal-transition metal and an alloy comprising Co as the main component and at least one metal selected from the group consisting of Cr, Fe, Ni, Mn, Pt and Ag. Thus, magnetic films as shown in FIGS. 37(a), (b), (c) and (g) can be formed. Subsequently, the second inorganic dielectric substance layer and a reflecting film are laminated by means of continuous sputtering on the magnetic film.

Figure 37E:
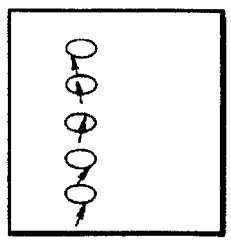
Figure 37F:
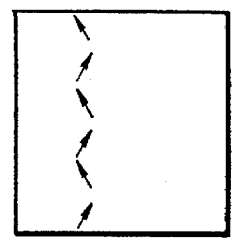
Figure 37G:
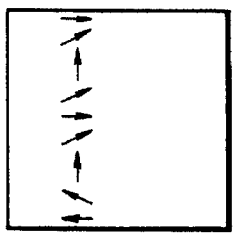
Figure 37H:
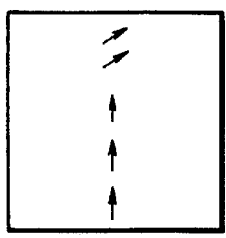
Figure 37I:
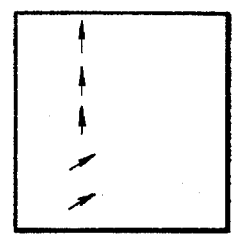
Figure 37J:
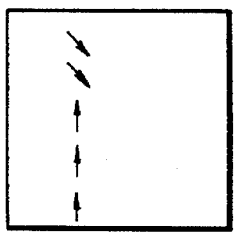

④ The first inorganic dielectric substance layer is formed on a transparent substrate by means of sputtering. Then, on the first inorganic dielectric substance layer are successively laminated Tb-Fe-Co-based alloys different in the content of a rare earth element selected from the group consisting of Gd, Ce, Dy and Nd or in the content of a transition metal selected from the group consisting of Ni, Cr and Mn. Thus, a magnetic film which assumes a helical spin structure as shown in FIG. 37(e) or a magnetic film which assumes a cant spin structure as shown in FIG. 37(f) can be formed, depending on the correlation between the exchange interaction between atoms and the anisotropic energy. Subsequently, the second inorganic dielectric substance layer and a reflecting film are laminated on the magnetic film by means of continuous sputtering.

⑤ The first inorganic dielectric substance layer is formed on a transparent substrate by sputtering. Then, on the first inorganic dielectric substance layer are successively laminated Tb-Fe-Co-based alloys different in the content of non-magnetic element selected from the group consisting of Nb, Ti, W, Bi, V, Al, Si, Pt, Ag and Rh. In this way, the anisotropic energy is decreased, and a magnetic film of a structure as shown in FIG. 37(d) can be formed. Subsequently, the second inorganic dielectric substance layer and a reflecting film are laminated on the magnetic film by means of continuous sputtering.

The magneto-optical recording medium of the present Example 5 can be further improved in external magnetic field sensitivity by laminating on the magneto-optical recording film 4 an auxiliary magnetic film which exerts an exchange bonding force on the recording film 4, and vice versa. The auxiliary magnetic film used may be an alloy film based on a rare earth metal-transition metal-additive element having a magnetic characteristic expressed by the formula $$2\pi M_S^2(T_{WR}) \geq K_U(T_{WR})$$

wherein $M_S(T_{WR})$ is the saturation magnetization at the recording temperature and $K_U(T_{WR})$ is the perpendicular magnetic anisotropic energy. The rare earth metal may be, for example, those whose symbol of element is expressed by Gd, Tb, Dy, Nd or Ho. The transition metal may be, for example, those whose symbol of element is expressed by Fe, Co or Ni. The additive elements may be those whose symbol of element is expressed by Au, Ag, Cu, Pt, Al, Nb or Cr. Particularly preferred among said alloys are Gd-Fe-Cu alloy, Tb-Fe-Pt alloy, and the like.

Figure 44:
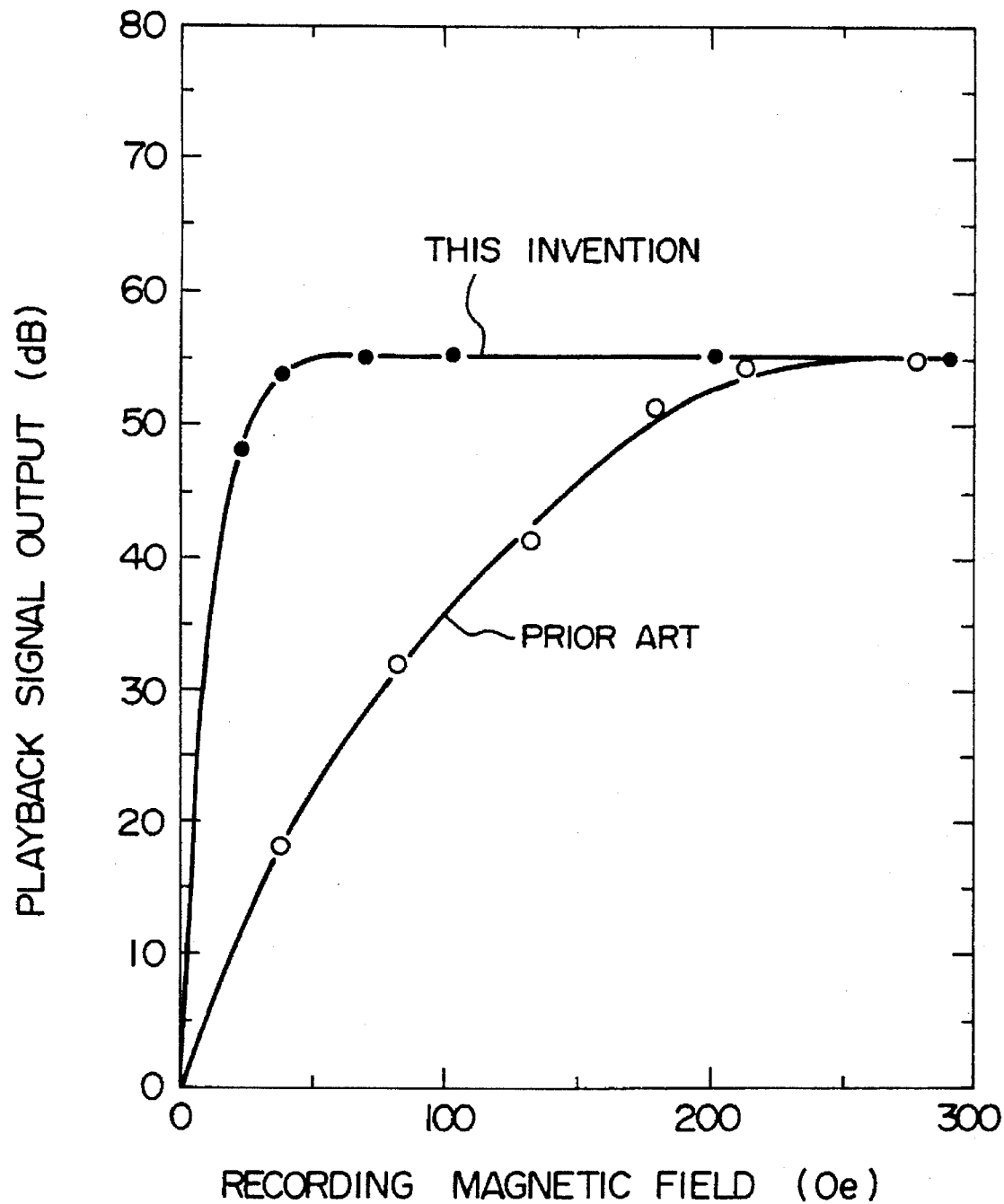
FIG. 44 is a graph showing the magnetic field modulation recording characteristic of the magneto-optical recording medium according to Example 5 having an auxiliary magnetic film.

FIG. 44 shows the magnetic field modulation recording characteristic of the magneto-optical recording medium of Example #5 provided with an auxiliary magnetic film. The sample used is a magneto-optical disk having the film structure shown in FIG. 45, and signals were recorded under the conditions shown in FIG. 44. As is apparent from FIG. 44, the magneto-optical recording medium of the Example #5 shows a saturation recording magnetic field of not more than 50 (Oe).

Examples 6–9 that follow describe examples wherein the present invention is applied to magneto-optical recording media of a super-resolution system disclosed, for example, in Japanese Patent Kokai (Laid-open) No. 1-143042.

EXAMPLE 6

Figure 46:
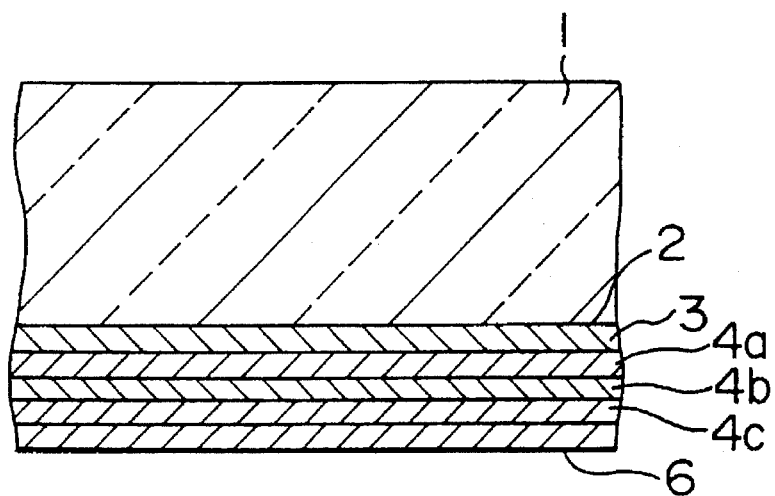
FIG. 46 is a sectional view of the principal part of the magneto-optical recording medium according to Example 6.
Figure 47:
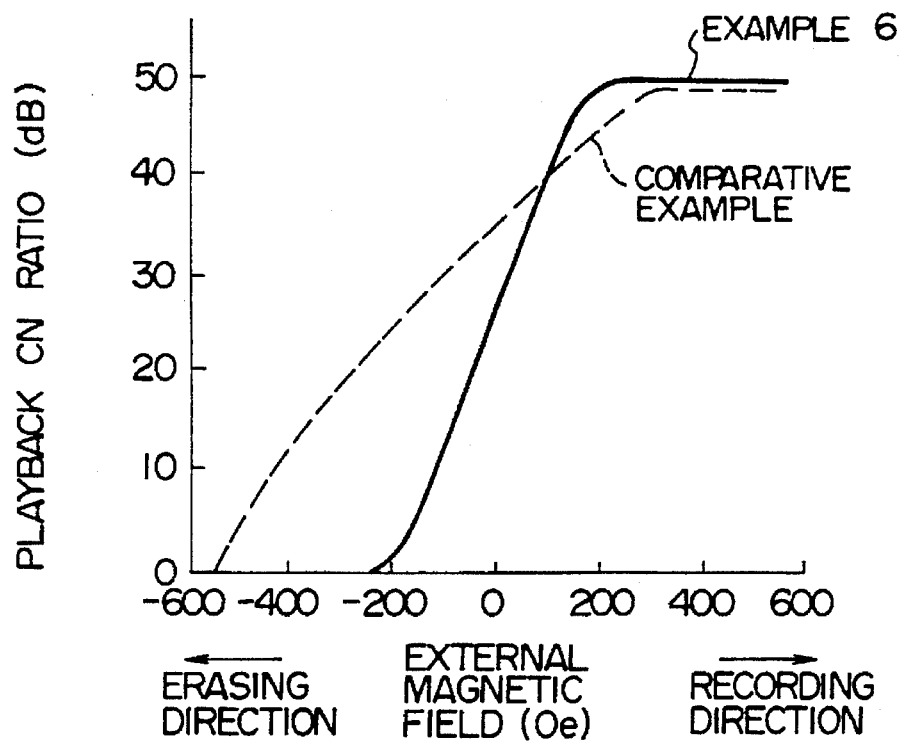
FIG. 47 is a graph showing the effect of the magneto-optical recording medium according to Example 6.

Example 6 of the present invention is described below with reference to FIGS. 46 and 47. FIG. 46 is a sectional view of the principal part of the magneto-optical recording medium according to the present Example. FIG. 47 is a graph showing the effect of the present Example.

As shown in FIG. 46, the magneto-optical recording medium may comprise a transparent substrate 1 and, successively laminated on the preformat pattern-carrying surface 2 of the substrate 1, enhancement film 3 for increasing the apparent Kerr angle of rotation and improving the CN ratio of playback signal, the first to third magnetic films 4a, 4b and 4c each comprising an amorphous perpendicular magnetic film based on rare earth-transition metal having ferrimagnetism, and a protective layer 6. The transparent substrate 1 used is a glass plate having a preformat pattern 2 transferred onto its one side by the so-called 2P method. On the preformat pattern 2 of the glass substrate 1, were formed by continuous sputtering a SiN enhancement film 3 of a film thickness of about 850 Å, the first magnetic film 4a comprising Gd-Fe-Co-based amorphous perpendicular magnetic film of a film thickness of about 300 Å, the second magnetic film 4b comprising a Tb-Fe-Co-Nb-based amorphous perpendicular magnetic film of a film thickness of about 100 Å, the third magnetic film 4c comprising a Tb-Fe-Co-based amorphous perpendicular magnetic film of a film thickness of about 400 Å and a SiN protective layer 14 of a film thickness of about 800 Å, to obtain the magneto-optical recording medium of Example 6. The third magnetic film 4c is adjusted to a composition such that the Tb sublattice magnetization is predominant at room temperature.

FIG. 47 shows respective external magnetic field characteristics of the magneto-optical recording medium according to the Example 6 and of a magneto-optical recording medium according to a Comparative example provided with a Tb-Fe-Co-based amorphous perpendicular magnetic film having a composition which makes the FeCo sublattice magnetization predominant in place of the third magnetic film 4c used in the magneto-optical recording medium of Example 6. As the ordinate of the graph of FIG. 47 is plotted the CN ratio of playback signal and as the abscissa is plotted the strength of external magnetic field applied. The positive value of the external magnetic field indicates the magnetic field of the recording direction and the negative value the magnetic field of the erasing direction. As is apparent from the graph, whereas the magneto-optical recording medium according to Comparative Example provided, as the third magnetic film 4c, with a Tb-Fe-Co-based amorphous perpendicular magnetic film having a composition which makes the FeCo sublattice magnetization predominant does not reach saturation magnetic field unless external magnetic fields of about 300 Oe or more in the recording direction and of about 600 Oe or more in the erasing direction are applied, the magneto-optical recording medium according to Example 6 provided as the third magnetic film 4c with a Tb-Fe-Co-based amorphous perpendicular magnetic film having a composition which makes the Tb sublattice magnetization predominant can reach the saturation magnetization merely by application of an external magnetic field of about 200 Oe or more in the recording direction and in the erasing direction, respectively. Consequently, the size reduction, weight reduction and power consumption reduction of the magnetic field and, in its turn, of the driving apparatus can be attained, and the overwrite of information through the magnetic field modulation system can be realized.

Although a glass substrate was used as the transparent substrate 1 in the Example and Comparative Example described above, similar results were obtained also when a resin substrate was used in place of the glass substrate. Further, though SiN was used as the enhance film 3 and the protective film 6 in the Example and the Comparative Example, similar results were obtained also when other inorganic dielectrics, such as $SiO_2$, SiO, $Si_2N_3$, AlN, etc., were used. Further, similar results were obtained also when an UV-curing resin protective film was formed in place of the inorganic protective film 6. Further, similar results were obtained also when the film thickness of each film was changed variously. Further, similar results were obtained also when a Gd-Fe- or Gd-Co-based amorphous perpendicular magnetic film was used as the first magnetic film 4a and a Tb-Fe-, Tb-Fe-Co-, Tb-Fe-Co-Cr- or Tb-Fe-Co-Pt-based amorphous perpendicular magnetic film was used as the second magnetic film 4b.

EXAMPLE 7

Figure 48:
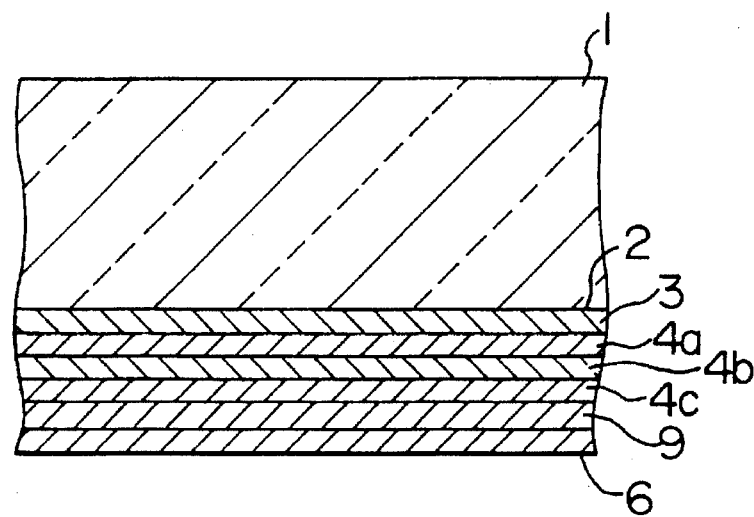
FIG. 48 is a sectional view of the principal part of the magneto-optical recording medium according to Example 7.

Example 7 of the present invention is described below with reference to FIGS. 48 and 49. FIG. 48 is a sectional view of the principal part of the magneto-optical recording medium according to the present invention and FIG. 49 is a graph showing the effect of the present Example.

As shown in FIG. 48, the magneto-optical recording medium of the present Example is characterized by having an oxide layer 9 formed on the surface of the third magnetic film 4c. The oxide layer 9 is formed, after forming the enhance film 3 and the first to third magnetic film 4a, 4b and 4c on the glass substrate 1 by continuous sputtering, by stopping film formation once, then adjusting the amount of oxygen in the sputtering chamber and heating the third magnetic film 4c. Thereafter the degree of vacuum in the sputtering chamber is adjusted again and a protective layer 6 of predetermined thickness is formed by sputtering, whereby the magneto-optical recording medium of Example 7 can be formed. Other parts than the oxide layer 9 are formed in the same manner as in the magneto-optical recording medium of Example 6.

Figure 49:
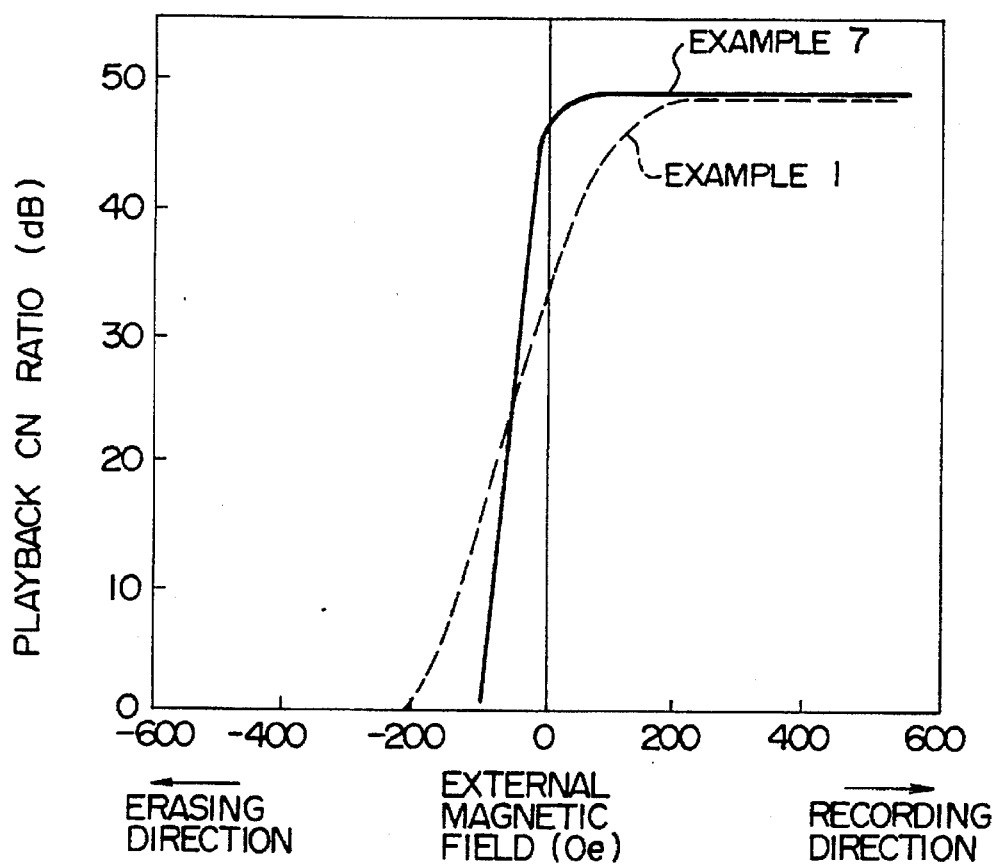
FIG. 49 is a graph showing the effect of the magneto-optical recording medium according to Example 7.

FIG. 49 shows the external magnetic field characteristics of the magneto-optical recording medium according to the Example 7 and of the magneto-optical recording medium according to the Example 6. As is apparent from the graph of FIG. 49, the magneto-optical recording medium of the present Example can reach the saturation magnetic field merely by application of external magnetic fields of respectively about 100 Oe or more in the recording direction and in the erasing direction, and thus has an external recording sensitivity further improved by as much as about ±100 Oe as compared with the magneto-optical recording medium of Example 6.

Though the heat-oxidized layer was formed on the surface of the third magnetic film 4c in the Example 7 described above, a similar result to the above was obtained also by forming a heat-oxidized layer 9 similar to that described above on the surface of the first magnetic film 4a or the second magnetic film 4c. A similar result was obtained also by forming a heat-nitrided layer in place of the heat-oxidized layer 9. The heat-nitrided layer can be formed, after forming the magnetic film to be nitrided by sputtering, by adjusting the amount of oxygen in the sputtering chamber and heating the magnetic film to be nitrided. Further, a similar result to the above was obtained also when the materials of the transparent substrate 1 and the protective film 1, and the position at which the heat-oxidized layer 9 or the heat-nitrided layer was formed were altered as tabulated in the explanation of Example 6.

EXAMPLE 8

Figure 50:
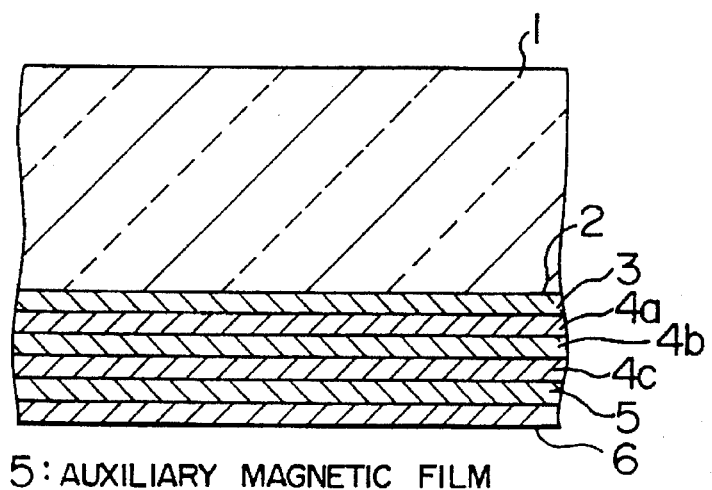
FIG. 50 is a sectional view of the principal part of the magneto-optical recording medium according to Example 8.
Figure 51:
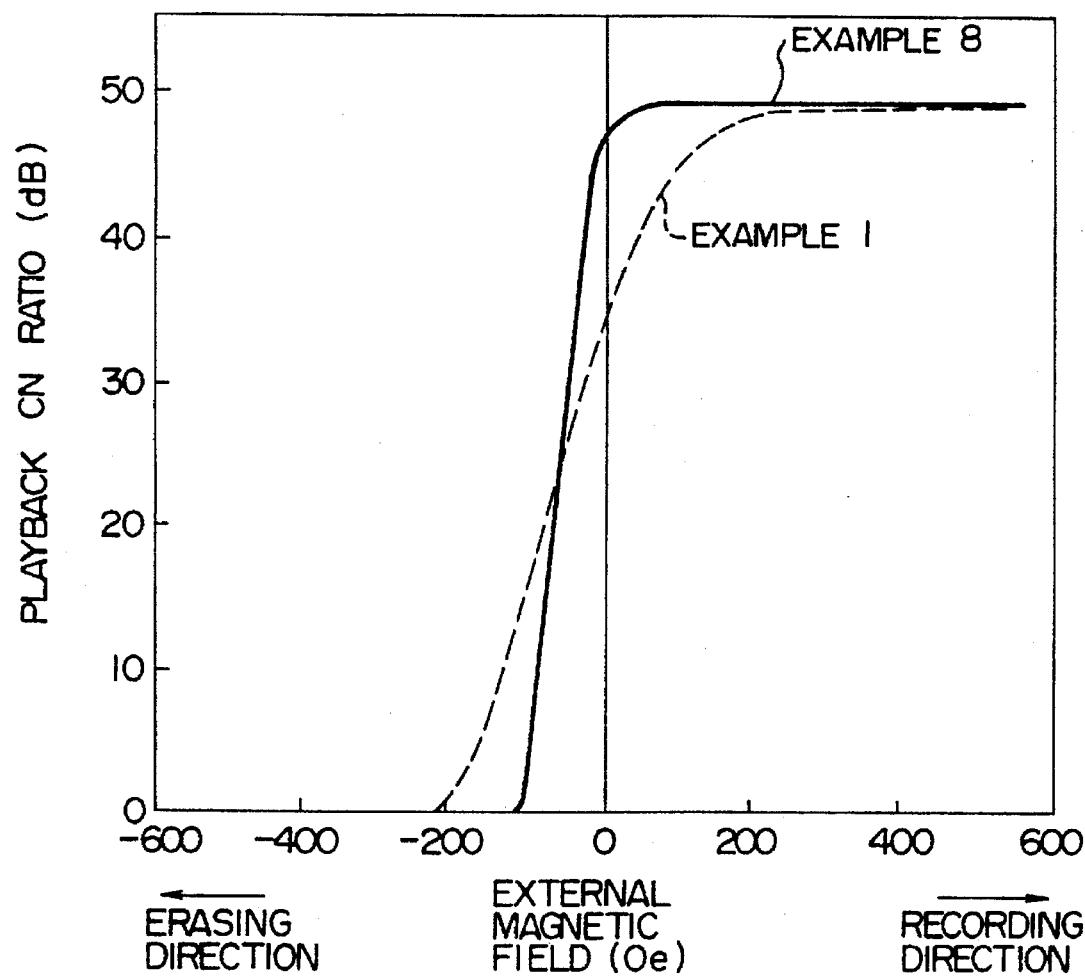
FIG. 51 is a graph showing the effect of the magneto-optical recording medium according to Example 8.

Example 8 of the present invention is described below with reference to FIGS. 50 and 51. FIG. 50 is a sectional view of the principal part of the magneto-optical recording medium according to the present Example. FIG. 51 is a graph showing the effect of the present Example.

As shown in FIG. 50, the magneto-optical recording medium of the present Example is characterized by having an auxiliary magnetic film 5 provided in contact with the third magnetic film 4c. The auxiliary magnetic film 5 used is a rare earth metal-transition metal-based amorphous perpendicular magnetic film wherein the transition metal sublattice magnetization is predominant at the temperature at which the recording magnetic domain is formed in the third magnetic layer 4c (that is, temperature near to the Curie temperature of the third magnetic layer 4c or near to the compensation temperature). Other films, namely the enhance film 3, the first to the third magnetic films 4a, 4b and 4c and the protective film 6, are the same as in Example 6. The auxiliary film 5 is formed together with other films by continuous sputtering.

FIG. 51 shows the external magnetic field characteristics of the magneto-optical recording medium according to Example 8 provided as the auxiliary magnetic film 5 with a Tb-Fe-Co film of the above-mentioned composition having a film thickness of 50 Å and of the magneto-optical recording medium according to the Example 6. As is apparent from the graph of FIG. 51, the magneto-optical recording medium of the present Example can reach saturation magnetization merely by application of external magnetic fields respectively of about 100 [Oe] or more in the recording direction and in the erasing direction, and thus has an external recording sensitivity improved by as much as about ±100 [Oe] as compared with the magneto-optical recording medium of Example 6. This is presumably because the formation of the auxiliary magnetic film 5 reduces the floating magnetic field coming from the surrounding region which acts on the region wherein the recording magnetic domain is to be formed or on the region wherein the magnetic domain is to be erased.

Although the auxiliary magnetic film 5 was formed only on the surface side of the third magnetic film 4a (namely, the protective film 6 side) in the Example 8 described above, a similar result was obtained also by forming the auxiliary magnetic film 5 on the back side of the third magnetic film 4c (namely, the transparent substrate 1 side). Further, the same result as the above was obtained also by forming a similar auxiliary magnetic film 5 on the surface of the first magnetic film 4a or the second magnetic film 4c. A similar result to the above was obtained also when the material of the transparent substrate 1 and the material of the protective film 6 were altered as tabulated in the explanation of Example 6.

EXAMPLE 9

Figure 53:
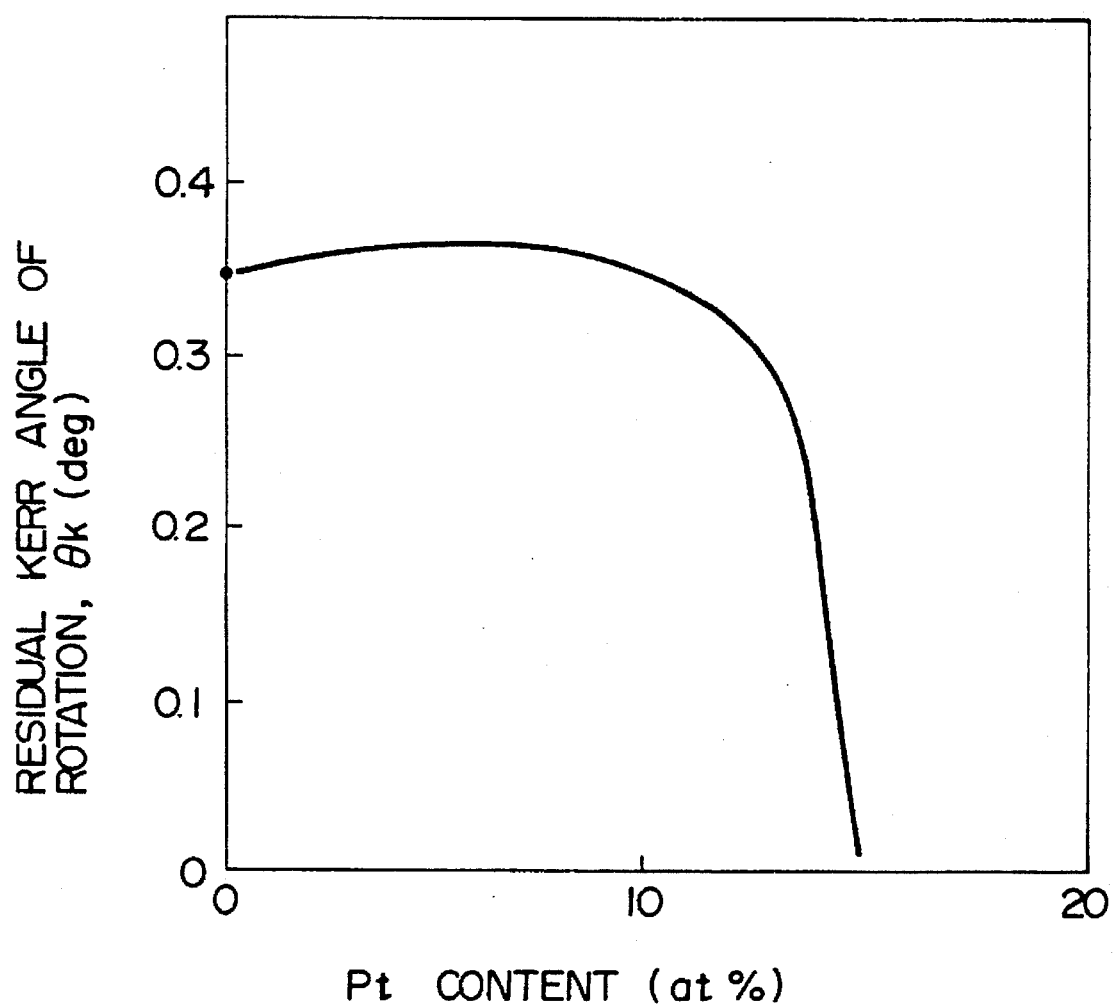
FIG. 53 is a graph showing the relation between the residual Kerr angle of rotation of the magneto-optical recording medium according to Example 9 and the amount of platinum added to the auxiliary magnetic film thereof.

Example 9 of the present invention is described below with reference to FIGS. 52 to 55. FIG. 52 is a graph showing the relationship between the Pt content of the auxiliary magnetic film and the perpendicular magnetic anisotropy constant, FIG. 53 is a graph showing the relationship between the Pt content of the auxiliary magnetic film and the residual Kerr angle of rotation, FIG. 54 is a graph showing the relationship between the Pt content of the auxiliary magnetic film and the playback CN ratio and FIG. 55 is a graph showing the relationship between the Pt content of the auxiliary magnetic film and the minimum erasing magnetic field necessary for erasing recorded signals.

The magneto-optical recording medium of the present Example is characterized by replacing the auxiliary magnetic film 5 of the magneto-optical recording medium according to the Example 8 with an auxiliary magnetic film formed out of a rare earth metal-transition metal-based amorphous alloy incorporated with at least one element selected from the group consisting of Au, Ag, Al, Cu, Pt, Nb, Nd, Ho, Gd and Cr. Other films, namely the enhance film 3, the first to third magnetic films 4a, 4b and 4c and the protective film 6 are respectively the same as in Example 6. The auxiliary magnetic film is formed together with other films by continuous sputtering. Accordingly, the sectional structure of the magneto-optical recording medium of the present Example is the same as in the magneto-optical recording medium of the Example 8 (cf. FIG. 50).

FIG. 52 shows the relationship between the Pt content of the auxiliary magnetic film and the perpendicular magnetic anisotropy constant in the magneto-optical recording medium according to Example 9. As is apparent from the Figure, the perpendicular magnetic anisotropic energy of the magneto-optical recording medium of the present example decreases with increase of the Pt content of the auxiliary magnetic film, and the axis of easy magnetization turns to the direction perpendicular to the film face when the Pt content of the auxiliary magnetic film exceeds about 13 atomic %. On the other hand, FIG. 53 shows the relationship between the Pt content of the auxiliary film and the residual Kerr angle of rotation in this magneto-optical recording medium. As is apparent from the Figure, the residual Kerr angle of rotation of the magneto-optical recording medium of the present invention is approximately constant until a Pt content of the auxiliary magnetic film of about 10 atomic % but decreases rapidly when the content exceeds 10 atomic %. It can be seen from the results shown in FIGS. 52 and 53 that the perpendicular magnetic anisotropic energy can be lowered without decreasing the Kerr angle of rotation by adding not more than 10 atomic % of Pt into the auxiliary magnetic film, in other words, the external magnetic field sensitivity of a magneto-optical recording medium can be enhanced without lowering its playback CN ratio.

Figure 54:
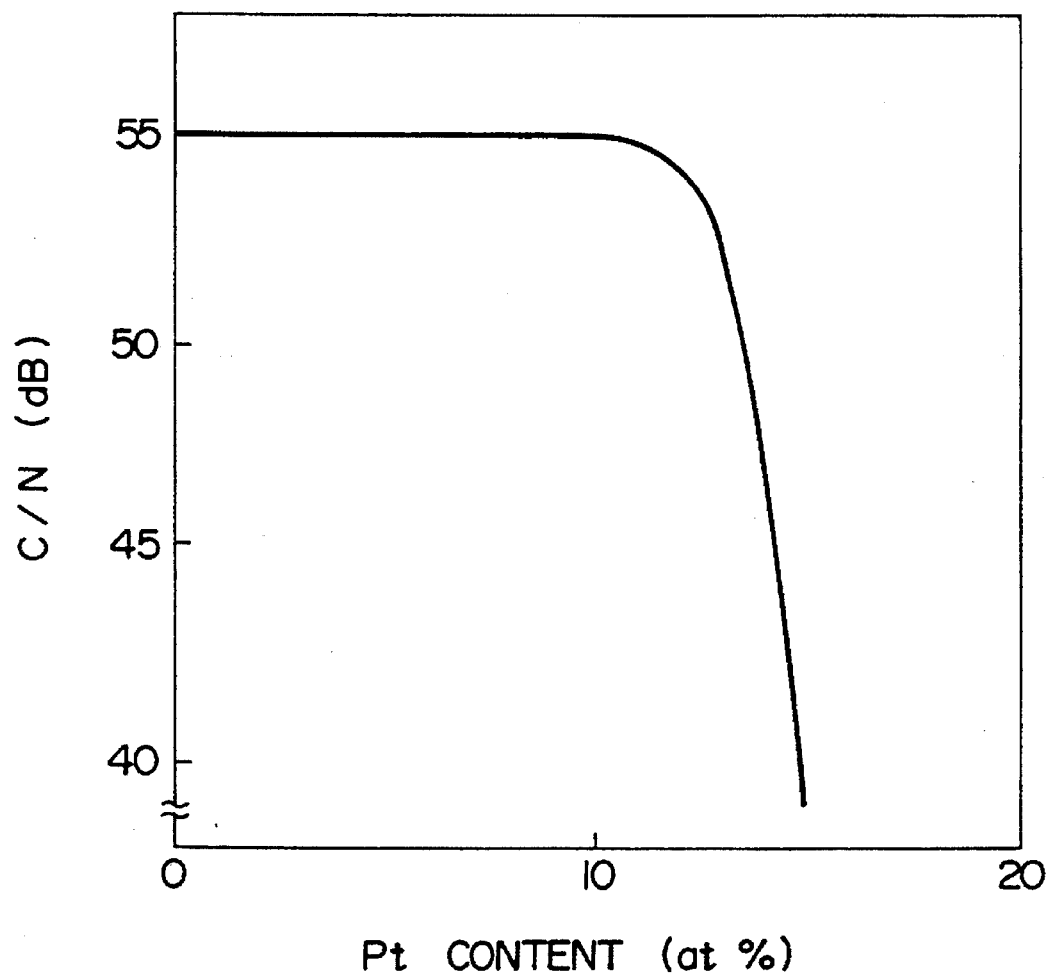
FIG. 54 is a graph showing the relation between the playback CN ratio of the magneto-optical recording medium according to Example 9 and the amount of platinum added to the auxiliary magnetic film thereof.
Figure 55:
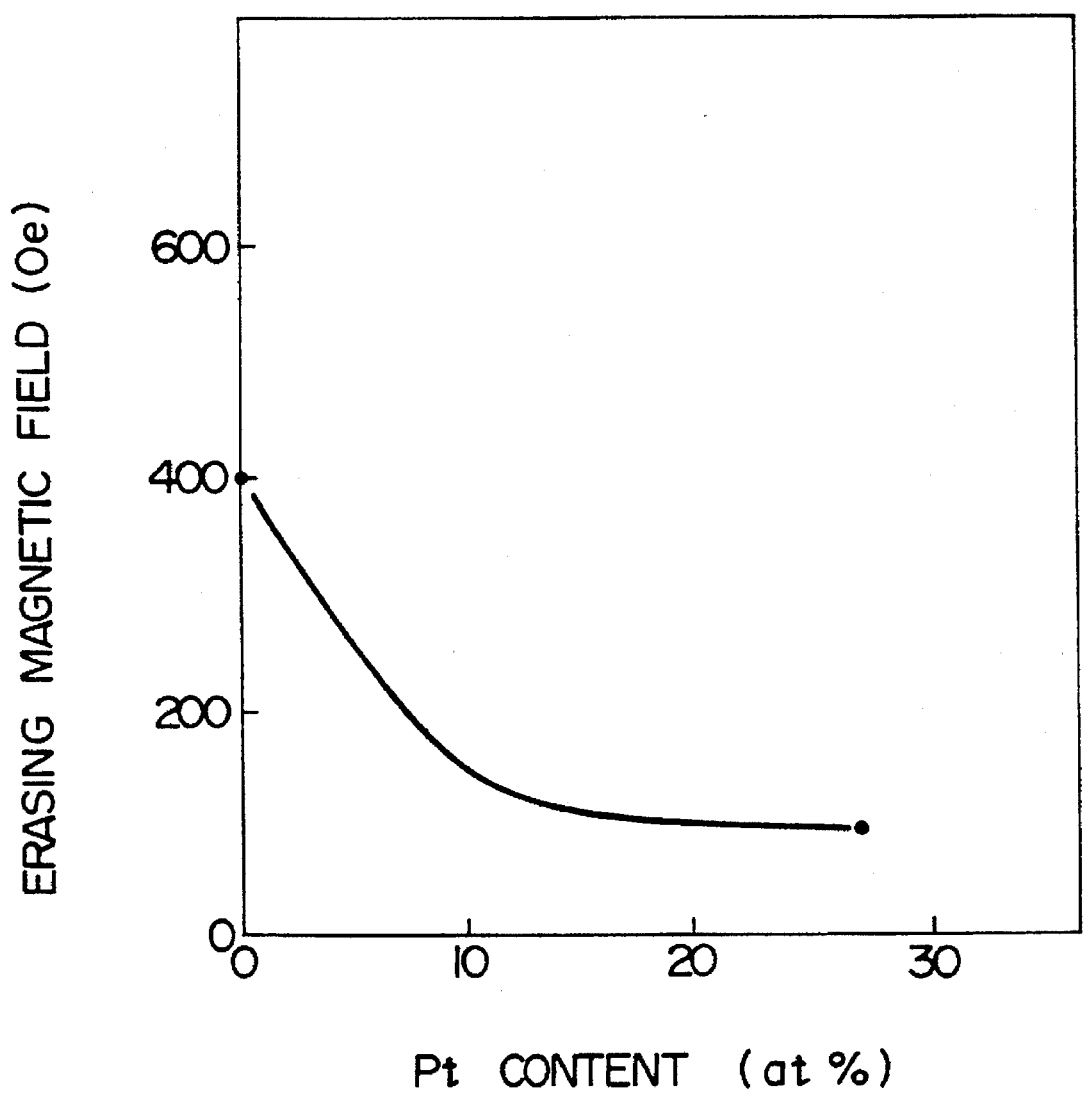
FIG. 55 is a graph showing the relation between the minimum erasing magnetic field of the magneto-optical recording medium according to Example 9 and the amount of platinum added to the auxiliary magnetic film thereof.

FIG. 54 shows the relationship between the playback CN ratio and the Pt content in a magneto-optical recording medium provided with a Pt-containing Tb-Fe-Co film as the auxiliary magnetic film. In this case, the CN ratio at the time of the maximum output power was determined under conditions of a film thickness of the auxiliary magnetic film of about 50 Å, a pulse width of recording signal of 60 nS, a pitch of recording magnetic domain of 1.53 μm and a linear velocity of the light beam relative to the medium of 7.54 m/s. As is apparent from the Figure, the playback CN ratio of the magneto-optical recording medium of the present Example is approximately constant till the Pt content of the auxiliary magnetic film reaches about 10–12 atomic % but abruptly decreases when it exceeds the value. FIG. 55 shows the relationship between the strength of the erasing magnetic field of the magneto-optical recording medium used for obtaining the data shown in FIG. 54 and the Pt content of the auxiliary magnetic film. In the present Example, the strength of erasing magnetic field was defined by the strength of external magnetic field necessary for attaining a noise level after erasing of −40 dB relative to the carrier wave level in recording. As is apparent from the Figure, when Pt is added into the auxiliary magnetic film the necessary erasing magnetic field decreases as the amount of Pt added increases. However, after the Pt content exceeds 10 atomic % the extent of lowering of the erasing magnetic field becomes very small even when Pt is further added. This reveals that the erasing magnetic field can be increased to its limit by adding about 10 atomic % of Pt to an auxiliary magnetic film comprising an amorphous perpendicular magnetic film based on rare earth metal-transition metal in which the transition metal sublattice is predominant at the temperature at which recording magnetic domains are formed in the third magnetic layer 4c.

Though Pt was used as the additive element for the auxiliary magnetic film in the Example 9, a result similar to the above was obtained also when Au, Ag, Al, Cu, Nb, Nd, Ho, Gd, Cr or the like was used in place of Pt. Further, similar results were obtained also when the materials of the transparent substrate 1 and of the protective film 6 and the position at which the auxiliary magnetic film 5 is formed were altered as tabulated in the explanation of Example 8.

Although the Examples embodying the means for attaining the first object mentioned above were described only with a case wherein a ferrimagnetic substance which is transition metal-rich in the neighborhood of the Curie temperature (FIG. 32) is used and a case wherein a ferrimagnetic substance which is rare earth metal-rich in the neighborhood of the Curie temperature (FIG. 33) is used, a ferromagnetic substance which is transition metal-rich in the neighborhood of the Curie temperature (FIG. 34) and a ferromagnetic substance which is rare earth metal-rich in the neighborhood of the Curie temperature may also be used. In the present Example, only the strength of magnetic moment of a magneto-optical recording film in the neighborhood of the Curie temperature is called into question, and the strength of magnetic moment of the magneto-optical recording film at room temperature offers no issue. For example, as shown in FIG. 36, even a ferrimagnetic substance which is rare-earth metal rich at room temperature can be treated as a transition metal rich ferrimagnetic substance if the substance becomes transition-metal rich in the neighborhood of the Curie temperature. In FIGS. 33–36, the black arrow indicate the magnetic moment of the transition metal and the white arrow the magnetic moment of the rare earth metal.

Next, examples embodying the means for attaining the second object mentioned above are described below.

EXAMPLE 10

Figure 56:
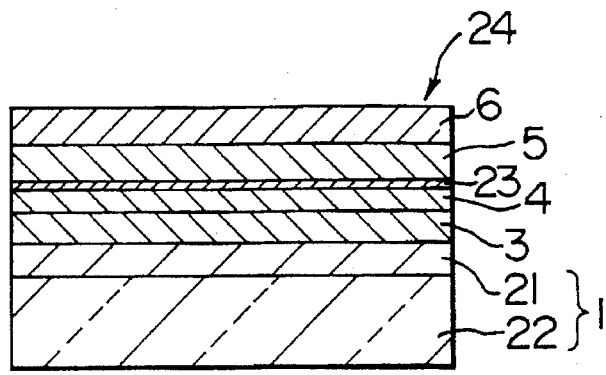
FIG. 56 is a sectional view showing the film structure of the medium according to Example 10.

As shown in FIG. 56, an ultraviolet-curing resin layer onto which a preformat pattern (not shown in the Figure) had been transferred by the so-called 2P method was closely adhered onto one side of a glass disk 22 to obtain a transparent substrate 1 having a preformat pattern.

Then, on the preformat pattern of the transparent substrate 1, were laminated successively from the transparent substrate 1 side, an enhancement layer 3 of a film thickness of about 850 Å made of a silicon nitride dielectric substance, a recording layer 4 of a film thickness of about 300 Å made of an amorphous terbium-iron-cobalt alloy, an intermediate layer 23 of a film thickness of about 200 Å made of an iron oxide of indefinite composition, an auxiliary layer 5 of a film thickness of about 1200 Å made of an amorphous terbium-dysprosium-iron-cobalt alloy and protective layer 6 of a film thickness of about 1000 Å made of silicon nitride, to obtain a disk single plate 24 shown in FIG. 56.

Finally, two disk single plate 24 prepared as described above were sticked together concentrically with the respective layers facing inside, to obtain a magneto-optical disk of air sandwich structure shown in FIG. 11.

EXAMPLE 11

A polycarbonate transparent substrate 1 having a preformat pattern (FIG. 57) formed on one side thereof was prepared by injection molding.

Figure 57:
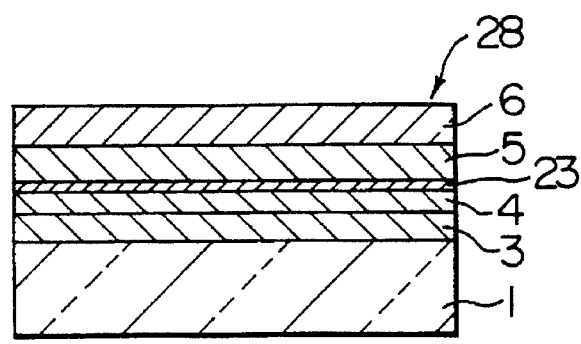
FIG. 57 is a sectional view showing the film structure of the medium according to Example 11.

Then, on the preformat pattern of the transparent substrate 1, were laminated successively from the transparent substrate 1 side an enhancement layer 3 of a film thickness of about 850 Å made of a silicon nitride dielectric substance, a recording layer 4 of a film thickness of about 250 Å made of an amorphous terbium-iron-cobalt alloy, an intermediate layer 23 of a film thickness of about 150 Å made of a cobalt oxide of indefinite composition, an auxiliary layer 5 of a film thickness of about 1200 Å made of an amorphous gadolinium-terbium-iron-cobalt alloy, and a protective layer 6 of a film thickness of about 1000 Å made of a silicon nitride dielectric substance, to prepare a disk single plate 28 shown in FIG. 57.

Lastly, two disk single plates 28 prepared as described above were stuck together concentrically with the respective layers facing inside, to prepare a magneto-optical disk of a closely adhered lamination structure shown in FIG. 12.

Figure 58:
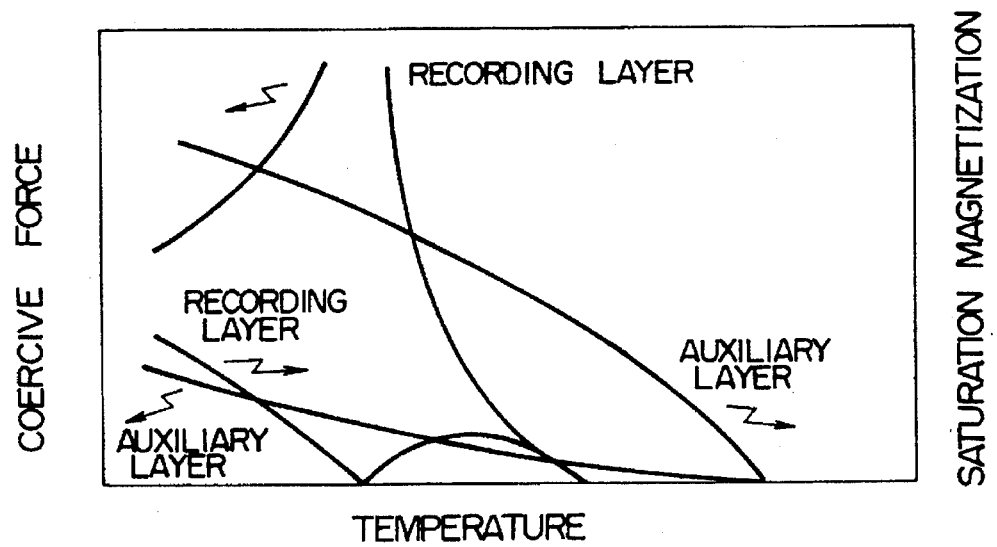
FIG. 58 is a graph showing the coercive force—temperature characteristic and the saturation magnetization—temperature characteristic of the recording layers and the auxiliary layers of Examples 10 and 11.

The coercive force-temperature characteristics and the saturation magnetization-temperature characteristics of the recording layer and the auxiliary layer formed on the respective magneto-optical disks of Examples 10 and 11 were examined to find that they all have the characteristic properties shown in FIG. 58. That is, the recording layer 4 has a higher coercive force at room temperature as compared with the auxiliary layer 5, and has a lower Curie point as compared with the auxiliary layer 5; the recording layer 4 shows a lower saturation magnetization at room temperature as compared with the auxiliary layer 5.

The respective magneto-optical disks of Example 10 and 11 were examined for the laser power of L level necessary for erasing of recording magnetic domains and the laser power of H level necessary for recording of information. Resultantly it was formed with both disks that, as shown in FIG. 59, previously recorded signals can be played back by application of a laser power of L level of about 4 mW or less and information can be recorded by application of a laser power of H level of about 14 mW or more.

Further, a signal of 1.85 [MHz] was overwritten on a track on which a signal of 4.93 [MHz] had been recorded, while the magnitude of the initialization magnetic field was changed variously, to examine the magnitude of the initialization magnetic field at which the signal of 4.93 [MHz] was erased completely and the signal of 1.85 [MHz] was overwritten. It was found that in the respective magneto-optical disks of Examples 10 and 11, as shown in FIG. 60, the previously recorded signal of 4.93 [MHz] was completely erased merely by application of initialization magnetic field of about 1 [KOe] and the signal of 1.85 [MHz] recorded later reached the saturation level, revealing that the size of the initialization magnet can be markedly reduced, as compared with the prior art disk wherein application of an initialization magnetic field of 5–6 [KOe] is necessary.

In the above examination, the signal of 1.85 [MHz] was overwritten with a low L level intensity-modulated to 6 mW and a high (H) level intensity-modulated to 14 mM for the magneto-optical disk of Example 10, and the signal of 1.85 [MHz] was overwritten with a L level intensity-modulated to 5.5 mW and an H level intensity-modulated to 12 mW for the magneto-optical disk of Example 11. The power of the playback laser beam was 1.5 mW.

The same effect as described above could be confirmed not only in the magneto-optical disks of Examples 10 and 11 but in any of the magneto-optical recording media according to all examples described above as the means for attaining the aforesaid second object.

Next, examples embodying the means for attaining the aforesaid third object are described below.

EXAMPLE 12

As shown in FIG. 60, an ultraviolet-curing resin layer 32 having a preformat pattern 2 transferred thereonto by the so-called 2P method was formed on one side of a glass plate 31 having a diameter of 10 inches, to prepare a transparent substrate 1 having a preformat pattern.

Then, on the preformat pattern 2 of the transparent substrate 1 were laminated successively from the transparent substrate 1 side an enhancement layer 3 of a film thickness of about 80 nm made of silicon nitride, a magnetic layer 4 of a film thickness of about 20 nm made of an amorphous terbium-iron-cobalt alloy having a Curie temperature of 190° C. and a compensation temperature of 100° C., an auxiliary magnetic layer 5 of a film thickness of about 5 nm made of an platinum-cobalt alloy, a heat control layer 8 of a film thickness of about 25 nm made of silicon nitride and a reflecting layer 11 of a film thickness of about 50 nm made of an aluminum-titanium alloy, to prepare a disk single plate. Thereafter, two disk single plates thus prepared were stuck together to prepare a magneto-optical disk of an air sandwich structure as shown in FIG. 11.

The magneto-optical disk was mounted on a driving apparatus and rotated at 3600 rpm. A laser beam spot was positioned at the outermost peripheral part which would have a linear velocity of 45 m/sec. Signals were recorded under the conditions of a recording frequency of 32 MHz, recording laser power of about 10 mW and external magnetic field of 300 Oe and the signals were played back by irradiating a playback laser beam of 4.0 mW. Resultantly, a playback C/N ratio of 49 dB could be obtained. FIG. 43 shows the playback C/N ratio-recording laser power characteristic of the magneto-optical disk of the present Example.

EXAMPLE 13

As shown in FIG. 61, an ultraviolet-curing resin layer 32 having a preformat pattern transferred thereonto by the so-called 2P method was formed on one side of a glass plate 31 having a diameter of 5 inches, to prepare a transparent substrate 1 having a preformat pattern.

Then, on the preformat pattern of the transparent substrate were laminated successively from the transparent substrate side an enhancement layer 3 of a film thickness of about 80 nm made of silicon nitride, a magnetic layer 4 of a film thickness of about 20 nm made of a terbium-iron-cobalt-niobium amorphous alloy having a Curie temperature of 185° C. and a compensation temperature of 80° C., a heat control layer 8 of a film thickness of about 25 nm made of silicon nitride and a reflecting layer 7 of a film thickness of about 50 nm made of an aluminum-titanium alloy, to prepare a magneto-optical disk of single plate structure shown in FIG. 12.

The magneto-optical disk was mounted on a driving apparatus and rotated at 3600 rpm. A laser beam spot was positioned at the outermost peripheral part which would have a linear velocity of 22.5 m/sec. Signals were recorded under the conditions of a recording frequency of 14.8 MHz, recording laser power of about 6.5 mW and external magnetic field of 300 Oe, and the signals were played back by irradiating a playback laser beam of 4.0 mW. Resultantly, a playback C/N ratio of 48 dB could be obtained.

Further, the same result as the above was obtained also when the film thickness of the enhancement layer 3 was changed in the range of 70–80 nm, the film thickness of the magnetic layer 4 in the range of 10–30 nm, the film thickness of the heat control layer 8 in the range of 20–100 nm and the film thickness of the reflecting layer in the range of 70 nm to about 50 nm.

EXAMPLE 14

Hereunder, an Example embodying the means for attaining the aforesaid fourth object is described with reference to a drawing. FIG. 62 shows the magneto-optical disk 33 according to the present Example. On a substrate 1a is formed 800 nm of a silicon nitride film 3 for enhancing the Kerr angle of rotation and are laminated thereon 20 nm of Tb-Fe-Co film 4 as the magneto-optical recording film, 300 nm of a silicon nitride film 6 as the protective film and 50 nm of an aluminum film 11 as a reflecting layer. On the other hand, on a substrate 1b is formed 30 nm of an aluminum film 34 as a reflecting film. The substrates 1a and 1b are sticked together with an adhesive agent 29.

EXAMPLE 15

Example 15 which embodies the means for attaining the aforesaid fifth object is described below. This example relates to an improvement of the adhesive agent 17 which adheres the substrate 1 with the inner peripheral spacer 15 and the outer peripheral spacer 16 in FIG. 11 shown before and of the adhesive agent 17 which adheres the recording disks 11 and 12 in FIG. 12.

The adhesive layer 17 is formed out of an adhesive agent comprising a hot melt adhesive, epoxy adhesive or the like as the main component and a silane coupling agent or titanium coupling agent added thereto. Examples of silane coupling agent include γ-glycidoxypropyltrimethoxysilane, β-(3,4-epoxycyclohexyl)ethyltrimethoxysilane, N-β-(aminoethyl)-γ-aminopropyltrimethoxysilane, γ-aminopropyltriethoxysilane, N-phenyl-γ-aminopropyltriethoxysilane, γ-mercaptopropyltrimethoxysilane, etc. Examples of the titanium coupling agent include titanium stearate, etc. The content of the silane coupling agent or titanium coupling agent in the adhesive agent is preferably 0.1–10% by weight. The adhesive layer may be formed, according to the type of adhesive agent used, for example by roll coating, spray coating, screen printing, etc.

Another example of the adhesive layer which may be used is one incorporated with an inorganic filler surface-treated with a silane coupling agent or titanium coupling agent.

Inorganic fillers which may be used are, for example, those of $SiO_2$, $SiO$, $Al_2O_3$, $AlN$ etc. in the form of particles or powders. The silane coupling agent or the titanium coupling agent used for surface treatment may be those enumerated above. The surface treatment may be conducted by coating the silane coupling agent or titanium coupling agent on the surface of the inorganic filler or impregnating fine spaces formed in the inorganic filler with the silane coupling agent or titanium coupling agent.

Hereunder, Experimental Examples are given below and reference is made to the effect of Example 15.

EXPERIMENTAL EXAMPLES 10 to 26

On one side of a glass plate having an inner diameter of 15 mm, outer diameter of 130 mm and thickness of 1.2 mm was transferred a desired preformat pattern by the so-called 2P method, to prepare a replica substrate. Then, a magneto-optical film was laminated on the preformat pattern of the replica substrate to prepare a magneto-optical recording single plate. Separately, an aluminum inner peripheral spacer having an inner diameter of 15 mm, outer diameter of 25 mm and thickness of 0.5 mm and an aluminum outer peripheral spacer having an inner diameter of 125 mm, outer diameter of 130 nm and thickness of 0.5 mm were prepared. Further, various adhesive agents were prepared which comprised an epoxy adhesive agent (Araldite, a trade name, mfd. by Ciba-Geigy Corp) as the principal component and one or more silane coupling agents and a titanium coupling agent added thereto in a combination listed in FIG. 63.

Both the front and the back faces of the inner peripheral spacer and the outer peripheral spacer were stuck together with their magneto-optical films facing inside, to prepare 17 kinds of magneto-optical recording media which were different in the type, combination and amount of silane coupling agent or titanium coupling agent added to the adhesive agent. The thickness of the adhesive layer was set at about 30 μm.

The magneto-optical recording media of Examples 10–26 were allowed to stand in an environment of a temperature of 120° C. and a relative humidity of 100% for 100 hours, then taken out and examined. The magneto-optical recording media of Experimental Examples 10–21 showed no abnormality in the adhesive part. In contrast, the magneto-optical recording media of Experimental Examples 22, 24 and 26 developed peeling at the interface of the replica substrate and the adhesive layer. In the magneto-optical recording media of Experimental Examples 23 and 25, it was observed that the filler had separated from the adhesive layer and diffused until above the magneto-optical film. These results reveal that the content of the silane coupling agent or titanium coupling agent in the adhesive agent is preferably about 0.1–10% by weight.

EXPERIMENTAL EXAMPLES 27–36

Magneto-optical recording single plates, inner peripheral spacers and outer peripheral spacers respectively similar to those used in Examples 10–26 were prepared. Separately, various adhesive agents were prepared which comprised an epoxy adhesive agent (Araldite, a trade name, mfd. by Ciba Geigy Corp.) as the principal component and a filler and a silane coupling agent added thereto in a combination listed in FIG. 64.

On both the front and the back faces of the inner peripheral spacer and the outer peripheral spacer which respectively had an adhesive layer formed thereon with the adhesive agent mentioned above, were adhered the magneto-optical single plates with their magneto-optical films facing inside, to prepare 17 kinds of magneto-optical recording media which were different in the type, combination and amount of the filler added to the adhesive agent. The thickness of the adhesive layer was set at about 30 μm.

These magneto-optical recording media were allowed to stand in an environment of a temperature of 120° C. and a relative humidity of 100% for 100 hours, then taken out and examined. The magneto-optical recording media of Experimental Examples 27–32 showed no abnormality in the adhesive part. In contrast, the magneto-optical recording media of Examples 33–36 developed peeling at the interface of the replica substrate and the adhesive layer. This result reveals that the content of the filler in the adhesive agent is preferably not more than 60% by weight.

Though explanation was given in the above Examples only of the adhesion of replica substrates with each other or a replica substrate with a spacer, the present invention can be applied also to the adhesion of a replica substrate and a center hub when applied to an optical disk provided with a center hub at the center of its magneto-optical recording single plate.

Further, although the above Example was described by way of an optical disk as the example, the present invention can be applied also to the production of magneto-optical recording media of other shapes, such as optical cards, etc.

EXAMPLE 16

Hereunder, Example 16 which embodies the means for attaining the aforesaid sixth object is described. This Example 16 relates to an improvement of the inorganic dielectric substance layer constituting the enhancement film 3.

Figures 64, 65:
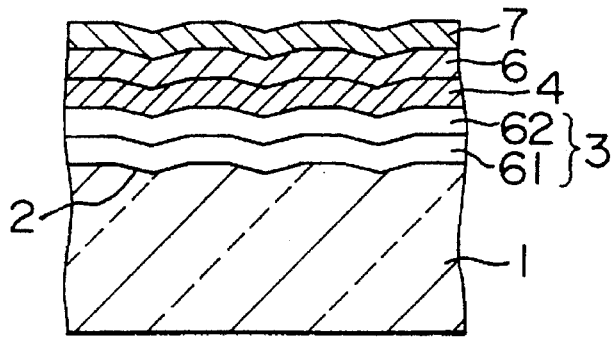
FIG. 64 is a table showing the compositions of the coupling agent and the filler in the adhesive agent.
FIG. 65 is a sectional view of the principal part of the magneto-optical recording medium according to Example 16.

FIG. 65 is a sectional view of the principal part of the magneto-optical recording medium according to Example 16. The magneto-optical recording medium comprises a transparent substrate 1 and, laminated on the preformat pattern 2-carrying surface of the substrate 1 successively from the transparent substrate 1 side, an oxide layer 61, a nitride layer 62, a magneto-optical recording film 4, a protective layer 6 and a reflecting layer 7, the oxide layer 61 and the nitride layer 62 together constituting an enhance film 3.

As the oxide layer 61, is used the oxide of a metal or a semimetal, such as $SiO_2$, $ZrO_2$, $Ta_2O_5$, $MgO$, $Y_2O_3$, $Al_2O_3$, $CaO$, etc. The film thickness of the oxide layer 1 is restricted to the range of 30–800 Å for reasons described above.

As the nitride layer 62, is used the nitride of a metal or a semimetal, such as AlN, BN, $Si_3N_4$, TaN, TiN, etc. The film thickness of the nitride layer is restricted to the range of 500–2000 Å for reasons described above.

Other matters are the same as in the magneto-optical recording media according to respective Examples described above, so that explanation thereof is omitted.

Next, experimental examples of the present Example 16 and comparative examples are described below. The material structure of the first enhancement film portion formed on a transparent substrate made of PC (polycarbonate) is, in Experimental Examples 37–46, $SiO_2$/SiN, SiMgO/SiN, $ZiO_2$/SiN, SiZrO/SiN, ZrYO/SiN, $Ta_2O_5$/AlN, AlTaO/SiAlN, SiYO/SiTaN, $Y_2O_3$/AlTiN, and GaSiO/SiAlN and, in Comparative Examples, SiN and SiO. The first enhancement film has a thickness of 900–1100 Å, the Tb-Fe-Co recording film 300 Å and the Al reflecting film 600 Å.

Figure 66:
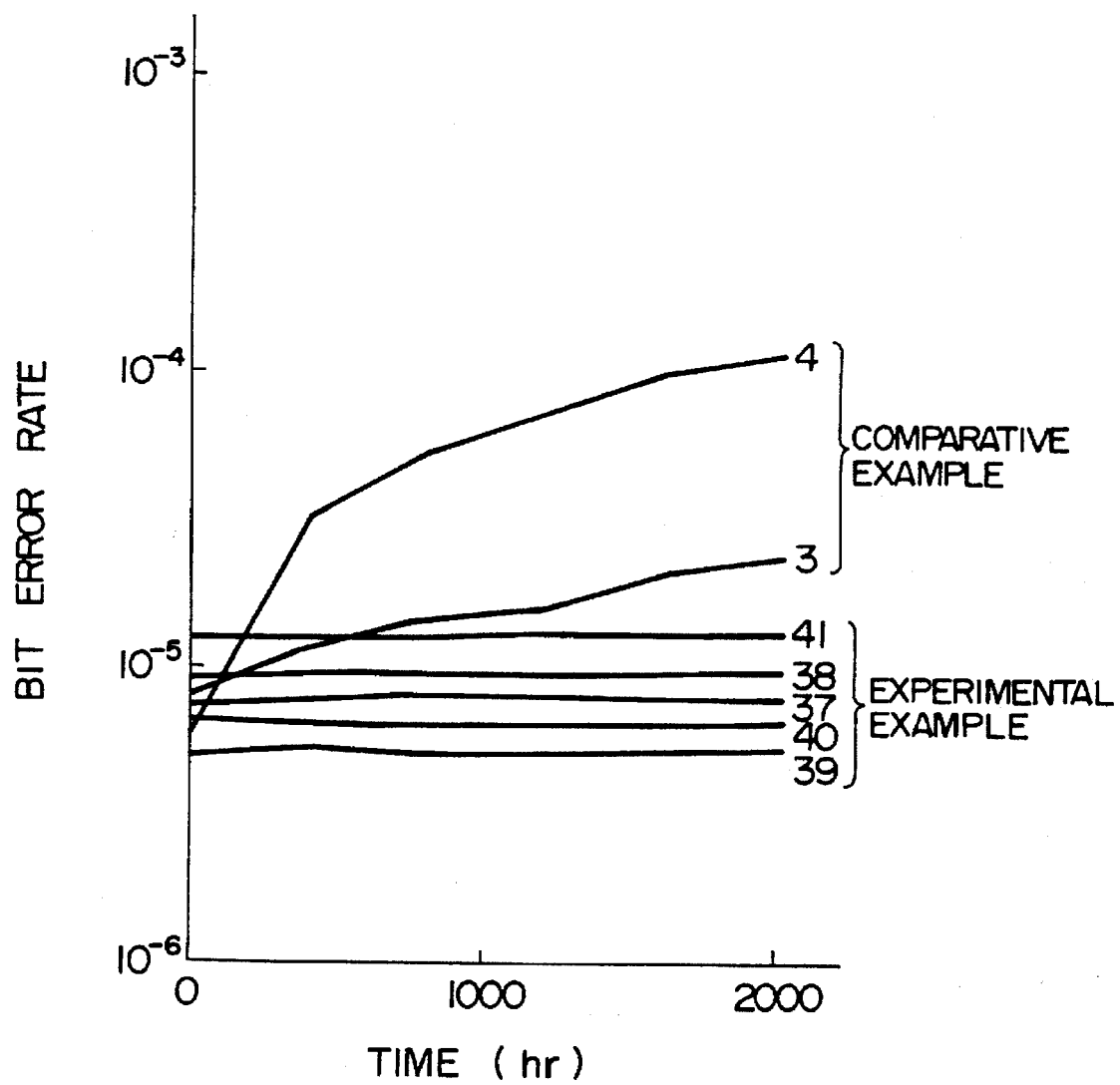
FIG. 66 is a graph showing the result of the corrosion resistance test of the magneto-optical recording medium according to Example 16.

The optical disk single plates of Experimental Examples 37–46 and the optical disk single plates of Comparative Examples 3 and 4 according to prior art examples were subjected to an acceleration test in an environment of 80° C. and 90% RH. The results are shown in FIG. 66.

As is apparent from the Figure, the disks of the prior art, particularly the disk of Comparative Example 4 obtained by forming on a transparent substrate an undercoat layer comprising SiO alone and forming directly thereon an optical recording film, show a very high bit error rate. In contrast, the disks of the present invention all show a very low bit error rate, demonstrating that they are stable in performance characteristic even after the lapse of long period of time and thus are optical information recording media having a high reliability.

Lastly, Examples relating to a process for producing a magneto-optical recording medium suitable for enhancing the external magnetic field sensitivity of a magneto-optical recording film are described below.

When an in-plane magnetization film of proper thickness is provided on the surface of a perpendicular magnetic film, the external magnetic field sensitivity of a magneto-optical recording medium can be improved. The in-plane magnetization film can be formed also by oxidizing the surface of the perpendicular magnetic film. When a perpendicular magnetic film is formed on a transparent substrate, the perpendicular magnetic film is oxidized by the water contained in the substrate, and an in-wall magnetization film is formed on the surface of the perpendicular magnetic film. When the amount of water contained in the transparent substrate is too large, an unnecessarily thick in-plane magnetization film is formed, resulting in a lowered external magnetic field sensitivity. When the amount of water contained in the transparent substrate is too small, an in-wall magnetization film of necessary film thickness is not formed, resulting in a lowered external magnetic field sensitivity, too. Accordingly, by regulating the amount of water contained in the transparent substrate, an in-wall magnetization film of optimum film thickness can be formed and resultantly a magneto-optical recording medium having a high external magnetic field sensitivity can be obtained.

According to the experiments of the present inventors, when a macromolecular compound is used as the transparent substrate, a higher external magnetic field sensitivity can be obtained by forming the perpendicular magnetic film within a shorter time after finishing the dehydration treatment of the transparent substrate under the above-mentioned conditions, and the external magnetic field sensitivity decreases as the standing time after the dehydration treatment is longer. Particularly when the standing time under the above-mentioned conditions exceeds 50 minutes, the external magnetic field sensitivity falls rapidly. On the other hand, when a glass plate provided on one side with a transfer layer comprising a macromolecular compound is used as the transparent substrate, a higher external magnetic field sensitivity can be obtained when the perpendicular magnetic film is formed after the lapse of a certain length of time from finishing the dehydration treatment of the transparent substrate under the above-mentioned conditions. Specifically, an approximately optimum external magnetic field sensitivity can be obtained by storing the substrate under the above-mentioned standing conditions for at least 4 hours. Examples 17–19 given below were conducted based on such findings.

EXAMPLE 17

A disk-shaped transparent substrate made of polycarbonate having a preformat pattern on one side (hereinafter referred to as PC substrate) was prepared by injection molding.

The PC substrate was placed in a baking furnace and heated at 80° C. and at atmospheric pressure for at least 4 hours to conduct dehydration treatment.

Figure 67:
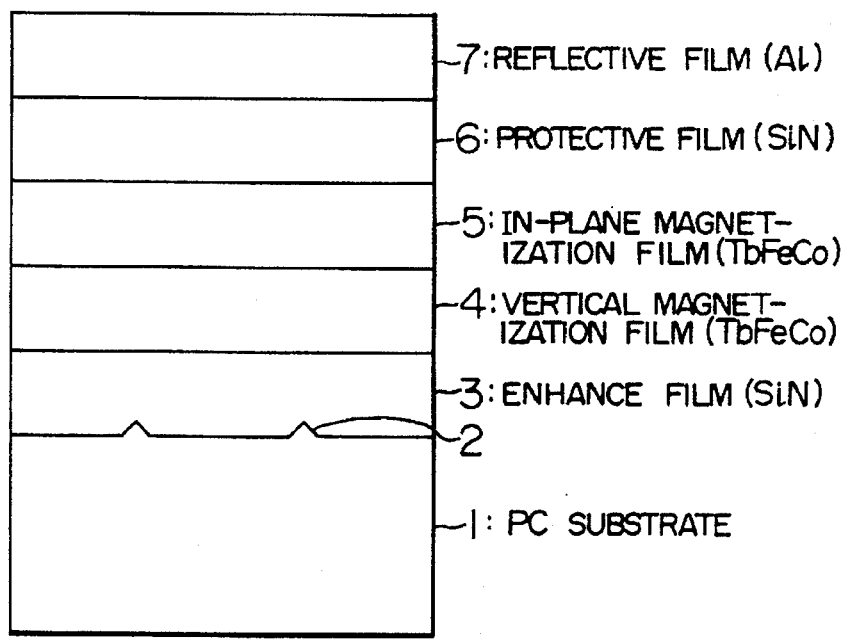
FIG. 67 is a sectional view of the principal part of the magneto-optical recording medium according to Example 17.

The PC substrate was taken out of the baking furnace and stored in an environment of a temperature of 20° C. and relative humidity of 60%. Thereafter, the PC substrate taken out from the baking furnace was put in a radio frequency (RF) sputtering apparatus and, on the preformat pattern-carrying surface of the substrate, an SiN enhancement film, a Tb-Fe-Co perpendicular magnetic film, a SiN protective film and an Al reflecting film were laminated in the above order, to prepare a magneto-optical recording medium having a sectional structure shown in FIG. 67. In FIG. 67, numeral 1 denotes the PC substrate, 2 the preformat pattern, 3 the SiN enhancement film, 4 the Tb-Fe-Co perpendicular magnetic film, 9 the oxide layer of the Tb-Fe-Co perpendicular magnetic film (that is, in-wall magnetization film), 6 the SiN protective film and 7 the Al reflecting film.

Figure 68:
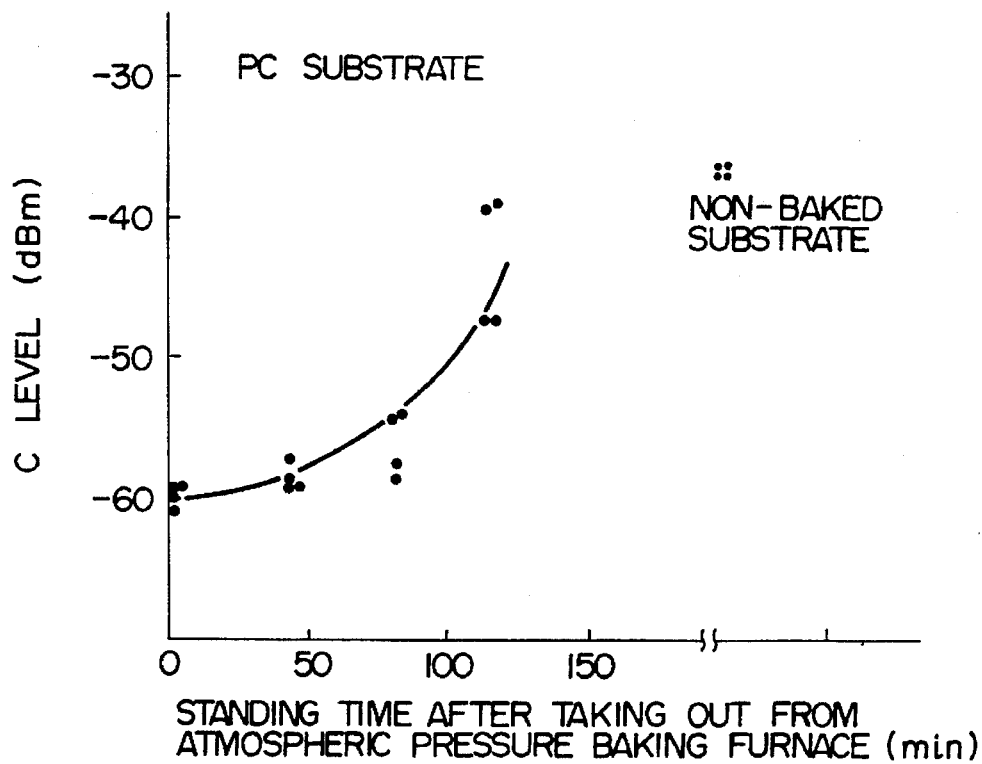
FIG. 68 is a graph showing the relation between the standing time and the external magnetic field sensitivity c.

FIG. 68 shows the relationship between the standing time of the dehydration-treated PC substrate after being taken out of the baking furnace and the recording characteristic of a magneto-optical disk prepared by using the PC substrate. The recording characteristic was determined as follows. A magneto-optical disk having recorded signals was irradiated with a laser beam of an erasing level intensity while an erasing magnetic field of 180 (Oe) was being applied thereto. Then, the residual magnetic field of the track subjected to the above erasing operation was determined with a dynamic characteristic detector having a PIN photodiode differential detector. As shown in the Figure, the magneto-optical disk of the present Example has a higher external magnetic field sensitivity when the perpendicular magnetic film 4, etc. are formed within a shorter time after the PC substrate 1 has been dehydration-treated, and shows a lower external magnetic field sensitivity with the increase of the standing time subsequent to the dehydration treatment. These data reveal that it is preferable, under the above-mentioned conditions, to form the perpendicular magnetic film 4, etc. within 50 minutes of the dehydration treatment. The reason for the external magnetic field sensitivity to decrease rapidly when a time of more than 50 minutes has elapsed is conceivably that the PC substrate once dehydrated absorbs water with the lapse of time, which results in excessive oxidation of the surface of the perpendicular magnetic film 4 and formation of an in-plane magnetization film of excessively large thickness.

Though SiN was used as the enhancement film 3 and the protective film 5 in the above Example, a result similar to the above was obtained also when other inorganic dielectric substances, for example $SiO_2$, SiO, $Si_2N_3$, AlN, and the like, were used. Further, a similar result was obtained when an UV-curable resin protective film was formed in place of the inorganic protective film. A result similar to the above was obtained also when the thickness of respective films was changed variously. Further, a similar result was obtained also when an amorphous perpendicular magnetic film based on rare earth metal-transition metal other than Tb-Fe-Co was used as the perpendicular magnetic film 4.

EXAMPLE 18

Example 17 was repeated except that the dehydration treatment of the PC substrate was performed by heating the substrate in a vacuum chamber evacuated to a degree of vacuum of 20 Pa or less at 80° C. for at least 1 hour.

FIG. 69 shows the relationship between the standing time of the dehydration-treated PC substrate after being taken out of the baking furnace and the recording characteristic of a magneto-optical disk prepared by using the PC substrate. The determination of the recording characteristic was conducted under the same conditions as in Example 17. As shown in the Figure, the magneto-optical disk of the present Example also shows approximately the same disposition as in the Example 17, but shows a more enhanced stability of the external magnetic field sensitivity at a standing time of 50 minutes after the dehydration treatment. This is presumably because the PC substrate is more highly dehydrated in the present Example than in Example 17 and resultantly more time is required for the PC substrate to absorb moisture to the extent which affects the external magnetic field sensitivity.

In the magneto-optical disk of the present Example also, results similar to the above were obtained when the enhance film material, protective film material, thickness of respective films and perpendicular magnetic material were altered variously.

EXAMPLE 19

A disk-shaped transparent glass substrate having a preformat pattern-transferred resin layer (hereinafter referred to as resin layer) provided on one side by the so-called 2P method (hereinafter referred to as 2P substrate) was prepared.

The 2P substrate was placed in a baking furnace and heated at 80° C. and at atmospheric pressure for at least 4 hours to conduct dehydration treatment.

Figure 70:
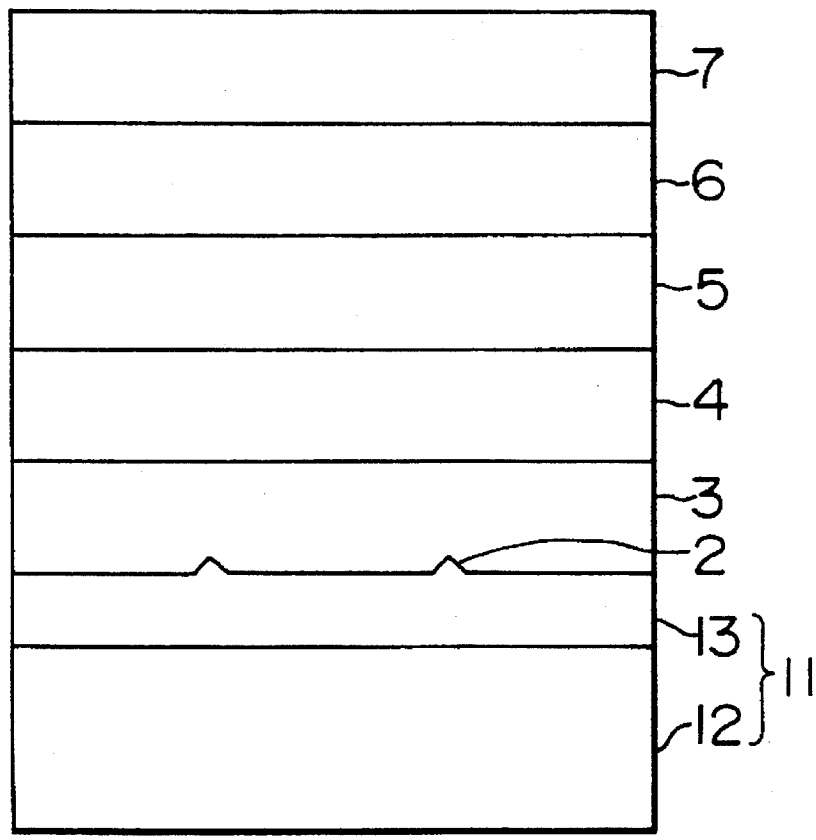
FIG. 70 is a sectional view of the principal part of the magneto-optical recording medium according to Example 19.

The 2P substrate was taken out of the baking furnace and allowed to stand in an environment of a temperature of 20° C. and a relative humidity of 60%. Thereafter, the 2P substrate was taken out of the baking furnace and put into a RF sputtering apparatus. Then, on the preformat pattern-carrying surface of the substrate, a SiN enhance film, a Tb-Fe-Co perpendicular magnetic film, a SiN protective film and an Al reflecting film were laminated in the above order, to prepare a magneto-optical recording medium having a sectional structure shown in FIG. 70. In FIG. 70, numeral 1 denotes the 2P substrate, 22 the glass plate and 21 the resin layer. The other parts corresponding to those in FIG. 67 are denoted by respectively the same numerals.

Figure 71:
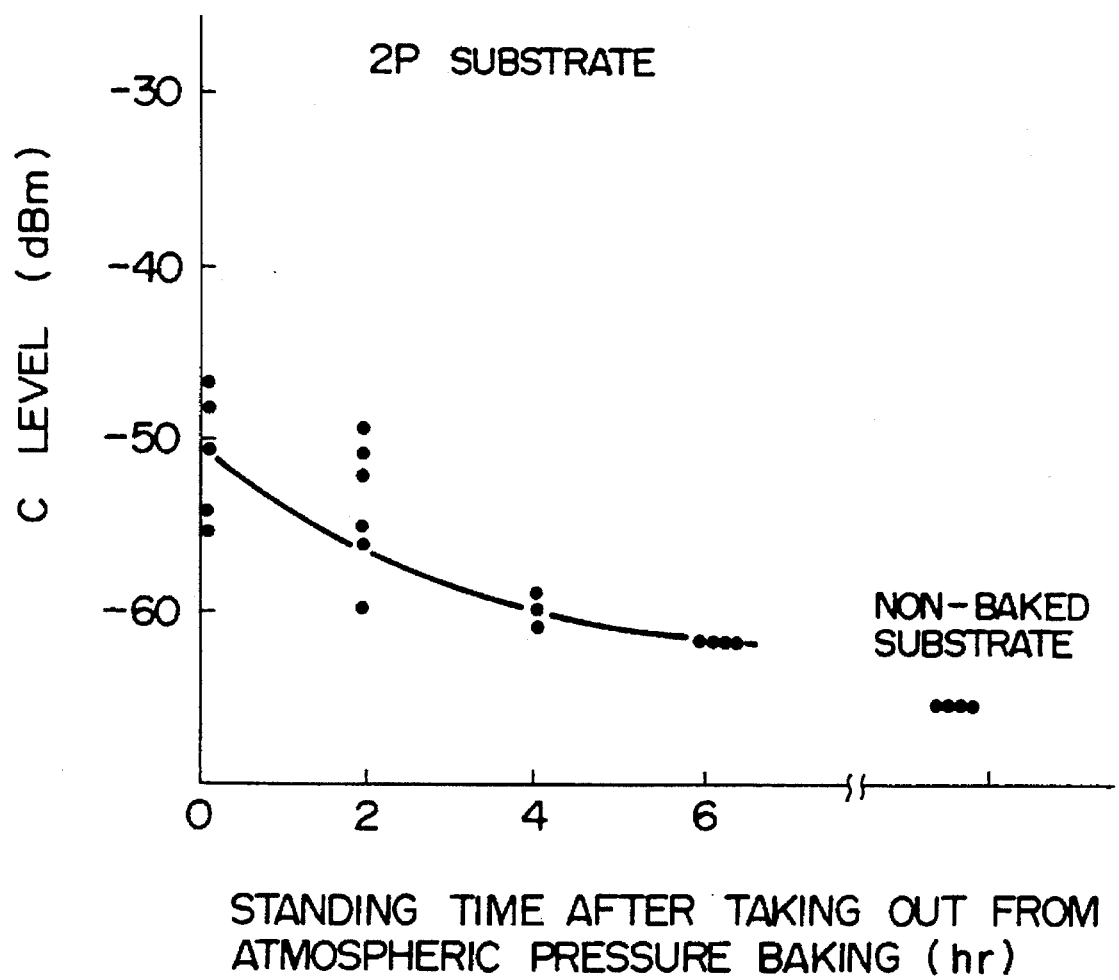
FIG. 71 is a graph showing the relation between the standing time and the external magnetic field sensitivity c.

FIG. 71 shows the relationship between the standing time of the dehydration-treated 2P substrate after being taken out of the baking furnace and the recording characteristic of a magneto-optical disk prepared by using the 2P substrate. The method of determination of the recording characteristic is the same as in the respective Examples described above. As shown in the Figure, in the case of the present Example, a higher external magnetic field sensitivity can be obtained when the perpendicular magnetic film is formed after the lapse of a certain length of time from the dehydration treatment, unlike in the respective Examples described above. This is conceivably because since the film thickness is small in the case of the 2P substrate, the substrate is dehydrated to a very high extent and resultantly, when the perpendicular magnetic film is formed immediately after dehydration, the oxide film, i.e. in-wall magnetization film, necessary for improving the external magnetic field sensitivity cannot be formed. From the data of FIG. 7, it can be seen that it is preferable under the above-mentioned conditions to form the perpendicular magnetic film, etc. after the lapse of time of at least 4 hours, more preferably at least 6 hours, from the dehydration treatment.

In the magneto-optical disk of the present Example also, like in Example 17 described above, similar results to the above were obtained when the enhance film material and protective film material, thickness of the respective films and perpendicular magnetic film material were changed variously.

EXAMPLE 20

Example 20 relates to a suitable combination of a magneto-optical recording film and an auxiliary magnetic film and to processes for producing the two films.

Figure 45:
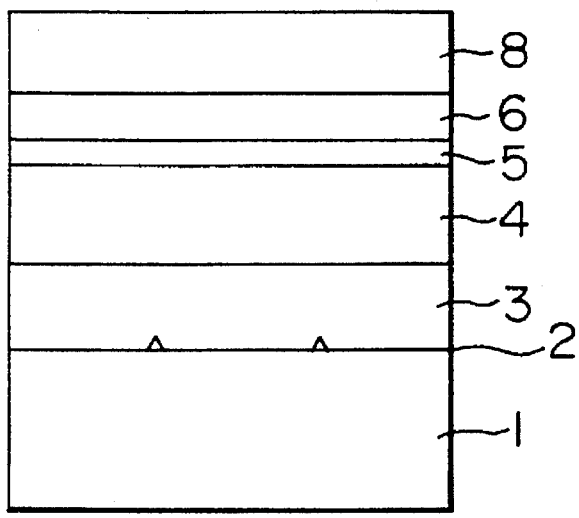
FIG. 45 is a sectional view of the principal part of the magneto-optical recording medium according to Example 5 having an auxiliary magnetic film.

The present Example is described with reference to a magneto-optical recording medium having a film structure shown in FIG. 45, as an example. As shown in the Figure, the magneto-optical recording medium of the present Example comprises a transparent substrate 1 and, laminated on the substrate 1 in the following order, the first enhance layer 3a, a magneto-optical recording film 4, an auxiliary magnetic film 5, the second enhance film 3b and a heat diffusion film 8.

The magneto-optical recording film 4 is formed of a magnetic film which is an amorphous alloy based on rare earth metal-transition metal-additive element represented by the following formula

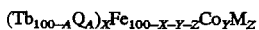

wherein X, Y, Z and A are specified by the following equation:

25 atomic % $\leq X \leq$ 40 atomic %, 5 atomic % $\leq Y \leq$ 15 atomic %, 0 atomic % $\leq Z \leq$ 10 atomic %, 0 atomic % $\leq A \leq$ 20 atomic %, M is at least one element selected from Nb, Cr, Pt, Ti and Al, and q is at least one element selected from Gd, Nd and Dy, and in which alloy no compensation temperature exists, in other word, the rare earth magnetic moment is predominant till the Curie temperature. The auxiliary film is formed out of the alloy further incorporated with oxygen or nitrogen.

The magneto-optical recording film 4 is formed in a film thickness of 100–500 Å, and the auxiliary magnetic film 5 is formed in a film thickness of 5–40% of the above thickness. The auxiliary magnetic film 5 can be formed, after the first enhance film 3a and the magneto-optical recording film have been formed by sputtering in a conventional manner, by adjusting the degree of vacuum in the sputtering chamber to $1\times10^{-6}$–$1\times10^{-4}$ Pa and heating the films under the vacuum conditions or by heating the films while introducing a gas mixture of oxygen or nitrogen with a sputtering gas, such as Ar, Kr, Xe, etc., into the sputtering chamber. The second enhance film 3b and the heat diffusion film 8 are formed by sputtering in a conventional manner after the preparation of the auxiliary magnetic film 5. According to this method, all the films can be formed by continuous sputtering, so that magneto-optical recording media can be produced with good mass productivity.

FIG. 72 shows the magnetic field dependency of C/N of a magneto-optical recording medium (of Example 20) having a $Tb_{31.7}Fe_{56.4}Co_{11.9}$ magneto-optical recording film of a film thickness of 400 Å and a 5% oxygen-containing Tb-Fe-Co auxiliary magnetic film of a film thickness of 100 Å and of a magneto-optical recording medium (of Comparative Example) having a magneto-optical recording film of the same composition as in Example 20 and a Tb-Fe-Co auxiliary magnetic film containing no oxygen laminated thereon, and of a magneto-optical recording medium of the prior art. As is apparent from the Figure, the recording medium of Example 20 can reach saturation magnetization with an external magnetic field of 50 (Oe) and thus is markedly improved in external magnetic sensitivity as compared with the recording medium of Comparative Example which cannot reach saturation magnetization unless an external magnetic field of 100 (Oe) or more is applied, and the medium of the prior art which cannot reach saturation magnetization unless an external magnetic field of 200 (Oe) or more is applied.

As set forth above, according to the present invention, the external magnetic field sensitivity of the magnetic film is remarkably improved as compared with conventional techniques. Therefore, the magnetic field generating device to be mounted on the recording and regenerating apparatuses can be miniaturized, and improvement in high-speed seeking properties, miniaturization and weight-saving of the recording and regenerating apparatus, reduction of consumption power and generation of heat in the recording and regenerating apparatus which uses an electromagnet as an external magnetic field and realization of overwrite recording by magnetic field intensity modulation system can be attained. Moreover, the external magnetic field sensitivity of a magneto-optical recording film can be improved by regulating the composition of the magneto-optical recording film and the auxiliary magnetic film which exert an exchange bonding force on each other, and other factors. Accordingly, a direct overwrite through the magnetic field strength modulation system which uses an external magnetic field of smaller size and a direct overwrite through the light intensity modulation system which requires no initialization magnetic field can be materialized.

What is claimed is:

1. A magneto-optical recording medium comprising:
    a transparent substrate and, supported thereon,
    a magneto-optical recording film comprising at least a perpendicular magnetic film having of an alloy at least 90 atomic percent of rare earth metal-transition metal; and
    an auxiliary magnetic film having a spontaneous magnetization which exerts an exchange coupling force between itself and the magneto-optical recording film, said auxiliary magnetic film being a magnetic film which rotates its direction of magnetization toward the direction of an external magnetic field in the range of temperature between $T_o$ and the Curie temperature of the magneto-optical recording film and has a squareness ratio of 1 or less in said range of temperature, wherein when the strength of an external magnetic field is designated as Hex, a magnetic domain wall coercive force at the measuring temperature is designated as Hc, a perpendicular anisotropic magnetic field at the measuring temperature is designated as Hk, a direction perpendicular to a surface of the film is designated as 0° and an angle of rotation of the magnetic field Hex from a direction perpendicular to a surface of the film is designated as θ, and when a magnetic torque T acting on a supporting axis of a sample is determined with a torque meter while an external magnetic field of a strength specified by Hc<Hex<Hk is being rotated around the supporting axis of the sample, then either a region satisfying $\partial^2 T/\partial\theta^2 < 0$ exists in the range of $0°\leq\theta\leq 90°$ and in the range of $180°\leq\theta\leq 270°$, provided that when a $\theta_0$ satisfying $\partial T(\theta_0)/\partial\theta=0$ is present a region satisfying $T(\theta_0)<T_{max}$ exists, or a region satisfying $\partial^2 T/\partial\theta^2 > 0$ exists in the range of $360°\geq\theta\geq 270°$ and in the range of $180°\geq\theta\geq 90°$, provided that when a $\theta_0$ satisfying $\partial T(\theta_0)/\partial\theta=0$ is present a region satisfying $T(\theta_0)>T_{min}$ exists, provided that the conditions satisfying the above equations are those of a differentiable point.

2. A magneto-optical recording medium according to claim
    wherein said auxiliary magnetic film is one which has a magnetic moment component in the direction perpendicular to a surface of said auxiliary magnetic film at below the Curie temperature of the auxiliary magnetic film and rotates its magnetic moment under influence of an applied external magnetic field to produce a component in the direction of an external magnetic field and which exerts an exchange coupling force on the magneto-optical recording film, and the magneto-optical recording film is one in which the direction of the magnetic moment of the partial magnetization possessed by the transition metal is the same as the direction of magnetization of the magneto-optical recording film at least at below the Curie temperature of the magneto-optical recording film and, when the magnetic moment of the auxiliary magnetic film has a component in the direction of an external magnetic field by application of an external magnetic field, an exchange coupling force interacts between the component and the magnetic moment of partial magnetization possessed by the transition metal, thereby to turn the direction of magnetization of the magneto-optical-recording film toward the direction of the external magnetic field.

3. A magneto-optical recording medium according to claim 1,
    wherein the auxiliary magnetic film is one which has a magnetic moment component in a direction perpendicular to a surface thereof at below the Curie temperature of the auxiliary magnetic film and rotates its magnetic moment under influence of an applied external magnetic field to produce a component in the direction of the applied external magnetic field and which exerts an exchange coupling force on the magneto-optical recording film, and the magneto-optical recording film is one in which the direction of the magnetic moment of partial magnetization possessed by the transition metal is reverse to the direction of magnetization of the magneto-optical recording film at least at below the Curie temperature of the magneto-optical recording film and, when the magnetic moment of the magnetic film has a component in the direction of an external magnetic field by application of the external magnetic field, an exchange coupling force interacts between the component and the magnetic moment of partial magnetization possessed by the transition metal, but the relative magnitude between the exchange coupling force and a force produced by interaction of the magnetization of the magneto-optical recording film and the external field changes depending on temperature.

4. The magneto-optical recording medium according to claim 1, wherein the magneto-optical recording film comprises a ferrimagnetic substance which is transition-metal rich in the range of temperature between $T_o$ and the Curie temperature thereof.

5. The magneto-optical recording medium according to claim 1, wherein the magneto-optical recording film comprises a ferrimagnetic substance which is rare-earth metal-rich in the range of temperature between To and the Curie temperature thereof.

6. The magneto-optical recording medium according to claim 1, wherein the magneto-optical recording film comprises a ferromagnetic substance which is transition-metal-rich in the range of temperature between To and the Curie temperature thereof.

7. The magneto-optical recording medium according to claim 1, wherein the magneto-optical recording film comprises a ferromagnetic substance which is rare-earth metal-rich in the range of temperature between To and the Curie temperature thereof.

8. The magneto-optical recording medium according to claim 1, wherein the magneto-optical recording film comprises a laminate of the first, second and third amorphous magnetic films formed of an alloy containing at least 90 atomic percent of rare earth metal-transition metal which satisfy the conditions (1)–(4) shown below and which magnetically interact with each other and, of these magnetic films, the third magnetic film provided at the farthest position from the transparent substrate comprises a magnetic film in which the rare earth metal magnetization in the rare earth site is predominant at room temperature:

(1) $T_0<Tc_2<Tc_1<Tc_3$, (2) $Hc_1+H_{W(3,1)}<Hr$ in the region heated up to the highest temperature in playback and in the region near thereto, (3) $Hc_3>Hr$ in the highest temperature range from room temperature to the highest temperature reached in playback, (4) $Hc_1<H_{W(3,1)}$ at room temperature, wherein $T_0$ is room temperature; $Tc_1$, $Tc_2$ and $Tc_3$ respectively are the Curie temperatures of the first, the second and the third magnetization films; Hr is the strength of playback external magnetic field; and $H_{W(3,1)}$ is the strength of exchange magnetic field which the third magnetic film exerts on the first magnetic film.

9. The magneto-optical recording medium according to claim 1, wherein the auxiliary magnetic film comprises an alloy containing at least a noble metal or a transition metal.

10. The magneto-optical recording medium according to claim 1, wherein the auxiliary magnetic film comprises an alloy of at least one element selected from the group consisting of Au, Ag, Al, Pt, Rh and Pd with at least one element selected from the group consisting of Fe, Co and Ni.

11. The magneto-optical recording medium according to claim 1, wherein the auxiliary magnetic film comprises an amorphous alloy of at least 90 atomic % rare earth metal-transition metal containing at least one element selected from the group consisting of Au, Ag, Al, Cu, Pt, Nb, Nd, Ho, Gd and Cr.

12. The magneto-optical recording medium according to claim 1, wherein the difference between the Curie temperature of the auxiliary magnetic film and that of the magneto-optical recording film is restricted to not more than 150° C.

13. A magneto-optical recording medium according to claim 1, wherein the perpendicular magnetic film has, at a certain point in the thickness direction of the film, a portion having a lower perpendicular magnetic anisotropic energy than at other portions.

* * * * *